(12) United States Patent
Nagasaka et al.

(10) Patent No.: US 9,386,297 B2
(45) Date of Patent: Jul. 5, 2016

(54) IMAGE GENERATING APPARATUS GENERATING RECONSTRUCTED IMAGE, METHOD, AND COMPUTER-READABLE RECORDING MEDIUM

(71) Applicant: CASIO COMPUTER CO., LTD., Shibuya-ku, Tokyo (JP)

(72) Inventors: Tomoaki Nagasaka, Koganei (JP); Kouichi Nakagome, Tokorozawa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 722 days.

(21) Appl. No.: 13/774,952

(22) Filed: Feb. 22, 2013

(65) Prior Publication Data

US 2013/0222555 A1    Aug. 29, 2013

(30) Foreign Application Priority Data

Feb. 24, 2012 (JP) ................................. 2012-039405
Mar. 19, 2012 (JP) ................................. 2012-062568

(51) Int. Cl.
| | |
|---|---|
| *H04N 13/02* | (2006.01) |
| *H04N 5/225* | (2006.01) |
| *H04N 5/232* | (2006.01) |
| *H04N 9/04* | (2006.01) |
| *G06T 5/00* | (2006.01) |

(52) U.S. Cl.
CPC .............. *H04N 13/021* (2013.01); *G06T 5/003* (2013.01); *H04N 5/225* (2013.01); *H04N 5/2254* (2013.01); *H04N 5/232* (2013.01); *H04N 5/23229* (2013.01); *H04N 9/045* (2013.01); *H04N 13/02* (2013.01); *H04N 13/0217* (2013.01); *H04N 13/0232* (2013.01); *H04N 13/0271* (2013.01); *G06T 2200/21* (2013.01); *G06T 2207/10052* (2013.01)

(58) Field of Classification Search
CPC ............ H04N 5/2254; H04N 13/0217; H04N 5/23229; H04N 5/232; H04N 13/021; H04N 13/0271; H04N 13/0232; H04N 13/02; H04N 9/045; H04N 13/04; H04N 5/225; G06T 5/003; G06T 2207/10052; G06T 2200/21
See application file for complete search history.

(56) References Cited

U.S. PATENT DOCUMENTS

| 6,587,592 B2 | 7/2003 | Georgiev et al. |
| 6,985,263 B2 | 1/2006 | Georgiev et al. |

(Continued)

FOREIGN PATENT DOCUMENTS

| JP | 2005-509985 A | 4/2005 |
| JP | 2008-515110 A | 5/2008 |

*Primary Examiner* — Joseph Ustaris
*Assistant Examiner* — Jill Sechser
(74) *Attorney, Agent, or Firm* — Holtz, Holtz & Volek PC

(57) ABSTRACT

A reconstructed image which further reflects the photo shooting information of a main object is generated. A layer determiner defines a layer of a reconstructed image. A layer image generator reconstructs an image of an object included in the allocated depth range from a light field image and the depth map of the light field image for each layer. A conversion pixel extractor extracts corresponding pixels on a conversion layer which corresponds to an object to be modified. The object to be modified is designated by an operation acquired by a modification operation acquirer. A reconstructed image generator converts layer images using a conversion matrix defined by a conversion matrix determiner and generates an image whose composition has been modified by superimposing the layer images.

22 Claims, 26 Drawing Sheets

(56) References Cited

U.S. PATENT DOCUMENTS

| | | |
|---|---|---|
| 7,936,392 B2 | 5/2011 | Ng et al. |
| 8,189,089 B1 * | 5/2012 | Georgiev ........... G02B 27/1066 348/340 |
| 8,358,367 B2 | 1/2013 | Ng et al. |
| 2004/0042547 A1 * | 3/2004 | Coleman .............. H04N 19/507 375/240.01 |
| 2009/0190024 A1 * | 7/2009 | Hayasaka ......... H01L 27/14627 348/360 |
| 2010/0053354 A1 * | 3/2010 | Hayasaka ............ H04N 5/2254 348/222.1 |
| 2010/0194921 A1 * | 8/2010 | Yoshioka ............. H04N 5/2254 348/231.99 |
| 2011/0267348 A1 * | 11/2011 | Lin ....................... G06T 15/205 345/426 |
| 2012/0019711 A1 | 1/2012 | Ng et al. |
| 2012/0262542 A1 * | 10/2012 | Veera ...................... G06T 5/005 348/42 |
| 2012/0300097 A1 | 11/2012 | Ng et al. |
| 2013/0033626 A1 | 2/2013 | Ng et al. |

\* cited by examiner

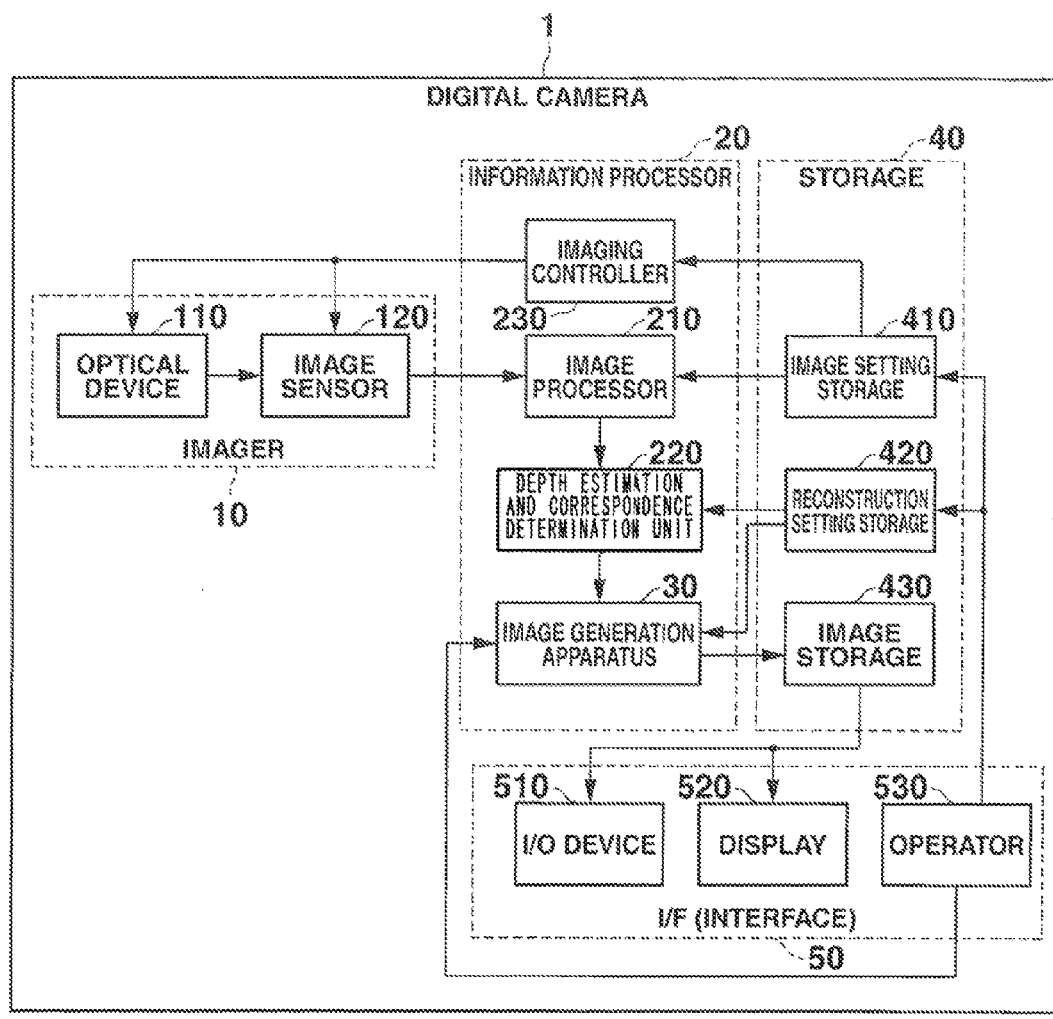

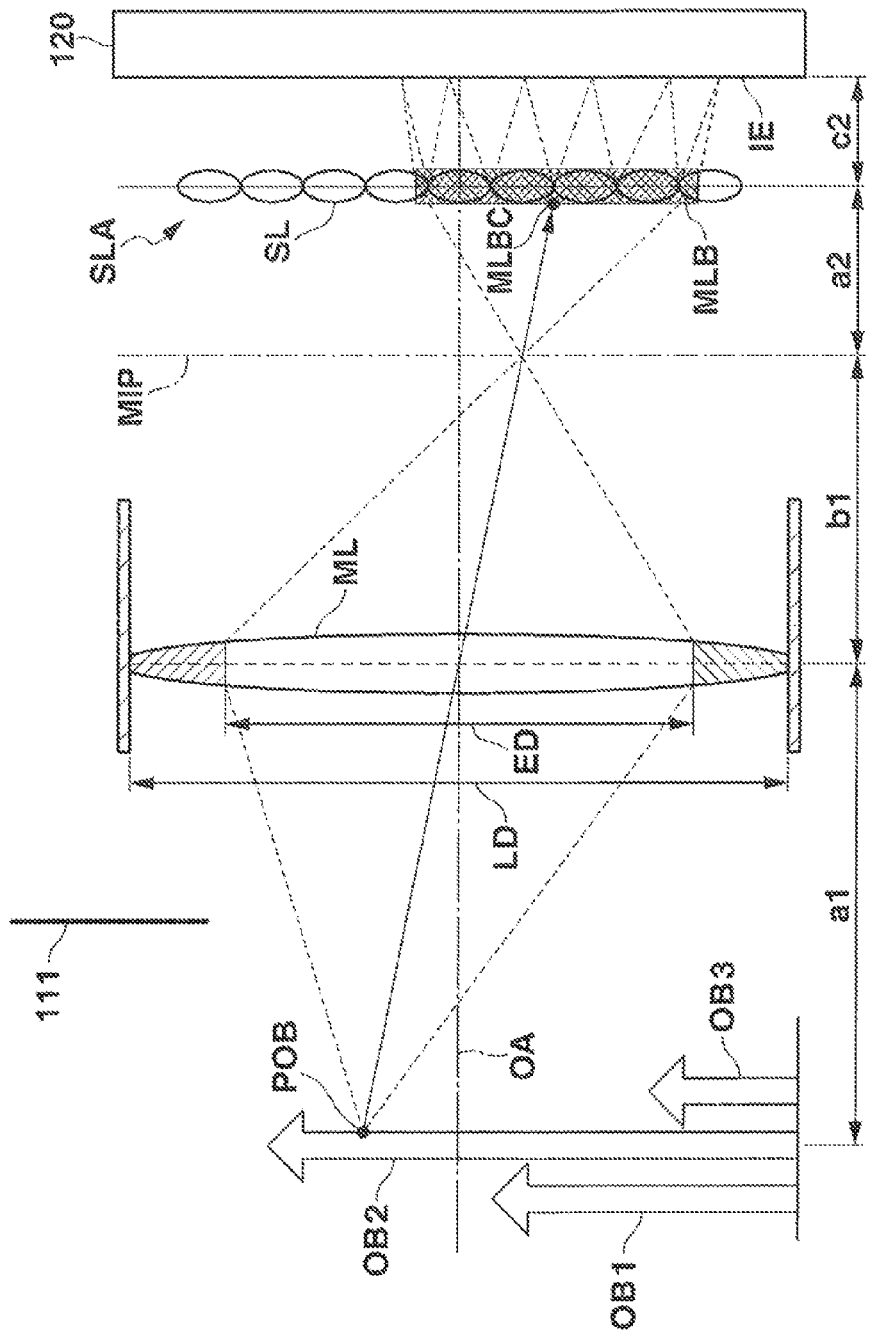

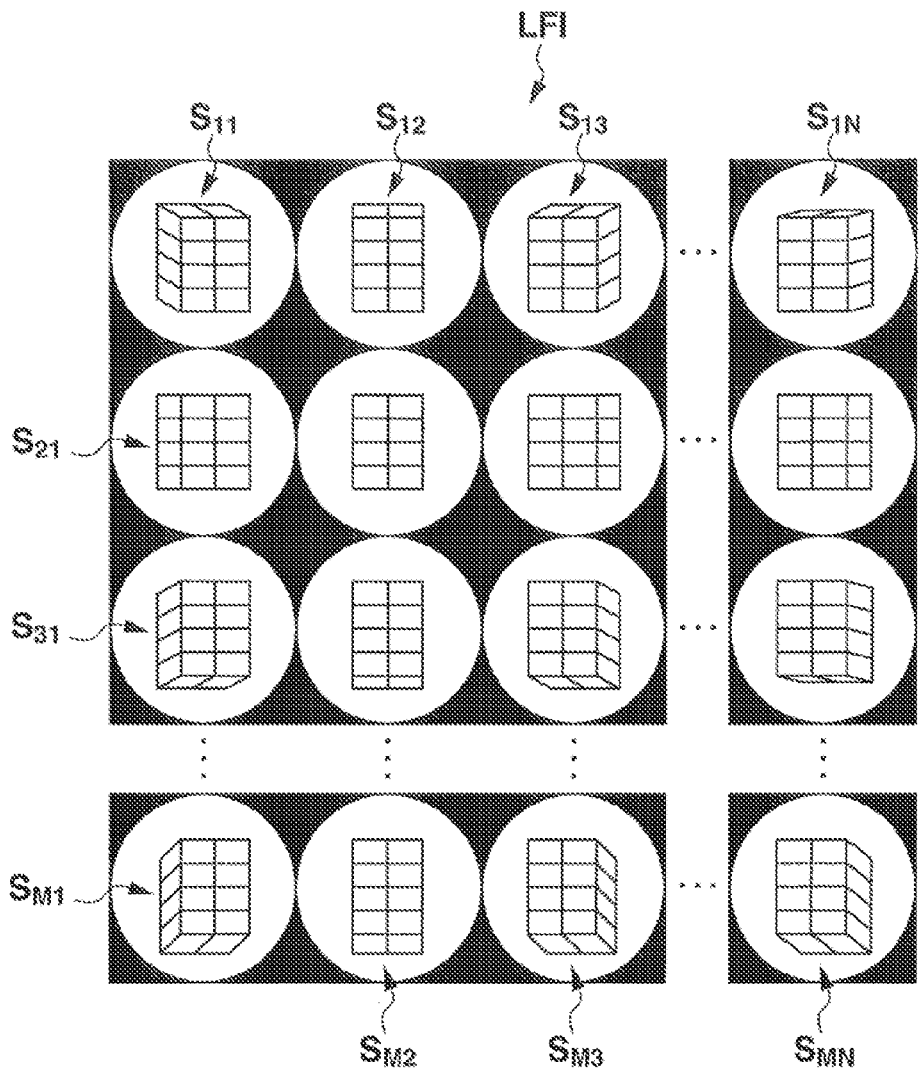
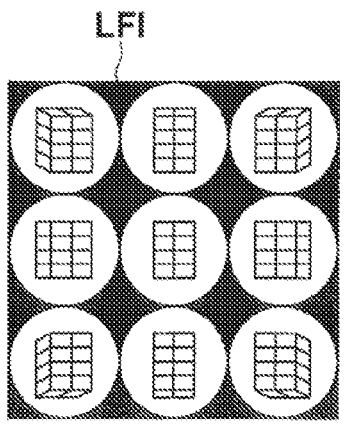
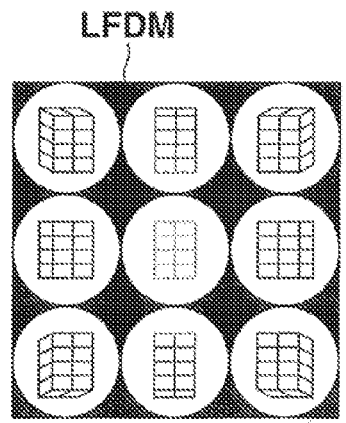

FIG.5

| CORRESPONDING LIST | |
|---|---|
| RECONSTRUCTION PIXELS $(xr, yr)$ | CORRESPONDING SUB-PIXELS AND WEIGHTS |
| $(1, 1)$ | $(xs(1, 1), ys(1, 1), w(1, 1)), (xs(1, 2), ys(1, 2), w(1, 2)), \ldots, (xs(1, k_1), ys(1, k_1), w(1, k_1))$ |
| $(1, 2)$ | $(xs(2, 1), ys(2, 1), w(2, 1)), (xs(2, 2), ys(2, 2), w(2, 2)), \ldots, (xs(2, k_2), ys(2, k_2), w(2, k_2))$ |
| $\ldots$ | $\ldots$ |
| $(1, n)$ | $(xs(n, 1), ys(n, 1), w(n, 1)), (xs(n, 2), ys(n, 2), w(n, 2)), \ldots, (xs(n, k_n), ys(n, k_n), w(n, k_n))$ |
| $(2, 1)$ | $(xs(n+1, 1), ys(n+1, 1), w(n+1, 1)), (xs(n+1, 2), ys(n+1, 2), w(n+1, 2)), \ldots, (xs(n+1, k_{n+1}), ys(n+1, k_{n+1}), w(n+1, k_{n+1}))$ |
| $\ldots$ | $\ldots$ |
| $(n, m)$ | $(xs(nm, 1), ys(nm, 1), w(nm, 1)), (xs(nm, 2), ys(nm, 2), w(nm, 2)), \ldots, (xs(nm, k_{nm}), ys(nm, k_{nm}), w(nm, k_{nm}))$ |

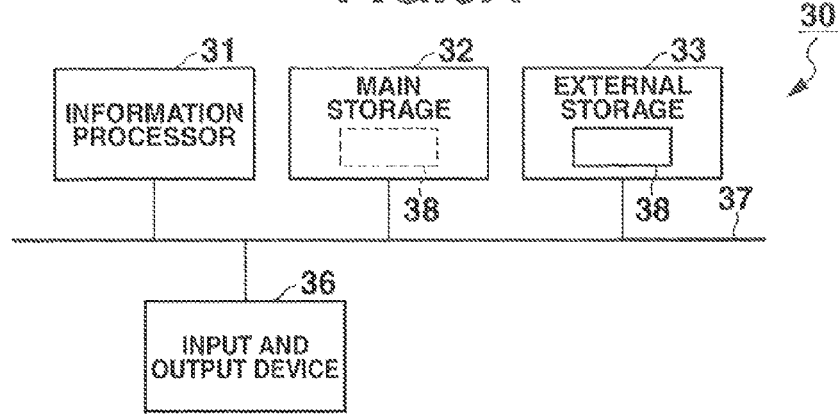
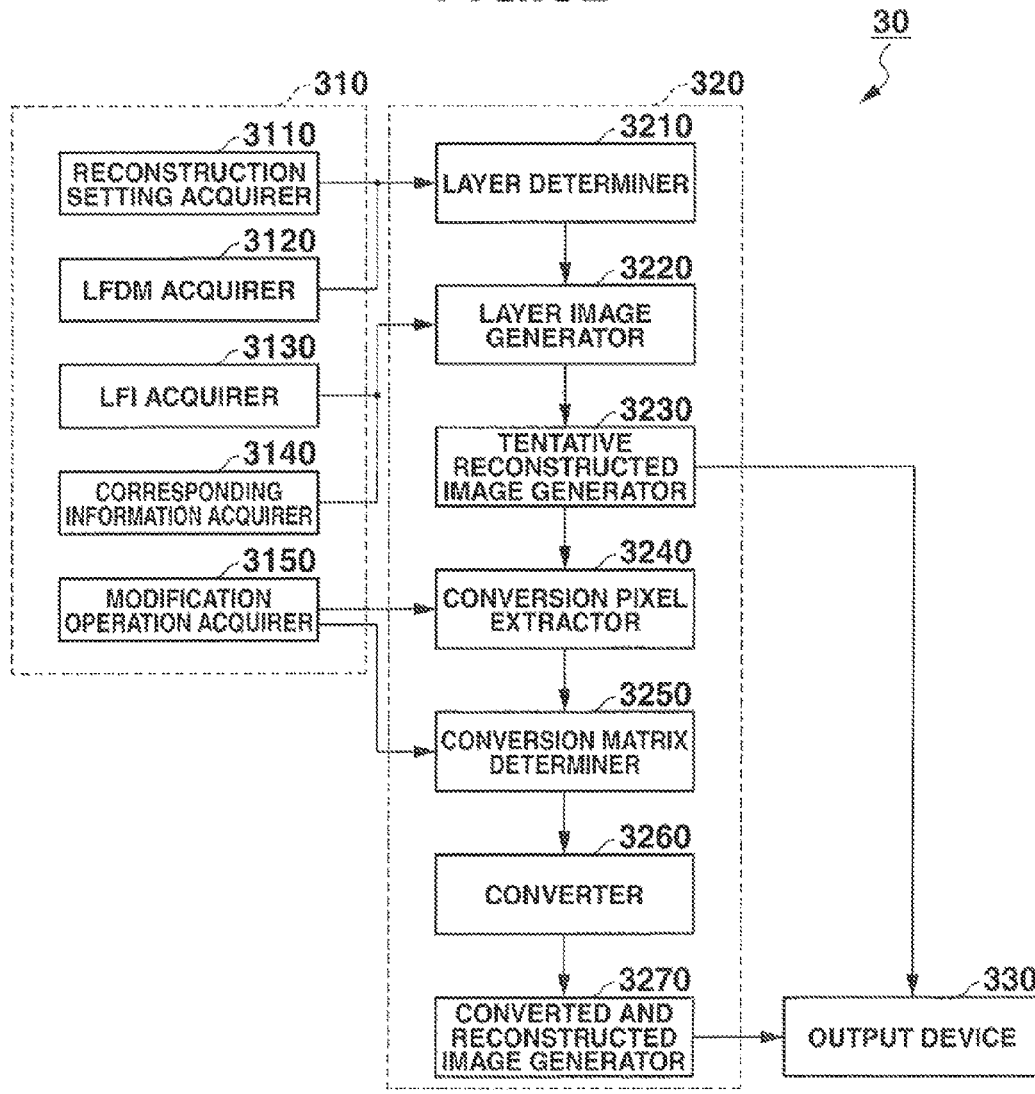

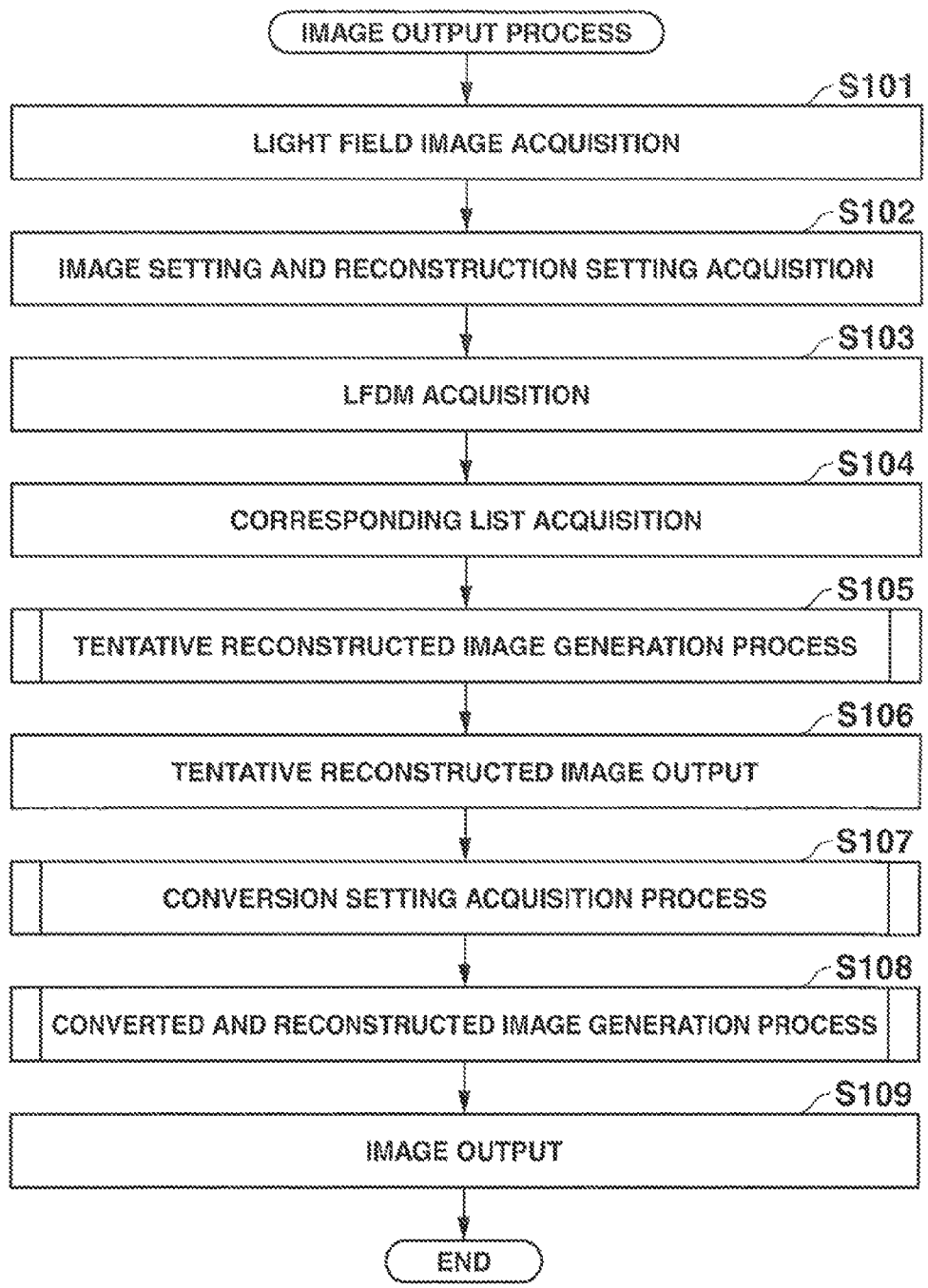

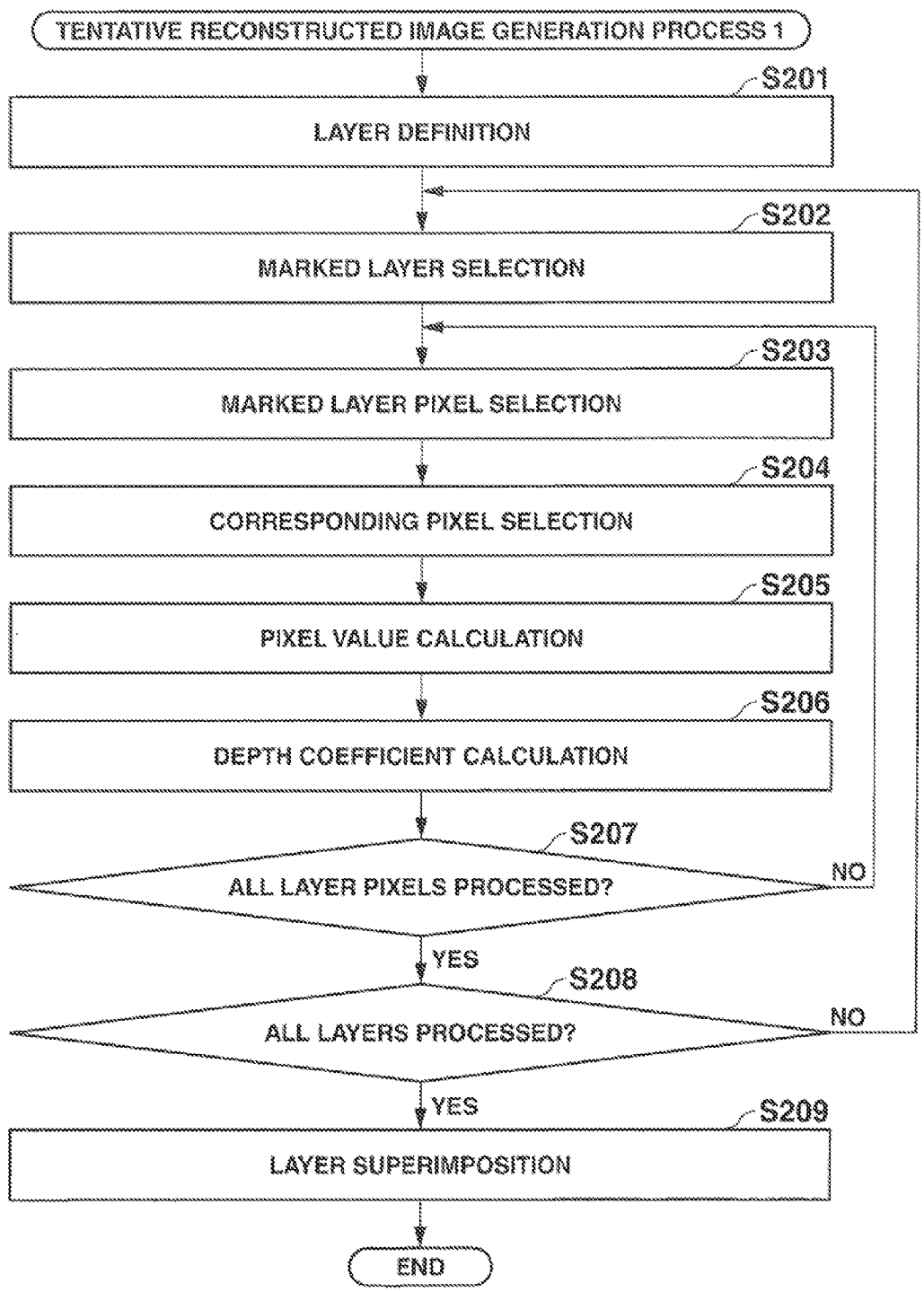

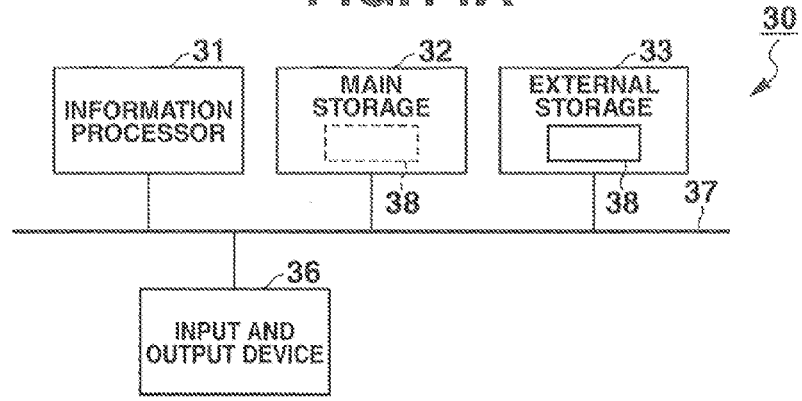
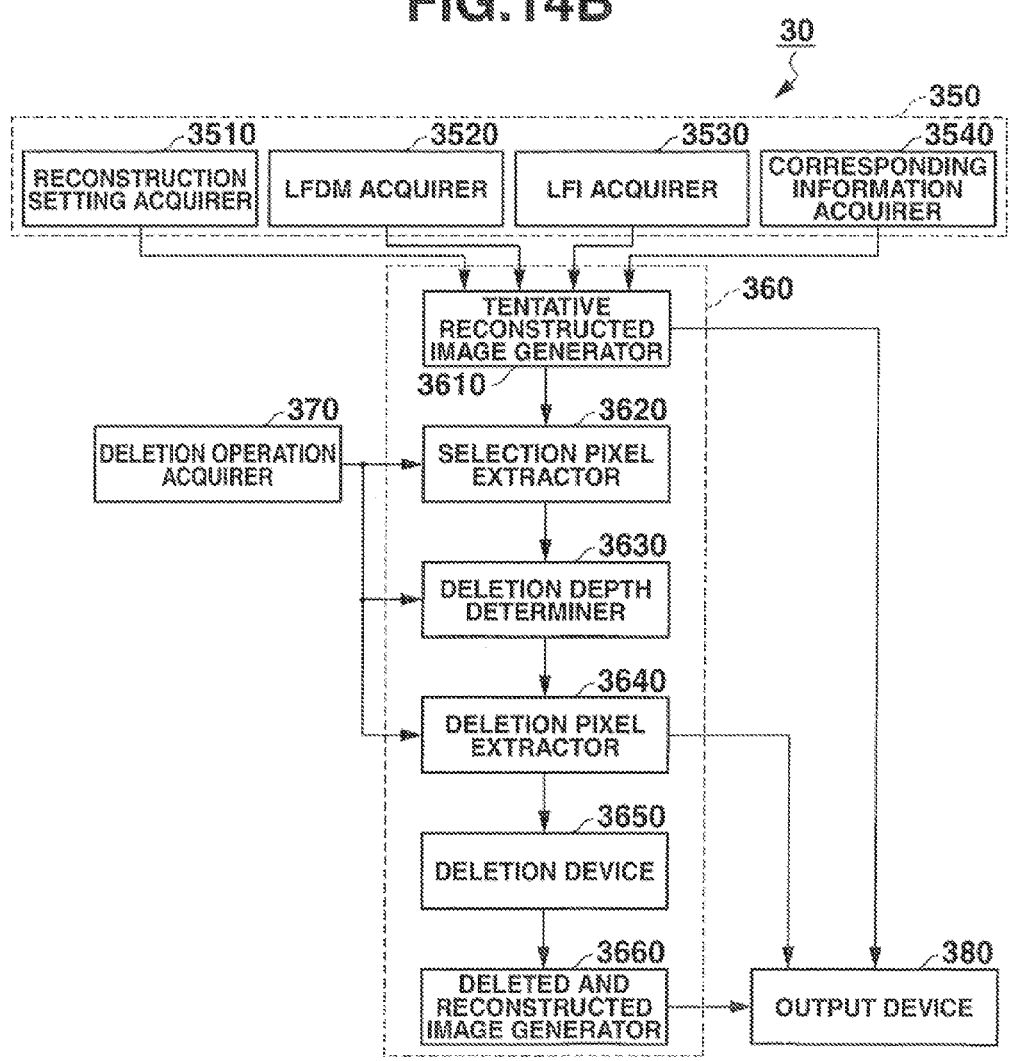

FIG.17A
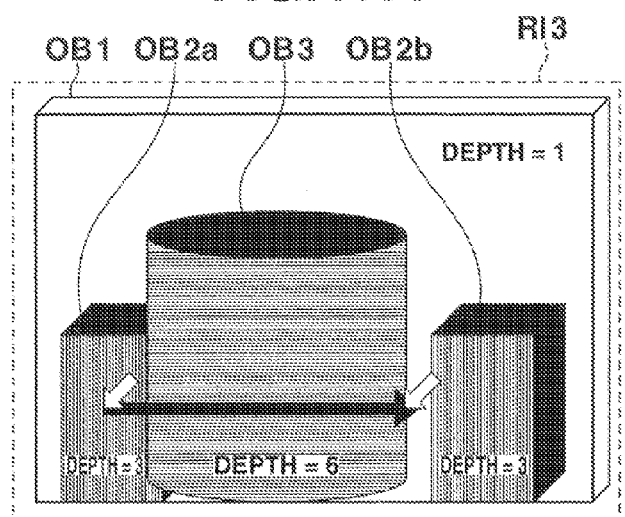
FIG.17B
| SELECTION PIXEL LIST | | |
|---|---|---|
| PIXELS TO BE SELECTED | COORDINATES | DEPTH INDEX |
| #001 | (50, 150) | 3 |
| #002 | (51, 150) | 3 |
| ... | ... | ... |
| #049 | (99, 150) | 3 |
| #050 | (100, 150) | 6 |
| ... | ... | ... |
| #197 | (246, 150) | 6 |
| #198 | (247, 150) | 6 |
| #199 | (248, 150) | 1 |
| #200 | (249, 150) | 1 |
FIG.17C
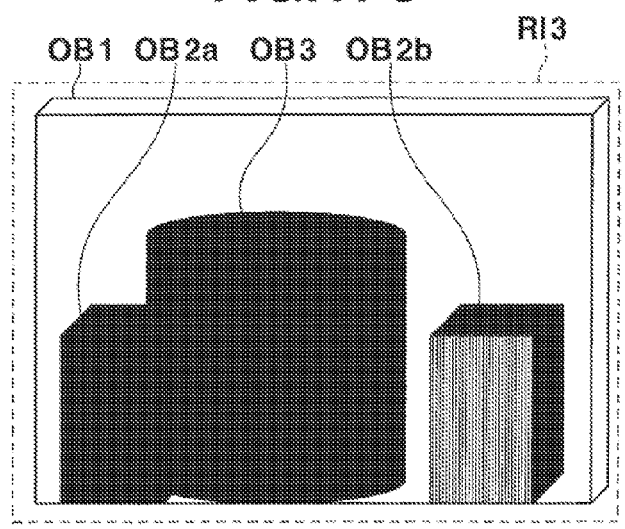

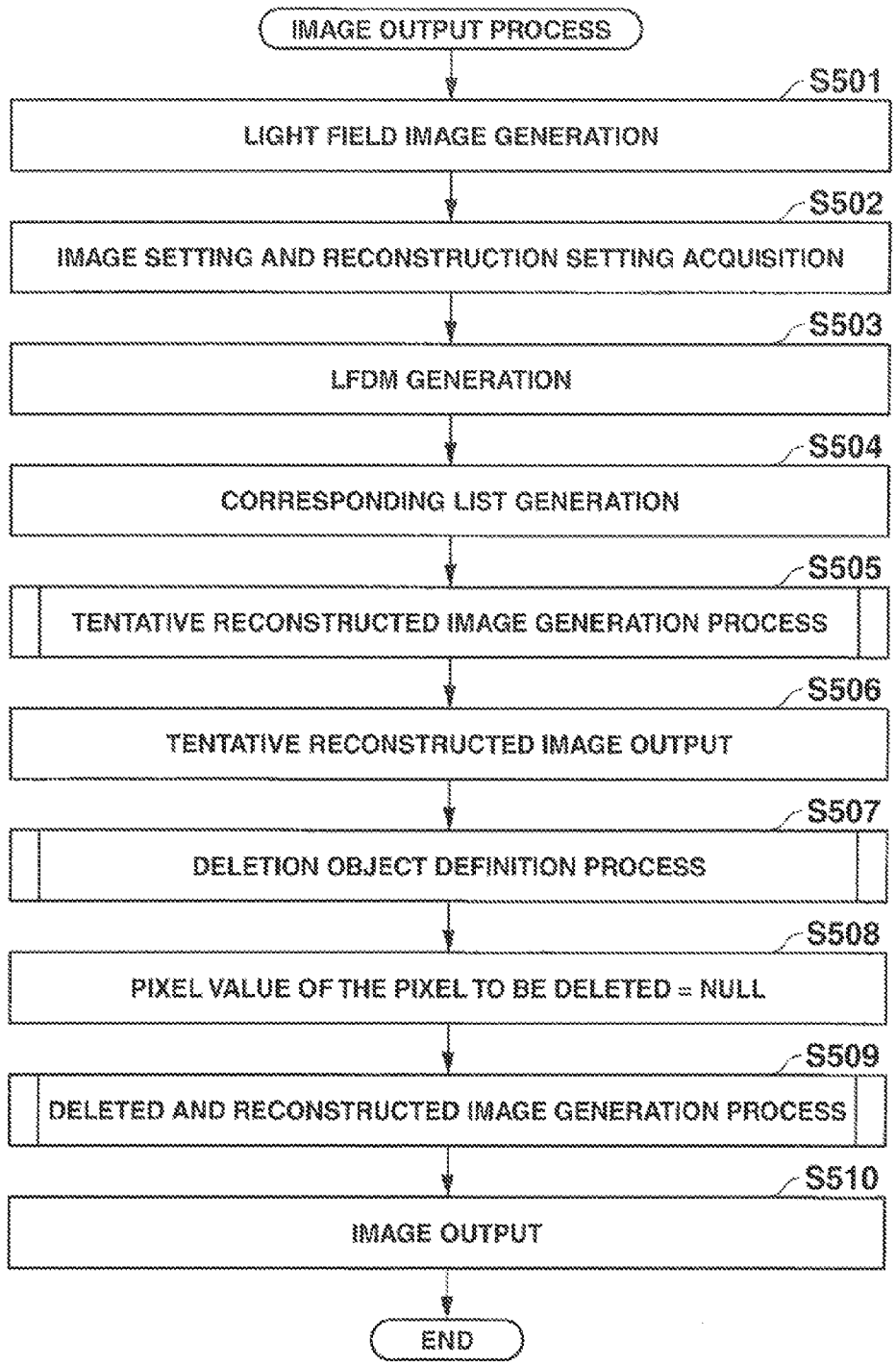

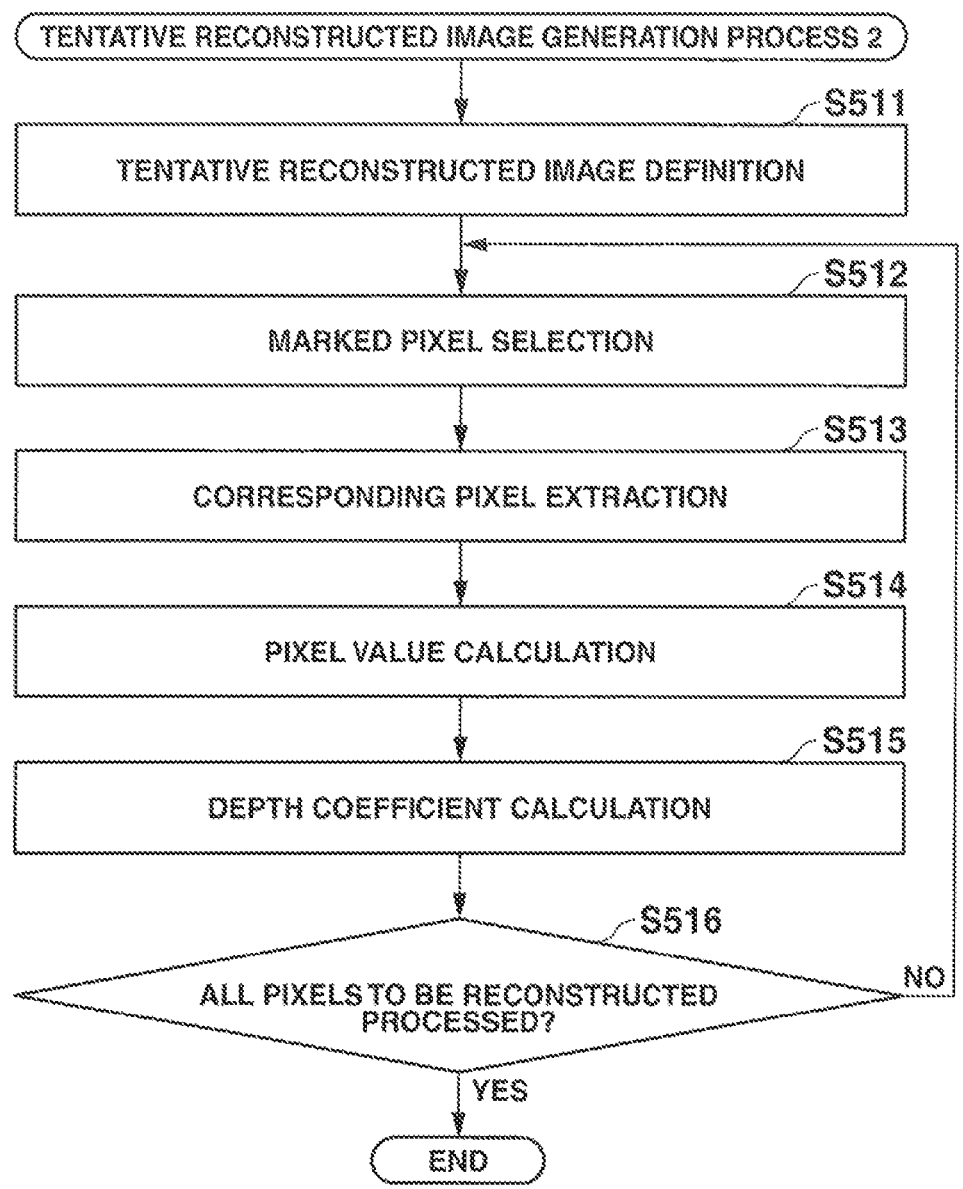

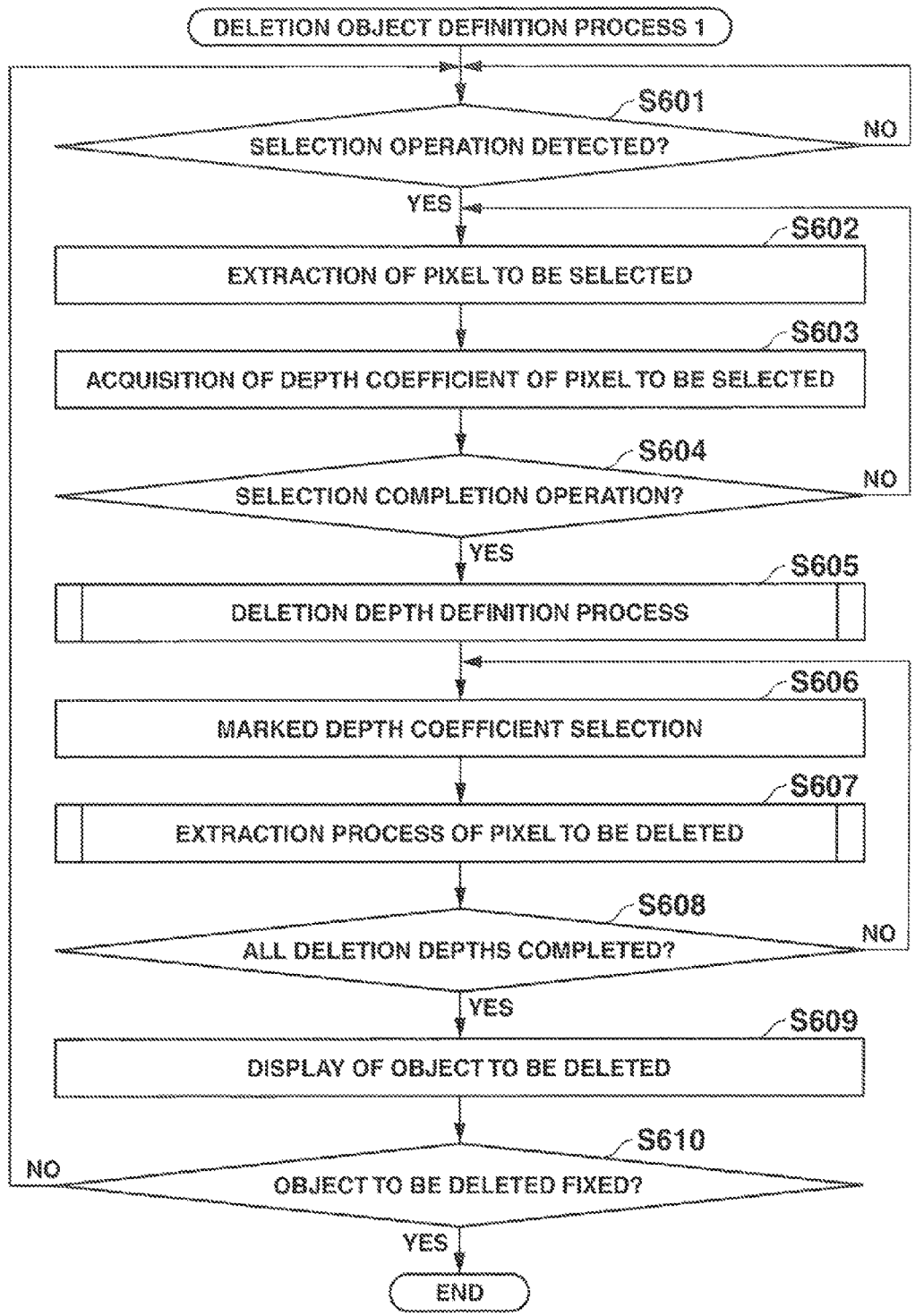

FIG.25

| CLASS - DEPTH CORRESPONDING LIST ||
|---|---|
| CLASS INDEX | CORRESPONDING DEPTH INDEX |
| 1 | 6 - MAX |
| 2 | 3 - 5 |
| 3 | 0 - 2 |

FIG.26

| SELECTION PIXEL LIST | | | |
|---|---|---|---|
| PIXELS TO BE SELECTED | COORDINATES | DEPTH INDEX | CLASS INDEX |
| #001 | (50, 150) | 3 | 2 |
| #002 | (51, 150) | 2 | 2 |
| ... | ... | ... | ... |
| #049 | (99, 150) | 3 | 2 |
| #050 | (100, 150) | 7 | 1 |
| ... | ... | ... | ... |
| #197 | (246, 150) | 7 | 1 |
| #198 | (247, 150) | 8 | 1 |
| #199 | (248, 150) | 1 | 3 |
| #200 | (249, 150) | 0 | 3 |

IMAGE GENERATING APPARATUS GENERATING RECONSTRUCTED IMAGE, METHOD, AND COMPUTER-READABLE RECORDING MEDIUM

CROSS-REFERENCE TO RELATED APPLICATION

This application claims the benefit of Japanese Patent Application No. 2012-039405, filed on Feb. 24, 2012, and the Japanese Patent Application No. 2012-062568, filed on Mar. 19, 2012, the entire disclosures of which are incorporated by reference herein.

FIELD

This application relates to an image reconstructing technique.

BACKGROUND

After taking a photograph, there are cases where users would like to change a composition of an object. In order to meet such a demand, the technique which changes an image after the image generation is known in the field of image processing.

In relation to this technique, National Patent Publication No. 2005-509985 discloses a method which defines an image area and modifies the composition of the image using interpolation in order to suppress a sense of discomfort. The technique described in the National Patent Publication No. 2005-509985 rectifies the gap generated by the composition modification using the pixel values of the surrounding pixels.

Moreover, a technique, which acquires information regarding the position, direction, and intensity of the light beams coming into the lens of a camera from an object by obtaining an image of an object shot from different viewpoints, is known. In relation to such a technique, the National Patent Publication No. 2008-515110 discloses a technique which acquires a plurality of images (light field images) in which an object is shot, and, from the plurality of images, the technique reconstructs the images of the object whose focal distances, depths of the field and the like are varied.

The information regarding the object included in the images shot from one viewpoint is limited to light beam arriving positions and light intensity at those positions (corresponding to the coordinates of each pixel and their pixel values, respectively). Thus, if an object composition is modified on a planar image, even if the object is modified using the technique described in the National Patent Publication No. 2005-509985, an interpolation not using the light beam information from an object is needed.

On the other hand, the National Patent Publication No. 2008-515110 describes a technique of acquiring information which shows a three-dimensional form of an object by photo shooting the object from a plurality of viewpoints, and a technique of acquiring light beam information and the like, from an object hidden and invisible from a certain viewpoint. However, the National Patent Publication No. 2008-515110 does not mention a method of generating the reconstructed image in which the composition of an object has been changed, and does not solve the above-mentioned problem.

SUMMARY

The present invention is made in view of the above-mentioned situation, and an object of the present invention is to provide an image generating apparatus generating a reconstructed image which further reflects the photo shooting information regarding a main object, a method and a computer-readable recording medium.

An image generating apparatus of a first aspect of the present invention comprises: an image acquirer which acquires a photo shooting image formed by a plurality of sub images shot from each of a plurality of viewpoints; an extractor which extracts, from sub-pixels forming the sub images, sub-pixels corresponding to an object whose composition is to be modified as pixels to be modified; a modifier which modifies a correspondence relationship with sub-pixels extracted as the pixels to be modified among correspondence relationships between the sub-pixels and pixels to be reconstructed forming a reconstructed image which is defined on a predetermined reconstruction plane; and a generator which generates a reconstructed image in which the composition of the object has been modified by calculating pixel values of the pixels to be reconstructed from pixel values of the sub-pixels using the modified correspondence relationship.

An image generating apparatus of a second aspect of the present invention comprises: an image acquirer which acquires a photo shooting image formed by a plurality of sub images shot from each of a plurality of viewpoints; an extractor which extracts, from sub-pixels forming the sub images, sub-pixels corresponding to an object to be deleted as pixels to be deleted; a modifier which modifies a correspondence relationship between the sub-pixels and pixels to be reconstructed forming a reconstructed image which is defined on a predetermined reconstruction plane so that a degree of correspondence with the sub-pixels extracted as the pixels to be deleted is reduced; and a generator which generates a reconstructed image having a small effect of the pixels to be deleted by calculating pixel values of the pixels to be reconstructed from pixel values of the sub-pixels using the modified correspondence relationship.

A method of a third aspect of the present invention comprises the steps of: acquiring a photo shooting image formed by a plurality of sub images shot from each of a plurality of viewpoints; extracting, from sub-pixels forming the sub images, sub-pixels corresponding to an object whose composition is to be modified as pixels to be modified; modifying a correspondence relationship with sub-pixels extracted as the pixels to be modified among correspondence relationships between the sub-pixels and pixels to be reconstructed forming a reconstructed image which is defined on a predetermined reconstruction plane; and generating a reconstructed image in which the composition of the object has been modified by calculating pixel values of the pixels to be reconstructed from pixel values of the sub-pixels using the modified correspondence relationship.

A method of a fourth aspect of the present invention comprising the steps of: acquiring a photo shooting image formed by a plurality of sub images shot from each of a plurality of viewpoints; extracting, from sub-pixels forming the sub images, sub-pixels corresponding to an object to be deleted as pixels to be deleted; modifying a correspondence relationship between the sub-pixels and pixels to be reconstructed forming a reconstructed image which is defined on a predetermined reconstruction plane so that a degree of correspondence with the sub-pixels extracted as the pixels to be deleted is reduced; and generating a reconstructed image having a small effect of the pixels to be deleted by calculating pixel values of the pixels to be reconstructed from pixel values of the sub-pixels using the modified correspondence relationship.

A non-transitory computer-readable recording medium of a fifth aspect of the present invention has stored thereon a program executable by a computer, the program controlling the computer to perform functions comprising: acquiring a photo shooting image formed by a plurality of sub images shot from each of a plurality of viewpoints; extracting, from sub-pixels forming the sub images, sub-pixels corresponding to an object whose composition is to be modified as pixels to be modified; modifying a correspondence relationship with sub-pixels extracted as the pixels to be modified among correspondence relationships between the sub-pixels and pixels to be reconstructed forming a reconstructed image which is defined on a predetermined reconstruction plane; and generating a reconstructed image in which the composition of the object has been modified by calculating pixel values of the pixels to be reconstructed from pixel values of the sub-pixels using the modified correspondence relationship.

A non-transitory computer-readable recording medium of a sixth aspect of the present invention has stored thereon a program executable by a computer, the program controlling the computer to perform functions comprising: acquiring a photo shooting image formed by a plurality of sub images shot from each of a plurality of viewpoints; extracting, from sub-pixels forming the sub images, sub-pixels corresponding to an object to be deleted as pixels to be deleted; modifying a correspondence relationship between the sub-pixels and pixels to be reconstructed forming a reconstructed image which is defined on a predetermined reconstruction plane so that a degree of correspondence with the sub-pixels extracted as the pixels to be deleted is reduced; and generating a reconstructed image having a small effect of the pixels to be deleted by calculating pixel values of the pixels to be reconstructed from pixel values of the sub-pixels using the modified correspondence relationship.

BRIEF DESCRIPTION OF THE DRAWINGS

A more complete understanding of this application can be obtained when the following detailed description is considered in conjunction with the following drawings, in which:

FIG. 1 is a diagram showing a configuration of a digital camera;

FIG. 2 is an illustration showing a configuration of an optical system of a digital camera;

FIG. 3A shows a conceptual diagram of a light field image;

FIG. 3B shows an example of a light field image;

FIG. 3C shows an example of a light field depth map;

FIG. 5 is a list showing an example of a corresponding list;

FIG. 6A is a diagram showing a physical configuration of an image generating apparatus of an embodiment 1;

FIG. 6B is a diagram showing a functional configuration of image generating apparatus;

FIG. 8A is an illustration showing a tentative reconstructed image, FIG. 8B is an illustration showing an operation for choosing an object to be modified, FIG. 8C is an illustration showing an operation for fixing an object to be modified, FIG. 8D is an illustration showing a parallel translation operation; FIG. 8E is an illustration showing a reconstructed image after the parallel translation; FIG. 8F is an illustration showing a reduction operation, and FIG. 8G is an illustration showing a reconstructed image after the reduction;

FIG. 10 is a flow chart which shows an image output process of the embodiment 1;

FIG. 11 is a flow chart which shows a tentative reconstructed image generation process of the embodiment 1;

FIG. 14A is a diagram showing a physical configuration of an image generating apparatus of an embodiment 2;

FIG. 14B is a diagram showing a functional configuration of the image generating apparatus;

FIG. 15A is an illustration showing a tentative reconstructed image, FIG. 15B is an illustration showing an operation for choosing an object to be deleted, FIG. 15C is an illustration showing an operation for fixing an object to be deleted, FIG. 15D is an illustration showing the reconstructed image in which the object has been completely deleted, and FIG. 15E is an illustration showing the reconstructed image in which a certain percentage of the object has been deleted;

FIG. 16A is an illustration showing a tentative reconstructed image, FIG. 16B is an illustration showing a tentative reconstructed depth map, FIG. 16C is an illustration showing a deleted and reconstructed image, and FIG. 16D is an illustration showing a deleted and reconstructed depth map;

FIG. 17A to FIG. 17C are figures for explaining the process which chooses the object to be deleted of the embodiment 2, FIG. 17A is a figure showing a deletion operation, FIG. 17B is a list showing a selection pixel list used for selection, and FIG. 17C is a figure showing a selection result;

FIG. 18A is an illustration showing a light field image LFI before deletions;

FIG. 18B is an illustration showing a tentative reconstructed image, FIG. 18C is an illustration showing a light field image LFI after deletions, and FIG. 18D is an illustration showing a deleted and reconstructed image;

FIG. 19 is a flow chart which shows an image output process according to the embodiment 2;

FIG. 20 is a flow chart which shows a tentative reconstructed image generation process according to the embodiment 2;

FIG. 21 is a flow chart which shows a deletion object defining process according to the embodiment 2;

FIG. 25 is a list showing an example of a class-depth corresponding list of another embodiment of the present invention; and FIG. 26 is a list showing an example of a selection pixel list of another embodiment of the present invention.

DETAILED DESCRIPTION

Figure 4:
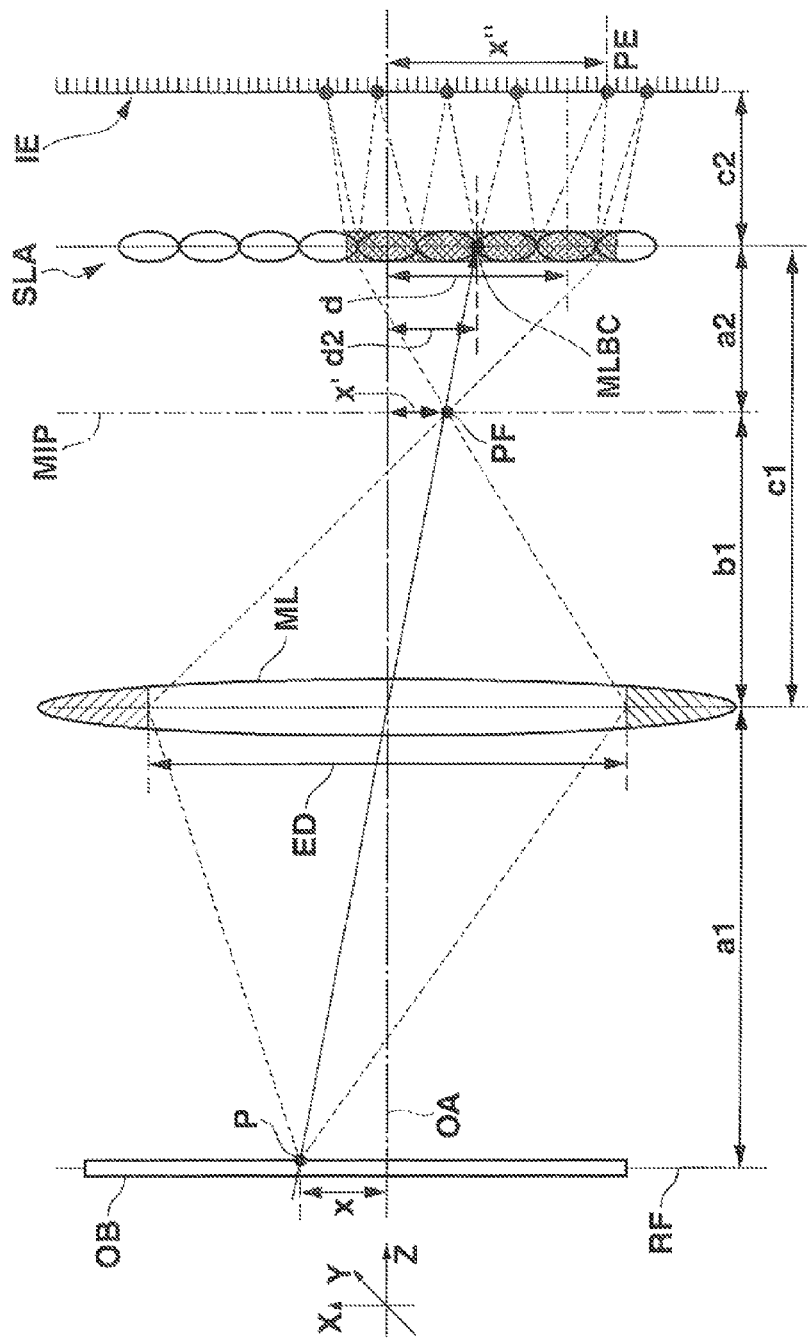
FIG. 4 is an illustration for explaining a light beam trace.

A digital camera and an image generating apparatus (reconstructed image generating apparatus) according to an embodiment of the present invention is described hereinafter with reference to the attached drawings. In addition, the similar symbols are given to similar or corresponding portions in the drawings.

(Embodiment 1)

The embodiment 1 of the present invention is described.

The image generating apparatus 30 (reconstructed image generating apparatus) according to the embodiment of the present invention is installed in a digital camera 1 as shown in FIG. 1.

The digital camera 1 has the following functions (i-vi):

i) a function which shoots a light field image which includes a plurality of sub images shot an object from a plurality of viewpoints;

ii) a function of acquiring a depth coefficient which shows a depth of an object;

iii) a function generating a reconstructed image in which the image of the object is reconstructed from the light field image;

iv) a function which displays the generated reconstructed image;

v) a function which accepts an operation instructing a composition modification of the reconstructed image; and vi) a function of generating a reconstructed image whose composition has been changed according to the accepted operation.

The image generating apparatus 30 takes charge of, especially, "vi) a function of generating a reconstructed image whose composition has been changed according to the accepted operation".

The digital camera 1 comprises an imager 10, an information processor 20 including the image generating apparatus 30, a storage 40, and an interface (I/F) 50, as shown in FIG. 1. The digital camera 1, with the described configuration, acquires light beam information of an object from outside, and modifies the composition of the object to display.

The imager 10 comprises an optical device 110 and an image sensor 120, and performs an imaging operation.

The optical device 110 comprises a shutter 111, a main lens ML, and a sub lens array SLA (micro lens array), as shown in FIG. 2. The optical device 110 receives the light beam from outside (object) through the main lens ML, and projects optical images, which are obtained through optical centers of each sub lens SL which constructs sub lens array SLA as viewpoints onto the image sensor 120.

The image sensor 120 comprises, for example, an imaging element, such as a Charge Coupled Device (CCD) or a Complementary Metal Oxide Semiconductor (CMOS), and a transmitter which transmits an electrical signal generated by the imaging element to an information processor 20. The image sensor 120 having the above physical configuration converts the optical image projected by the optical device 110 into an electrical signal and transmits it to the information processor 20.

The shutter 111 controls the incidence and shut of the external light to the image sensor 120.

The main lens ML comprises a convex lens, a concave lens, an aspheric lens, and the like, or a plurality of those lenses and forms an optical image using the light from the object OB at the time of photo shooting on a virtual main lens imaging plane MIP between the main lens ML and sub lens array SLA. In addition, the object OB at the time of photo shooting is presupposed to include a plurality of components which are away from the main lens ML by different distances respectively as shown in FIG. 2.

The sub lens array SLA includes M×N sub lenses (micro lens) SL arranged in the shape of a grid on a plane. The sub lens array SLA forms optical images which are formed on the main lens imaging plane MIP by the main lens ML as the optical images observed from the optical centers of each sub lens SL as viewpoints on an imaging plane IE of image sensors which constructs the image sensor 120. A space defined by a plane by the main lens ML and an imaging plane IE is referred to as a light field.

A maximum lens diameter LD and an effective diameter ED can be defined for the main lens ML. The maximum lens diameter LD is a physical diameter of the main lens ML. On the other hand, the effective diameter ED is a diameter of an area of the main lens ML which can be used for photo shooting. The outside of the effective diameter ED of the main lens ML is an area (ineffective area) which is not effective for photo shooting and/or restructuring images, as the incoming or outgoing light beams from or to the main lens are limited by various filters attached to the main lens ML and/or the physical structure of the circumference of the main lens ML.

The maximum lens diameters LD and the effective diameters ED are measured in advance, and are stored by a storage 40 set to factory default.

In an example in FIG. 2, among a plurality of objects OBs (object OB1~object OB3), the light beam from a portion POB of an object OB2 passes the part (effective part) which forms the effective diameter ED of the main lens ML, and is projected onto a plurality of sub lenses SLs. In this manner, an area in which the light emitted from the portion POB of a certain object OB passes the effective part of the main lens ML and is projected onto the sub lens array SLA is referred to as a main lens blur MLB of the portion POB. Among these, a portion at which a main light beam reaches is referred to as the main lens blur center MLBC.

In addition, hereinafter, a plurality of objects are described as an object OB1 through an object OB3 sequentially in order from the most distant (the distance from the main lens is largest) object.

The distance from the optical center of the main lens ML to the imaging plane of the main lens MIP is set to b1, the distance from the imaging plane MIP to a plane formed by the sub lens array SLA is set to a2, and the distance from the sub lens array SLA to the imaging plane IE of the image sensor 120 is set to c2.

The imager 10 with the above-mentioned configuration shoots a light field image LFI which includes the information on the light beam (light beam reached part, light volume, direction) which passes through the light field. An example of the light field image LFI which shot an object OB composed of blocks is shown in FIG. 3A. This light field image LFI includes images (sub images SI, $S_{11}$-$S_{MN}$) corresponding to each of M×N sub lenses SL (micro lens) arranged in the shape of a grid. For example, the upper left sub image $S_{11}$ corresponds to the image shot the object OB from the upper left, and the lower right sub image $S_{MN}$ corresponds to the image shot the object OB from the lower right.

Each sub image is arranged at a position on the light field image LFI corresponding to the position of the sub lens which formed the sub image. The i-th row sub images (a lateral row of sub images) Si1-SiN correspond to stereo images in which the images formed by the main lens ML are formed by sub lenses SL which are arrayed laterally beside the i-th row of the sub lens array SLA. Similarly, the j-th column sub images (a longitudinal column of sub images) S1j-SMj correspond to stereo images in which the images formed by the main lens ML are formed by sub lenses SL which are arrayed longitudinally beside the j-th column of the sub lens array SLA. In addition, in this embodiment, each sub image is a gray scale image, and each pixel which constructs a sub image has a pixel value (scalar value).

The information processor 20 shown in FIG. 1 comprises a Central Process Unit (CPU), a Random Access Memory (RAM), an internal bus, and an I/O port physically. With the above physical configuration, the information processor 20 functions as an image processor 210, a depth estimation and correspondence determination unit 220, the image generating apparatus 30, and an image controller 230.

The image processor 210 acquires an electrical signal from the image sensor 120 and converts the acquired electrical signal to image data based on image setting information stored by an image setting storage 410 of the storage 40. The image processor 210 transmits image data and shooting setting information generated by adding predetermined information to the image setting information, to the depth estimation and correspondence determination unit 220.

The image setting information stored by the image setting storage 410 is mentioned later.

The depth estimation and correspondence determination unit 220 estimates the depth of an object using the depth of each pixel in the sub image in a light field image LFI, when the light field image LFI and shooting setting information are received. The depth estimation and correspondence determination unit 220 calculates a depth of an object from a deviation magnitude of the pixels corresponding to the object for each sub image, and the deviation magnitude is set to a coefficient indicating the depth of the object. The depth estimation and correspondence determination unit 220 generates information in which the coefficients indicating the estimated depth are positioned at each pixel on the light field depth map LFDM. It is estimated that, the larger the depth coefficient is, the closer the object imaged in the pixel is positioned.

The light field depth map LFDM defines coefficients indicating the depth for each sub-pixels included in the light field image LFI. A light field depth map LFDM corresponding to the light field image LFI shown in FIG. 3B is shown in FIG. 3C. In the light field depth map LFDM map, a portion, which is in a more distant position (distant side of the rectangular parallelepiped) with regard to the light field image LFI imaging the rectangular parallelepiped object as shown in FIG. 3B, is indicated in a darker color, and a portion which is in a less distant position (front of the rectangular parallelepiped) is indicated in a lighter color. Hereinafter, similarly, in a depth map, a portion which is in a more distant position is indicated in a darker color, and a portion which is in a less distant position is indicated in a lighter color.

In addition, although the light field image LFI and the light field depth map LFDM are explained as separate pieces of information, the light field image LFI and the light field depth map LFDM may be one integrated graphic in which a pixel value (information held by the light field image LFI) and a depth coefficient (information contained in the light field depth map LFDM) are associated and imaged for a pixel positioned at the certain coordinates.

Although the light field depth map LFDM can be generated using any method which estimates the depth of each pixel of a multiple viewpoint image, the below described method is used in this embodiment.

The depth estimation and correspondence determination unit 220 further acquires corresponding information which determines the correspondence relationship between pixels (pixels to be reconstructed) which construct the reconstructed image before the composition modification (tentative reconstructed image) and sub-pixels. Corresponding information is the information which shows the sub-pixels (corresponding sub-pixels) in which an object at the position of the reconstructed image is arranged on the reconstruction plane indicated by a reconstruction setting.

The depth estimation and correspondence determination unit 220 may generate corresponding information by any known method which extracts corresponding sub-pixels of the pixels to be reconstructed (marked pixels). However, in this embodiment, the corresponding sub-pixels are extracted by the following light beam trace.

The method of light beam trace is described with reference to FIG. 4. The light beam from a marked portion P of an object (corresponds to a marked pixel) passes the principal point of the main lens, and reaches to a position to be reached of the micro lens array (main lens blur center MLBC on the sub lens in FIG. 4). The position on the sub lens of the main lens blur center MLBC can be acquired based on a photo shooting setting. An area, in which the light from a marked portion reached centering around the main lens blur center MLBC (main lens blur MLB, hatched area of FIG. 4), is acquired from the characteristic of the lenses. The diameter of the main lens blur MLB is calculated from a distance a1 between the main lens ML and the reconstruction plane RF, a distance b1 between the main lens and the imaging plane MIP (calculated from the distance a1 and the focal distance $f_{ML}$ of the main lens), a distance a2 between the imaging plane MIP and the sub lens array SLA, and an effective diameter ED of the main lens using triangular similarity.

Then, a sub lens SL, totally or partially included in the main lens blur MLB among the sub lenses SL included in the sub lens array SLA, is specified. The specified sub lens SL is sequentially chosen as a marked lens. An area w of a portion in which the main lens blur MLB overlaps with the marked lens is acquired from the position of the MLBC main lens blur, the diameter of the main lens blur MLB, and the position and size of the sub lens determined by the shooting setting information.

A pixel on a sub image (corresponding pixel) is extracted, the pixel is arranged at a position at which the light beam from a marked pixel is formed by the selected sub lens.

Specifically, a corresponding pixel (corresponds to the reaching point PE) is calculated in the following procedure.

First, the distance b1 to the focal plane of the main lens corresponding to the reconstruction plane RF can be calculated from the following formula (1) using the known distance a1 and the focal distance $f_{ML}$.

$$b1 = \frac{a1 \times f_{ML}}{a1 - f_{ML}} \quad (1)$$

Moreover, the distance a2 can be acquired by subtracting the distance b1 which is calculated using the formula (1) from the known distance c1.

Furthermore, using the distance a1 between the reconstruction plane RF and the main lens, distance b1 between the main lens and the imaging plane MIP, and a known distance x (distance between the marked portion P and an optical axis OA) using the following formulas (2), distance x', between the optical axis OA and an image forming point (imaging point PF) at which the marked portion P from the optical axis OA through the main lens ML forms an image, is calculated.

$$x' = x \times \frac{b1}{a1} \qquad (2)$$

Furthermore, a distance x" between the reaching point PE and the optical axis OA is calculated by applying, a distance d from the optical axis OA to the principal point of the marked sub lens SL, the distance x' calculated by using the above-mentioned formula (2), the distance c2 from the micro lens array LA to the imaging plane IE and the distance a2, to the following formula (3).

$$x'' = (d - x') \times \frac{c2}{a2} + d \qquad (3)$$

The reaching point PE is also calculated in the direction of Y-axis in a similar manner and specified. Pixels on the sub image corresponding to the reaching point PE are set to corresponding pixels. The area w acquired for the marked lens is set to be weights for the marked pixel and the corresponding pixel.

A corresponding list which is an example of corresponding information is shown in FIG. 5. The corresponding list of FIG. 5 associates and records the coordinates (xr, yr) on the reconstructed image of the pixels to be reconstructed, coordinates (xs, ys) and weights (w) on the light field image LFI of the sub-pixels extracted by the light beam trace for the pixels to be reconstructed of the coordinates. A plurality of sub-pixels are extracted for one pixel to be reconstructed. For example, in the example of FIG. 5, the $k_1$ sub-pixels located at (xs (1, 1), ys (1, 1))~(xs (1, $k_1$), ys (1, $k_1$)) are extracted for a first pixel to be reconstructed (coordinates (1, 1)). The strengths (weights) of correspondence of the extracted sub-pixels and pixels to be reconstructed are W (1, 1)~W(1, $k_1$).

The depth estimation and correspondence determination unit 220 transmits such corresponding information, the light field image LFI and the light field depth map LFDM to the image generating apparatus 30.

The image generating apparatus 30 generates an image in which the composition of an object is converted and reconstructed (a converted and reconstructed image) using the light field image LFI and the light field depth map LFDM transmitted from the image processor 210.

Moreover, the image generating apparatus 30 outputs the generated converted and reconstructed image to the image storage 430 of the storage 40. The details of the configuration of the image generating apparatus 30 and a process which generates the converted and reconstructed image are described later.

The image controller 230 controls the imager 10 based on the image setting information stored in the image setting storage 410 of the storage 40, and photo shoots an object OB using the imager 10.

The storage 40 includes a main storage which includes RAM and the like, and an external storage which includes a non-volatile memory such as a flash memory, a hard disk and the like.

The main storage loads a control program and information which are stored in the external storage, and is used as the workspace of the information processor 20.

In advance, an external storage stores the control program and information which allow the information processor 20 to perform the following process, and transmits the control program and information to the main storage according to instructions of the information processor 20. The external storage stores the information based on the process of the information processor 20 and the information transmitted from the interface 50 according to the instructions of the information processor 20.

Functionally, the storage 40 includes an image setting storage 410, a reconstruction setting storage 420, and an image storage 430.

The image setting storage 410 stores image setting information. The image setting information, as an imaging parameter which may be varied at the time of imaging, includes the distance between the main lens ML and the sub lens array SLA, the focal distance $f_{ML}$ of the main lens, information specifying exposure time, F value, a shutter speed, and the like. Moreover, the image setting storage 410 stores information regarding the physical configuration of the digital camera 1 such as the positions of each sub lens SLs on the sub lens array SLA, the distance c2 between the sub lens array SLA and the imaging plane IE and the like.

The image setting storage 410 transmits an imaging parameter to the image controller 230.

Moreover, the image setting storage 410 adds the image setting information of the light field image LFI imaged by the imager 10 to the information regarding the physical configuration, and transmits to the image processor 210 as shooting setting information.

The reconstruction setting storage 420 stores a setting parameter for generating an image reconstructed from the light field image LFI. The setting parameter is set as a default value or inputted by the user using the operator 530.

The image storage 430 stores an output image generated by the image generating apparatus 30. The image storage 430 transmits a stored image to the I/O device 510 and the display 520 of the interface 50.

The interface (described as an I/F part in the diagram) 50 is a configuration of an interface interfacing the digital camera 1 with the user, or with an external device, and includes the I/O device 510, the display 520, and the operator 530.

The I/O device (input/output device) 510 physically includes a Universal Serial Bus (USB) connector, a video output terminal, and an input-output controller. The I/O device 510 outputs the information stored by the storage 40 to an external computer, and transmits the information transmitted from outside to the storage 40.

The display 520 includes a liquid crystal display, an organic Electro Luminescence (EL) display and the like, and displays the screen for inputting the imaging parameter stored by the image setting storage 410, and the screen for operating the digital camera 1. Moreover, the display 520 displays an image stored by the image storage 430.

The operator 530 includes a transmitter which detects information regarding, for example, various buttons disposed in the digital camera 1, a touch panel disposed on the display 520 and the operations performed on the various buttons and/or the touch panel, and transmits the information regarding the user operation to the storage 40 and the information processor 20.

Then, the configuration of the image generating apparatus 30 is described with reference to FIG. 6A and FIG. 6B.

The image generating apparatus 30 physically includes an information processor 31, a main storage 32, an external storage 33, an input and output device 36, and an internal bus 37 as shown in FIG. 6A.

The information processor 31 includes a Central Process Unit (CPU) and a Random Access Memory (RAM).

The main storage 32 has a physical configuration similar to the main storage of the storage 40. The external storage 33 has a physical configuration similar to the external storage of the storage 40 and stores a program 38. The input and output device 36 includes an input/output terminal and an I/O device, and realizes input and output of information regarding the image generating apparatus 30, each part of the information processor 20, the storage 40, the interface 50 and the like. The internal bus 37 connects the information processor 31, the main storage 32, the external storage 33, and the input and output device 36.

The information processor 31, the main storage 32, the external storage 33, the I/O device 36 and the internal bus 37 may be functional blocks realized by the internal circuit of the information processor 20 of the digital camera 1, the storage 40, and the interface 50.

The image generating apparatus 30 copies the program 38 and data stored in the external storage 33 to the main storage 32 and performs a process for generating the converted and reconstructed image which is mentioned later through the information processor 31 executing the program 38 using the main storage 32.

The image generating apparatus 30 functions as an input device 310, a reconstructed image generator 320 and an output device 330 with the above physical configuration as shown in FIG. 6B.

The input device 310 is a part which takes charge of a function in which the image generating apparatus 30 acquires information from each part of the digital camera 1. The input device 310 includes a reconstruction setting acquirer 3110, an LFDM acquirer 3120, an LFI acquirer 3130, a corresponding information acquirer 3140 and a modification operation acquirer 3150.

The reconstruction setting acquirer 3110 acquires reconstruction setting information from the reconstruction setting storage 420. The information reconstruction setting information includes information which describes the specific details of the reconstruction process and information necessary for the image generation process as described below (information indicating a reconstruction parameter and a threshold value). In this embodiment, a reconstruction parameter presupposes to generate the reconstructed image through the following processes.

i) A plurality of layer reconstructed images reconstructed using the pixels, each of the pixels has a depth coefficient within a predetermined range, is generated once. A tentative reconstructed image is generated by superposing each of layer reconstructed images.
ii) A tentative reconstructed image is displayed and a user's composition modification operation is accepted.
iii) An image whose composition has been changed is reconstructed and output based on the composition modification operation.

For this reason, the reconstruction parameter includes information which specifies the distance between the focal point of a new image and the main lens ML (distance to be reconstructed, distance a1), a range of the depth coefficients corresponding to each layer, and the like.

The LFDM acquirer 3120 acquires the light field depth map LFDM from the depth estimation and correspondence determination unit 220.

The LFI acquirer 3130 acquires the light field image LFI generated by the image processor 210.

The corresponding information acquirer 3140 acquires corresponding information (corresponding list of FIG. 5) from the depth estimation and correspondence determination unit 220.

The modification operation acquirer 3150 receives, from the operator 530, the information regarding an operation instructing a composition modification of the reconstructed image from the operator 530.

Each part of the input device 310 transmits the acquired information to each part of the reconstructed image generator 320.

According to the reconstruction setting information acquired by the reconstruction setting acquirer 3110 and the modification operation information acquired by the modification operation acquirer 3150, the reconstructed image generator 320 generates the reconstructed image in which the composition of an object has been changed, from the light field depth map LFDM acquired by the LFDM acquirer 3120, the light field image LFI acquired by the LFI acquirer 3130 acquired and the corresponding information acquired by the corresponding information acquirer 3140.

In the present embodiment, a tentative reconstructed image which is an initial reconstructed image whose composition has not been changed, is generated once, and is then output. When a user performs a composition modification operation using the tentative reconstructed image, the converted and reconstructed image which is a reconstructed image whose composition has been changed is generated. In conjunction with the generation of the converted and reconstructed image, a reconstructed depth map which defines the depths of each pixel is also generated.

For this reason, the reconstructed image generator 320 includes a layer determiner 3210, a layer image generator 3220, a tentative reconstructed image generator 3230, a conversion pixel extractor 3240, a conversion matrix determiner 3250, a converter 3260, and a converted and reconstructed image generator 3270.

The layer determiner 3210 defines the layers of a reconstructed image (both for a tentative reconstructed image and a converted and reconstructed image). That is, the images corresponding to the depths (depth coefficients) within a predetermined range are allocated to each layer, setting the reconstructed image as an image on which a plurality of layers are superimposed. Layer images having the same resolution as the (tentative) reconstructed image are placed on each layer. The number of layers defined by the layer determiner 3210 and the depth coefficients allocated to each layer are determined by the reconstruction setting.

In the present embodiment, three layers are defined and the assumable depth coefficient in a design is divided into three, and allocated to the three layers respectively. Among the three layers, the most distant layer is referred to as a layer 1, the middle distant layer is referred to as a layer 2 and the closest layer is referred to as a layer 3.

The layer determiner 3210 transmits the information regarding the defined layer to the layer image generator 3220.

The layer image generator 3220 generates images of each layer (layer images) as follows:
(1) One of the pixels constructing a layer image (layer pixels) is set to a marked pixel and corresponding sub-pixels of the pixel to be reconstructed which corresponds to the coordinates of the marked pixel are acquired with reference to the corresponding information, and are set as corresponding pixel candidates.

(2) The depth coefficient of the corresponding pixel candidate is acquired with reference to the light field depth map LFDM.
(3) Among the corresponding pixel candidates, a pixel, which is within the range in which a depth coefficient is allocated to the layer, is extracted as the corresponding pixel of the marked pixel and its pixel value is acquired.
(4) An acquired pixel value multiplied by a weighting coefficient is set to be a corrected pixel value.
(5) Corrected pixel values are calculated and summed for all the extracted corresponding pixels.
(6) The sum of the corrected pixel values is divided by the sum of the overlap areas (sum of weights) to be the pixel value of the marked pixel. When there is no corresponding pixel (or less than a predetermined threshold value), the pixel value is set to NULL.
(7) The above processes (1)-(6) are performed for each layer pixel of each layer, and pixel values are determined.

The layer image generator 3220 further generates the depth map of each layer image. Specifically, the layer image generator 3220 sets the depth coefficient of the light field depth map LFDM as a pixel value, extracts a corresponding pixel in a similar manner as the layer image, and the corresponding pixel is weighted and added in order to set the depth coefficient of each layer pixel. Or, among the depth coefficients of the corresponding pixels, a mode may be a depth value of the pixels to be reconstructed.

The layer image generator 3220 transmits the generated layer image and layer depth map to the tentative reconstructed image generator 3230.

The tentative reconstructed image generator 3230 generates a tentative reconstructed image (the reconstructed image before the composition modification, RI1) by superimposing layers. Moreover, a reconstructed depth map (RDM1) is generated from the layer depth map.

Figure 7A:
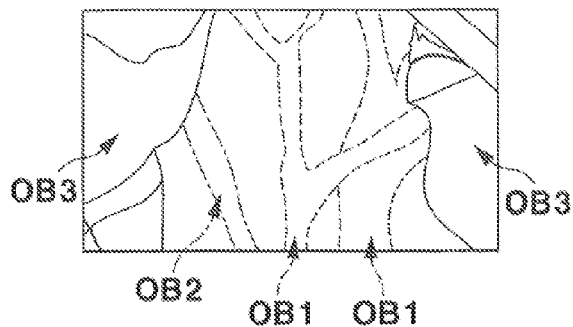
FIG. 7A is an illustration showing objects regarding the embodiment 1.

This process is described with reference to FIG. 7A through FIG. 7C. The imager 10, as shown in FIG. 7A, is assumed to shoot images a distant object OB1 (dashed line), object OB2 (alternate long and short dash line) in a medium position, and a near object OB3 (solid line). The object OB1 is assumed to be positioned in the range indicated by the depth coefficient allocated to the layer 1 (the distance from the main lens ML is within a predetermined range). The object OB2 and object OB3 are assumed to be positioned in the range indicated by the depth coefficients allocated to the layers 2 and 3, respectively in a similar manner.

Figure 7B:
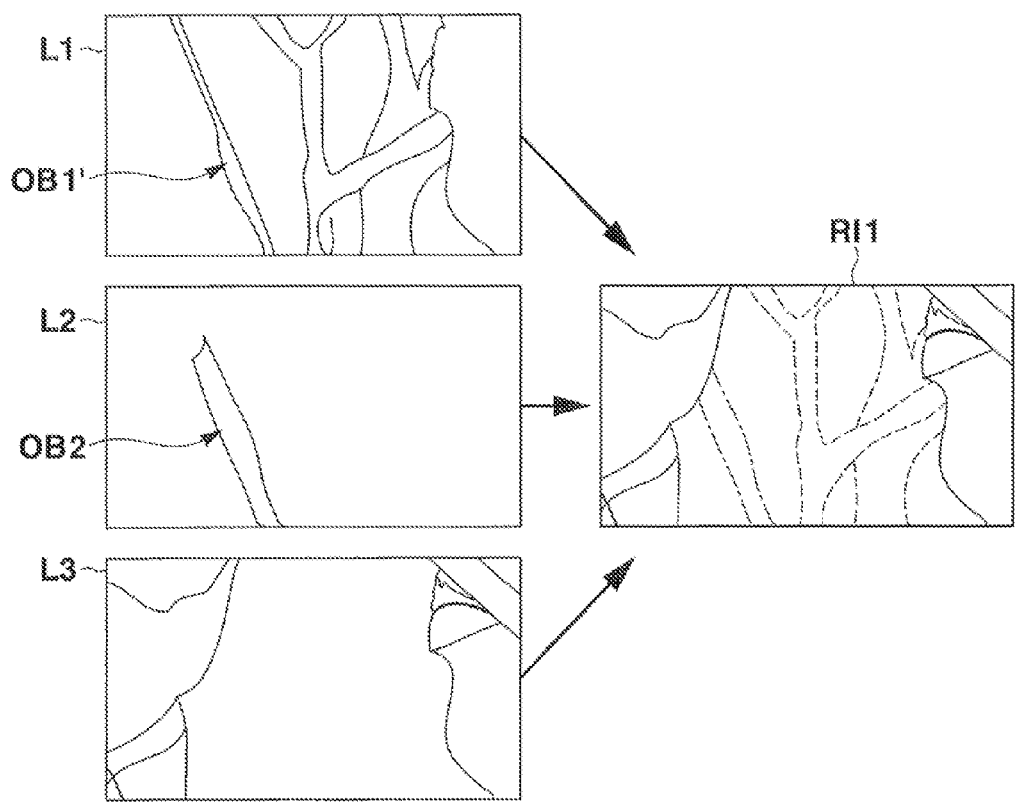
FIG. 7B is an illustration showing layers and a reconstructed image.
Figure 7C:
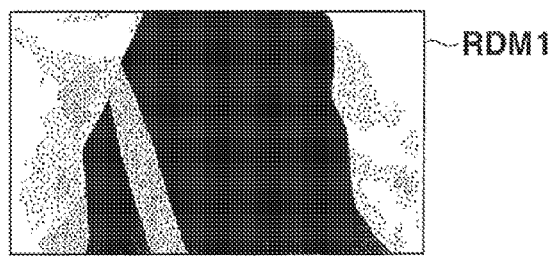
FIG. 7C is an illustration showing a reconstructed depth map.

In this case, from the light field image LFI and the light field depth map LFDM, the layer image generator 3220 generates a layer image 1 (L1) for the layer 1, a layer image 2 (L2) for the layer 2, and a layer image 3 (L3) for the layer 3, respectively (FIG. 7B). In each layer image, the pixel value of the layer pixel which does not have an object in the corresponding depth range is NULL, and when superimposed, the pixel value is to be processed through the transmissive process.

The tentative reconstructed image generator 3230 sets the pixel value of the pixel which constructs the tentative reconstructed image (tentative pixels to be reconstructed) to the pixel value of the closest layer whose pixel value is not NULL among the pixels of each layer of the same coordinates. This process is performed for all the tentative pixels to be reconstructed to generate the tentative reconstructed image (RDM1). This process is referred to as superimposition process. A reconstructed depth map (RDM1) is generated by superimposing layer depth maps (FIG. 7C) in a similar manner.

In this case, an object hidden by the object of the layer corresponding to a closer position (for example, layer 2) is imaged on a layer corresponding to a position distant from the main lens ML (for example, layer 1) when superimposed without any composition modification. In the example of FIG. 7B, the object OB1' is imaged on the layer 1. However, as the object OB2 exists on the layer 2 corresponding to a closer position, the OB1 is not imaged in the tentative reconstructed image (RI1). Although the object OB1' is visible from some sub lenses (viewpoint at which a certain sub image is shot), the object is not visible from other sub lenses. Thus, a phenomenon, in which an object which is imaged in a certain sub image but not imaged in other sub images is generated due to the differences of the viewpoints, is referred to as an occlusion. Moreover, the sub-pixels corresponding to such an object is referred to as occlusion pixels.

As the light field image LFI is constructed from a plurality of sub-pixels respectively shot from different viewpoints, occlusion pixels are included. When shot from one viewpoint, the object corresponding to occlusion pixels cannot acquire the information hidden by a closer object. The digital camera 1 according to the present embodiment shoots such a hidden object by photo shooting the object from a plurality of viewpoints (corresponding to each sub lens), and forms an image onto a distant layer. This image is used in order to generate a reconstructed image whose composition has been changed.

The tentative reconstructed image generator 3230 transmits the generated tentative reconstructed image (RI1) to the output device 330 to output. Moreover, the tentative reconstructed image generator 3230 transmits the tentative reconstructed image (RI1) and the reconstructed depth map (RDM1) to the conversion pixel extractor 3240. The output device 330 stores the tentative reconstructed image (RI1) in the image storage 430 to display on the display 520.

The display 520 shows a user a tentative reconstructed image (RI1), and the operator 530 accepts an operation for choosing an object on the tentative reconstructed image (RI1) and an operation which modifies the position and size of the chosen object (composition modification operation) from the user. The modification operation acquirer 3150 acquires the received operations. The conversion pixel extractor 3240 extracts an area occupied by the object whose composition is to be modified in each layer (the layer in which the image of the object exists, and the layer pixels) based on the operations acquired by the modification operation acquirer 3150.

Figure 8A:
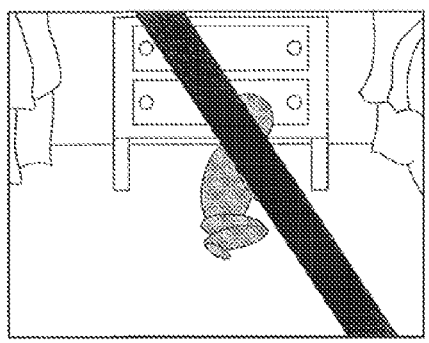
FIG. 8A to FIG. 8G are illustrations for explaining operations of instructing composition modifications regarding the embodiment 1.
Figure 8B:
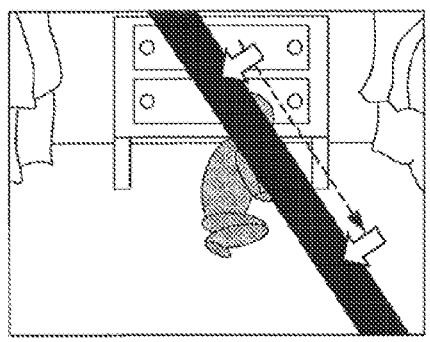

Operation reception process is described with reference to the examples of FIG. 8A through FIG. 8G. It assumes that a tentative reconstructed image (RI1) contains the (white) background, a (gray) child that exists near the focal plane RF, and a (black) obstacle close to the child as shown in FIG. 8A. The user who observed the tentative reconstructed image (RI1) displayed by the display 520 displays desires to move or to reduce the obstacle close to the child in order not to block the image of the child in viewing the image. On this screen, the user first chooses an object by an operation such as tracing the obstacle and the like on a touch panel (the display 520 and the operator 530) as shown in FIG. 8B. The conversion pixel extractor 3240 extracts the layer pixels corresponding to the object selected based on this operation (that is, the corresponding sub-pixels) as pixels to be converted. In addition, a white arrow shows an operation with the finger on a touch panel. The process which extracts pixels to be converted from this operation is mentioned later.

Figure 8C:
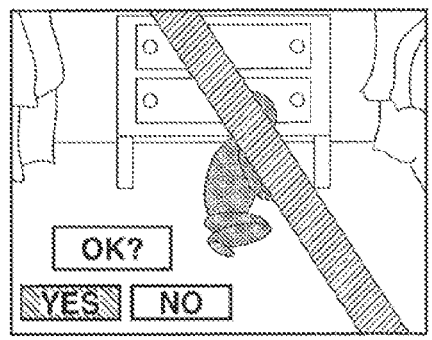

The display 520 highlights and displays the pixels to be reconstructed corresponding to the pixels to be converted and allows the user to choose whether or not the selected object is correct using a dialog box (FIG. 8C). If the user determines that the selected object is a mistake, the user touches the "NO" portion. In this case, the selection is reset and the digital camera 1 awaits a new selection operation. On the other hand, when the present selection is correct, the user touches the "YES" portion to fix an object to be converted (corresponds to the pixel to be converted).

When the pixel to be converted is fixed, then, the user performs an operation defining conversion parameter. First, the user chooses how the composition of an object to be converted is modified using the operator 530. Suppose that, in the present embodiment, the user chooses one of movement, rotation and expansion/reduction functions.

Figure 8D:
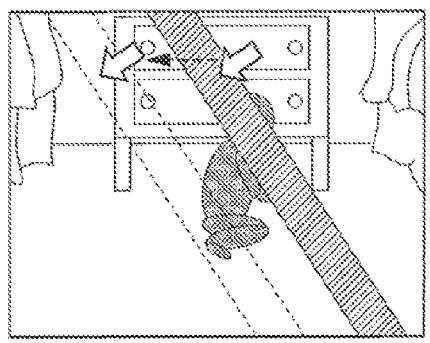
Figure 8E:
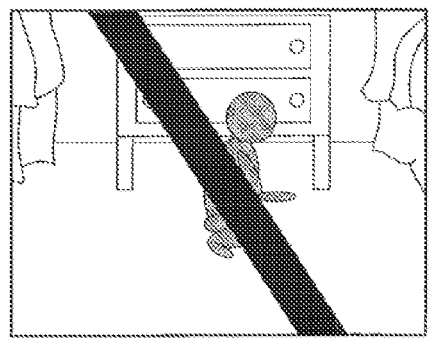

For example, when a movement is chosen, the user performs an operation of specifying a moving direction and a moving distance. FIG. 8D shows the operation which moves an object to be converted (obstacle) in the specified quantity in the left direction on a touch panel as an example of such an operation. In response to such an operation, the image generating apparatus 30 generates the reconstructed image (converted and reconstructed image) in which the obstacle is moved as shown in FIG. 8E.

Figure 8F:
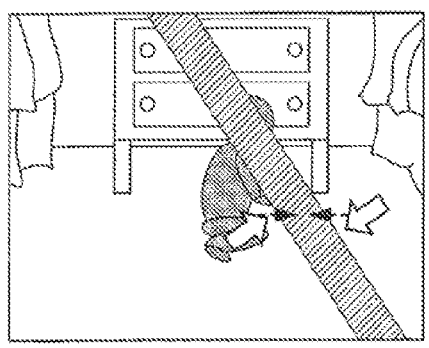
Figure 8G:
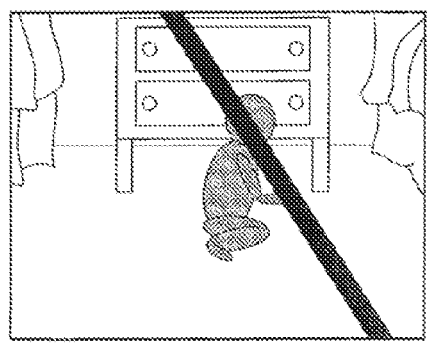

Moreover, when a reduction is chosen, the operation of specifying the direction of reduction (length or width) and the grade of reduction is performed. FIG. 8F shows an example of the operation which reduces the selection area in a lateral direction by the operation of pinching the selection area with two fingers. In response to the above operation, the image generating apparatus 30 generates a reconstructed image (converted and reconstructed image) in which the obstacle is reduced as shown in FIG. 8G The user can further instruct a composition modification on the reconstructed image whose composition has been changed as shown in FIG. 8E or FIG. 8G and repeat composition modifications until an image of a desired composition is obtained.

In addition, this operation is not limited to the operation on a touch panel, and, for example, parameters such as a moving distance and the like may directly be input through a dialog box.

The conversion matrix determiner 3250 defines the parameter for the conversion (conversion matrix) from the modification operation acquired by the modification operation acquirer 3150.

The affine transformation matrix in the formula (4) is described as an example of a conversion matrix.

$$\begin{pmatrix} x' \\ y' \end{pmatrix} = \begin{bmatrix} a1 & b1 & d1 \\ a2 & b2 & d2 \end{bmatrix} \begin{pmatrix} x \\ y \\ 1 \end{pmatrix} \quad (4)$$

In addition, x and y are coordinates in a conversion layer of the pixels to be converted before the conversion, and x' and y' are the coordinates after the conversion. Layer pixels are the pixels which associate pixels to be reconstructed and sub-pixels for each depth. Therefore, converting the coordinates of the layer pixels is equal to changing the correspondence relationship between the pixels to be reconstructed and the sub-pixels.

Each element of the affine transformation (conversion matrix) can be acquired by a general method which determines each element of the affine transformation matrix from the conversion method and its parameter. For example, when moved parallel by x1 pixels in the direction of x axis, a1 and b2 are set to 1, d1 is set to x1, and b1, a2 and d2 are set to 0. When reduced to ½ in the y direction, a1 is set to 1, b2 is set to ½, and d1, b1, a2 and d2 are set to 0. When rotated by an angle θ, a1 and b2 are set to cos θ, b1 is set to minus sin θ and a2 is set to sin θ.

In addition, the center of expansion, reduction, and rotation can be freely set by carrying out coordinate conversion of the coordinates of (x, y) and (x', y') in advance such that the origin is set to a desired center. In the present embodiment, the weighted center of the area to be converted is defined, and supposes that affine transformation is performed using the formula (4) after performing a coordinate conversion so that rotation, expansion, and reduction can be performed focusing on the weighted center.

Specifically, suppose that the coordinates of the weighted center are (xc, yc) and the coordinates of the pixel to be converted are (x1, y1). (x', y') are calculated by setting, (x, y)=(x1−xc, y1−yc), using the formula (4). After the calculation, xc is added to x' and yc is added to y' to be the final calculation result. In addition, "the weighted center" here is the result of an average of the summed coordinate values of all the pixels to be converted.

In addition, the method of determining each element of the matrix of affine transformation can be substituted for any known method. For example, it is possible to use a method in which a user specifies three points in the selection area and the moved portion of the three points, and generate a matrix based on the moving vector of the points.

Moreover, a user may directly input each element of the determinant. The conversion matrix determiner 3250 transmits the information indicating the defined matrix to the converter 3260.

The converter 3260 modifies a composition of an object on the layer (conversion layer) in which a conversion area exists using the conversion matrix transmitted from the conversion matrix determiner 3250. The depth map of the conversion layer is also converted in a similar manner accompanied by the conversion of the composition of the object. The converter 3260 may perform a composition conversion in any known method in which a composition of an image is converted using a conversion matrix. However, specifically, composition conversions are realized by the process mentioned later.

The converter 3260 transmits to the converted and reconstructed image generator 3270 the converted layer image and the depth map.

The converted and reconstructed image generator 3270 determines the pixel values of each pixel of the converted and reconstructed image (RI2) whose composition has been converted, and generates a converted and reconstructed image. The converted and reconstructed image generator 3270 generates the depth map corresponding to a converted and reconstructed image (RI2) (a converted and reconstructed depth map, RDM2) in a similar manner. Specifically each layer image transmitted from the converter 3260 is superimposed to determine the pixel values of each pixels to be reconstructed-dimilar to the tentative reconstructed image generator 3230. A converted and reconstructed depth map (RDM2) is generated for a depth coefficient by being superimposed in a similar manner. Examples of the converted and reconstructed image (RI2) and the converted and reconstructed depth map (RDM2) which were generated through the above process are described with reference to FIG. 9A through FIG. 9D.

Figure 9A:
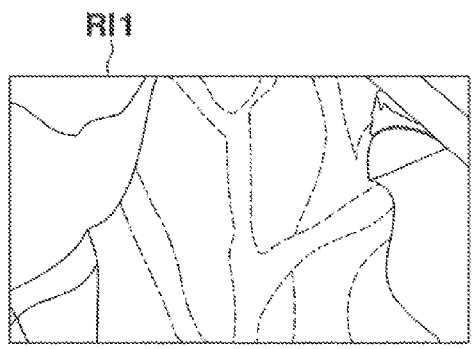
FIG. 9A is an illustration showing a tentative reconstructed image regarding the embodiment 1.
Figure 9B:
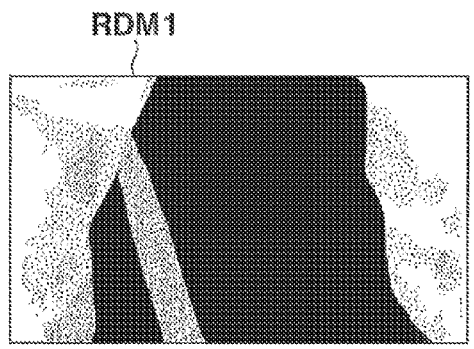
FIG. 9B is an illustration showing a tentative reconstructed depth map.
Figure 9C:
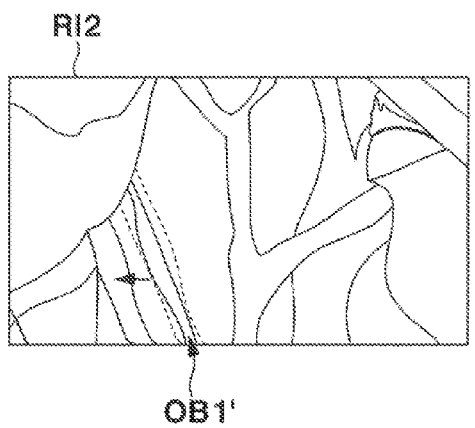
FIG. 9C is an illustration showing a converted and reconstructed image.

FIG. 9A shows a tentative reconstructed image (RI1). FIG. 9B shows the reconstructed depth map (RDM1) of a tentative reconstructed image (RI1). The parts (nearby object) indicated by solid lines are (white) parts with a large depth coefficient on a reconstructed depth map (RDM1). These parts correspond to the layer 3 (closest layer).

On the other hand, the part (more distant object) indicated by the alternate long and short dash line corresponds to the layer 2. This part is indicated in gray on the reconstructed depth map (RDM1). The pixel of the same part of the layer 3 has a NULL value because there are no corresponding sub-pixels.

The parts of an object (background) indicated by dashed lines are shown in a darker color in the reconstructed depth map (RDM1). In these parts, as the pixels of the layer 3 and the layer 2 have NULL values, the pixels of the layer 1 appear in the pixels to be reconstructed.

Suppose that a user performs an operation of moving the object of the layer 2 to the left. In response to this operation, an image in which the object of the layer 2 generated by the image generating apparatus 30 is moved to the left is a converted and reconstructed image (RI2) of FIG. 9C.

Figure 9D:
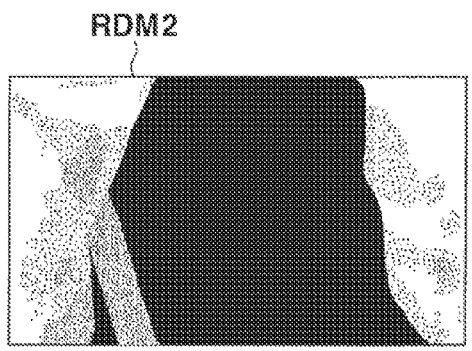
FIG. 9D is an illustration showing a converted and reconstructed depth map.

With the movement of the object of the layer 2, the gray part corresponding to the layer 2 is also moved to the left in the converted and reconstructed depth map (RDM2, FIG. 9D). Here, the source part (before the movement) is complemented with the pixel values of the pixels corresponding to a more distant object (pixels of the layer 1). As a result, the object OB1' of the layer 1 appears on a converted and reconstructed image (RI2).

Moreover, when a closer object (OB3) exists in the destination for the movement of an object (OB2), the moved object (OB2) is hidden by a closer object (OB3).

Specifically, when the pixels corresponding to the layer which corresponds to a near position (layer 3) do not have NULL values, the pixel value of the converted and reconstructed image (RI2) of the part is overwritten with the pixel value of the layer corresponding to the near position (layer 3) by a superimposition process, and the pixels corresponding to a more distant layer (layer 2) do not appear on the converted and reconstructed image (RI2).

As the layer depth map is also modified, in the converted and reconstructed depth map (RDM2), the originally positioned part is darker (having a smaller depth coefficient) than before the movement. Moreover, pixels having larger depth coefficients are given priority in the destination part of the movement (after movement). As a result, if there are pixels having larger depth coefficients in the destination part of the movement, the pixels corresponding to the moved object are hidden by the pixels having larger depth coefficients, and if there are pixels having smaller depth coefficients, the pixel values are overwritten.

The converted and reconstructed image generator 3270 determines the pixel values of each pixel of the converted and reconstructed image to generate the converted and reconstructed image in this way, and outputs to the output device 330 the generated converted and reconstructed image (RI2).

The output device 330 stores the converted and reconstructed image (RI2) transmitted from the converted and reconstructed image generator 3270 to the image storage 430. Then, the display 520 displays the converted and reconstructed image (RI2).

Then, a process which the digital camera 1 performs is described with reference to a flow chart. The digital camera 1 starts the image output process shown in FIG. 10, when a user photo shoots an object using the imager 10.

In the image output process, the image processor 210 first generates the light field image LFI from the image information acquired from the imager 10, and the shooting setting information acquired from the image setting storage 410 (Step S101). Then, the generated light field image LFI and the shooting setting information are transmitted to the depth estimation and correspondence determination unit 220.

Then, the depth estimation and correspondence determination unit 220 acquires shooting setting information. Furthermore, the depth estimation and correspondence determination unit 220 acquires reconstruction setting information from the reconstruction setting storage 420 (Step S102). The acquired photo shooting setting and reconstruction setting are transmitted also to the image generating apparatus 30.

The depth estimation and correspondence determination unit 220 estimates the depth for each sub-pixel which constructs the light field image LFI. Moreover, the image generating apparatus 30 acquires the light field depth map LFDM in which the depth coefficients are arranged (Step S103).

Specifically, the depth estimation and correspondence determination unit 220 estimates the depth of the corresponding object for each sub-pixel which constructs the light field image LFI, and generates a light field depth map LFDM which associates the depth coefficients indicating the estimated depth with the sub-pixels.

Here, a depth coefficient may be calculated using any method of estimating the distance to the object corresponding to the pixels of the light field image LFI. However, in the present embodiment, depth coefficients are calculated in the following method:

i) A certain sub image which constructs the light field image LFI is set to be a marked sub image.

ii) The marked sub image is divided into the image areas constructed by the pixels whose pixel value differences are included in the predetermined range. Then, one of the image areas is chosen as a marked area.

iii) The sub image on the right-hand side of the marked sub image (on the left-hand side if there is no sub image on the right-hand side, in this case henceforth, right and left are reversed) is set to SR1, SR2, ~SRk in the positional order. In addition, k is set to a natural number.

iv) The coordinates (x, y) of the weighted center of the marked area in a marked sub image is acquired. In addition, these coordinates are defined with regard to the independent coordinate systems for each sub image whose center is the origin.

v) The present pixel deviation is set to "d". In the sub image SR1, the area corresponding to the marked area of the marked sub image (corresponding area) is arranged. The weighted center of the corresponding area is deviated by "d" to the right side and placed at this point. The sum of squares of difference (SSD) between the pixel values of each pixel of a marked area and the pixel values of the corresponding pixels of the corresponding area is calculated. The corresponding area is deviated by "2d" to the right side, placed in the SR2, and the SSD is calculated in a similar manner. SSDs are acquired up to SRk, respectively and the absolute value sum of each SSD (SSSD) is acquired which is set to be the evaluated value of "d".

vi) The evaluated values for each pixel deviation "d" in the range of possible disparity are calculated. Among them, the pixel deviation (d) having the minimum absolute difference value sum SSSD acquired is set to the pixel deviation coefficient of the pixel included in the marked area.

vii) Pixel deviation coefficients for all the pixels of all the sub images are calculated, and the calculated pixel deviation coefficients are arranged in the parts of corresponding pixels as depth coefficients of the light field depth map LFDM.

The pixel deviation coefficients for each pixel can determine the positions in the other images of the pixels corresponding to the marked portion of a certain image, and can be acquired by any known method which calculates the deviation of mutual position. The pixel deviation coefficient calculated through the above stated process indicates that the object corresponding to marked sub-pixels appear as images in different positions for each image according to the difference of the viewpoints from which each sub image is shot, and indicates the estimated result of the positional differences (sub image disparity).

Here, the positional difference of the viewpoints for each sub image (sub lens) is referred to as the lens disparity, and the difference of the position at which the corresponding images which are generated by the lens disparity appear is referred to as image disparity. The greater the lens disparity is, the greater the image disparity becomes. Moreover, the greater the depth (distance between a viewpoint and an object) is, the less the image disparity becomes. When the lens disparity is known in each sub image as in the present embodiment, the image disparity (deviation coefficient) can be set to the depth coefficient which shows the estimated depth.

Then, the depth estimation and correspondence determination unit 220 generates the corresponding list shown in FIG. 5 by a light beam trace described in FIG. 4 and acquires the corresponding list generated by the image generating apparatus 30. (Step S104).

After acquiring a light field depth map LFDM at Step S103 and a corresponding list at Step S104, then the image generating apparatus 30 starts a process (tentative reconstructed image generation process) that generates a tentative reconstructed image (RI1) using the light field image LFI, the light field depth map LFDM, and a corresponding list (Step S105). Here, a tentative reconstructed image generation process 1 shown in FIG. 11 is performed.

In the tentative reconstructed image generation process 1, the layer determiner 3210 acquires each layer specified by reconstruction setting information first (Step S201). Ranges of the depth coefficients instructed by the reconstruction setting acquired by the reconstruction setting acquirer 3110 are allocated to each layer. Moreover, layer images having the same resolution as the reconstructed images (RI1 and RI2) are arranged for each layer. For example, in the depth coefficients (pixel deviation coefficients), 0-3 to a layer 1, 4-7 to a layer 2 and 8-N (N is a depth coefficient corresponding to the maximum image disparity able to be set) to a layer 3 are allocated.

In addition, the number of layers and the depth coefficient allocated to each layer can be set up freely. Moreover, the layer determiner 3210 may determine the ranges of the depth coefficient belonging to each layer by clustering which use the depth coefficients of each pixel of the light field depth map LFDM. Any known clustering methods such as a method in which k-average algorithm is used and/or the ward method, can be used.

Then, the layer image generator 3220 chooses a marked layer from the layer defined at Step S201 (Step S202). Furthermore, a marked layer pixel is chosen from the pixel included in a marked layer (layer pixel) (Step S203).

Then, the layer image generator 3220 extracts the corresponding pixel corresponding to the marked layer pixel from sub-pixels (Step S204). Specifically, in the corresponding list of FIG. 5, the sub-pixels registered in a row in which the coordinates of the pixels to be reconstructed match with the coordinates of the marked layer pixels are set to be corresponding candidate pixels. In the corresponding candidate pixels, the pixels included in the range in which the depth coefficient defined by the light field depth map LFDM is allocated to the marked layer are extracted as corresponding pixels.

Then, the layer image generator 3220 calculates the pixel value of the marked layer pixel (Step S205). Specifically, the arithmetic weighted mean, of the pixel values of each corresponding pixel extracted at Step S204, is acquired by using the weights of each corresponding pixel. The acquired value is set to be the pixel value of the marked layer pixel. When the number of corresponding pixels is equal or less than a predetermined threshold value, the pixel value is set to be NULL. This threshold value is defined by reconstruction settings.

The layer image generator 3220 calculates the depth coefficient of a marked layer pixel in a similar manner (Step S206). Specifically, the arithmetic weighted mean, of the depth coefficient defined by the light field depth map LFDM for each corresponding pixel extracted at Step S204, is acquired by using the weights of each corresponding pixel. The acquired value is set to be the depth coefficient of the marked layer pixel.

Then, whether or not the above-mentioned process has been completed is determined for all the layer pixels of the marked layer as the marked pixels (Step S207). When there is an unprocessed layer pixel (Step S207; NO), the process is repeated from Step S203 for the next unprocessed layer pixel. On the other hand, if all the layer pixels have been processed (Step S207; YES), the process is completed for the layer and the process proceeds to Step S208.

At Step S208, whether or not the above-mentioned process has been completed is determined for all the layers defined at Step S201 as the marked layers. When there is an unprocessed layer (Step S208; NO), the process is repeated from Step S202 for the next unprocessed layer. On the other hand, if all the layers have been processed (Step S208; YES), the generation process of layer images for all layers can be determined to have completed and the process proceeds to Step S209.

At Step S209, the tentative reconstructed image generator 3230 superimposes layer images, and generates a reconstructed image (a tentative reconstructed image, RI1). Specifically, the pixels corresponding to each layer image (corresponding layer pixels) are extracted for each pixel (pixels to be reconstructed) thereby constructing the tentative reconstructed image (RI1). In the corresponding layer pixels extracted, the pixel values of the pixels belonging to the layer closest to the main lens ML whose pixel value is not NULL (layer having a large allocated depth coefficient) are set to be the pixel values of the pixels to be reconstructed. If this process is performed for all the pixels to be reconstructed and pixel values are determined, a tentative reconstructed image (RI1) can be generated. Then, the tentative reconstructed image generation process 1 is completed.

Returning to FIG. 10, a tentative reconstructed image is generated at Step S105. The reconstructed image generated by the output device 330 is then output (Step S106), and the output device 330 allows the display 520 to display the reconstructed image.

Then, regarding the tentative reconstructed image displayed at Step S106, the image generating apparatus 30 performs a process in which the composition modification operation operated by a user is accepted, the pixels to be converted are extracted based on the operation, and the modification parameter is defined (conversion setting acquisition process, conversion setting acquisition process 1 in this case) (Step S107).

Figure 12:
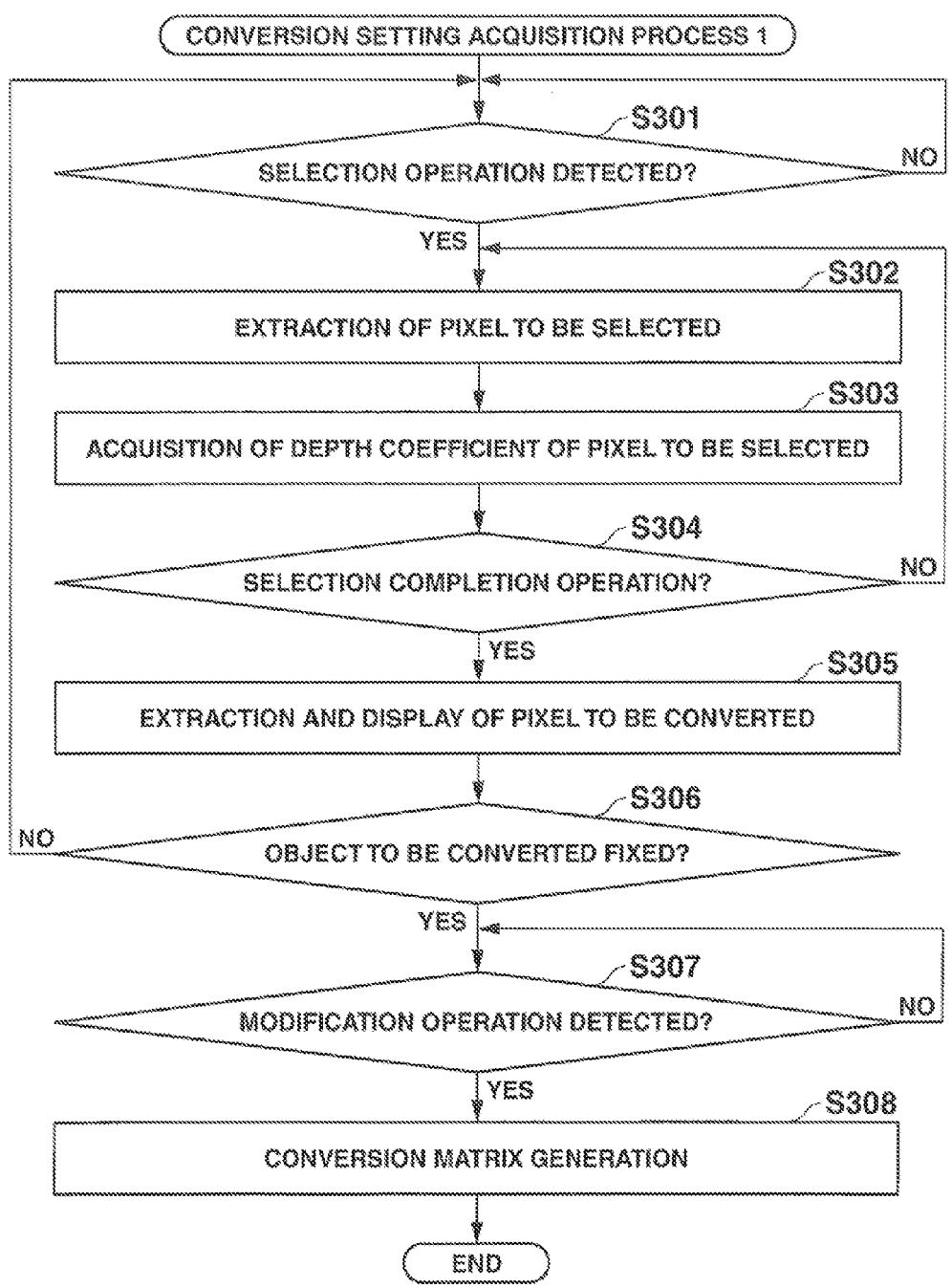
FIG. 12 is a flow chart which shows the conversion setting acquisition process of the embodiment 1.

The conversion setting acquisition process 1 performed at Step S107 is described with reference to FIG. 12. In the conversion setting acquisition process 1, the modification operation acquirer 3150 determines first whether or not the operation for choosing an object to be converted by a user has been detected (Step S301). Specifically, whether or not the modification operation acquirer 3150 can detect an operation by the user touching the tentative reconstructed image (RI1) on the touch panel which is constructed with the display 520 and the operator 530.

When the operation cannot be detected (Step S301; NO), Step S301 is repeated and the system waits for the detection of the operation.

On the other hand, when a selection operation can be detected (Step S301; YES), the conversion pixel extractor 3240 extracts the layer pixel corresponding to the selection part (pixels to be selected) (Step S302). Specifically, the coordinates of the pixels to be reconstructed, corresponding to the designated positions through the touch operation to the touch panel, are acquired. In the pixels positioned at the coordinates acquired by each layer, the layer pixels of the layer closest to the main lens ML whose pixel value is not NULL (layer having a large allocated depth coefficient) is set to be the pixels to be selected.

Then, the conversion pixel extractor 3240 acquires a depth coefficient with reference to the tentative reconstructed image (RI1) and its reconstructed depth map (RDM1) (Step S303).

Then, the sequential operation (operation selecting the next part or operation for completing selection) is awaited. Whether or not the next detected operation is the operation for completing selection is determined (Step S304). Specifically, whether or not the operations indicating the completion of selection such as lifting a finger from a touch panel and/or performing an operation instructing the completion are detected, is determined. When such operations are not detected (Step S304; NO), based on an operation for choosing the next part, the process is repeated from Step S302.

On the other hand, when an operation completing the selection is detected (Step S304; YES), the process proceeds to Step S305. At Step S305, the conversion pixel extractor 3240 extracts a layer including an image of an object to be converted (conversion layer) and pixels corresponding to an object to be converted (pixels to be converted) based on the pixel value and the depth coefficient acquired at Step S303. Furthermore, as shown in FIG. 8C, the extracted pixels to be converted are highlighted and displayed.

A method for extracting pixels to be converted can be any known method in which an area of an image is cut, divided and selected based on a user operation. However, the following method is described.

i) All the layers including pixels to be selected are specified. In the specified layers, a layer which satisfies a predetermined condition is chosen as a conversion layer. The predetermined condition can be optionally set from conditions, such as "the number of the pixels to be selected included in the layer is larger than a predetermined threshold value", "the ratio of 'pixels belonging to the layer' to 'all the pixels to be selected' is larger than a predetermined ratio" and the like.

ii) On a conversion layer, pixels continuous to pixels to be selected are incorporated in the selection area based on the pixel values. Specifically, a pixel to be selected on the conversion layer is set to a first selection area. In the pixels on the conversion layer adjacent to the current selection area, pixels having pixel values within the predetermined range are incorporated in the selection area. The predetermined range is set based on the average values of the pixel values of the pixels included in the current selection area. The pixels having NULL values are not incorporated in the selection area. This incorporation process is repeated until newly pixels to be incorporated are depleted. The pixels finally incorporated in the selection area are pixels to be converted.

In addition, the portion occupied by the pixels to be converted is referred to as conversion area.

Then, whether or not the object to be converted (pixels to be converted) is fixed is determined by the defining operation performed by the user who confirms the highlighted conversion area (Step S306). When the user chooses NO in FIG. 8C and the like, and the object to be converted is not fixed (Step S306; NO), the conversion area is reset and the process returns to the Step S301.

On the other hand, when the user chooses YES in FIG. 8C and the like, and the conversion area is fixed (step S306; YES), the conversion pixel extractor 3240 fixes the pixels included in the conversion area as pixels to be converted and the process proceeds to Step S307.

At Step S307, the modification operation acquirer 3150 determines whether or not the modification operation as described in FIG. 8D or FIG. 8F is detected. When not detected (Step S307; NO), the system awaits until the system can detect the modification operation by repeating the Step S307.

On the other hand, when detected (Step S307; YES), the conversion matrix of the formula (4) is generated based on the detected modification operation (Step S308). For example, when the operation reducing in the direction of the x axis and the operation instructing a reduction ratio are detected, the reduction ratio is substituted for the numerical value of a1 in the formula (4).

Or when the operation supporting parallel translation and the operation instructing a moving vector (dx, dy) are detected, dx is substituted for d1 and dy is substituted for d2 in the formula (4) respectively. Moreover, when rotated by an angle $\theta$, a2 and b2 are substituted for $\cos \theta$, b1 is substituted for $-\sin \theta$ and a2 is substituted for $\sin \theta$.

If a conversion matrix (affine transformation matrix) is generated at Step S308, the conversion setting acquisition process 1 is completed.

Returning to FIG. 10, if the pixels to be converted are extracted at Step S107 and the conversion parameter is acquired, the converter 3260 starts a process which generates the converted and reconstructed image using the conversion parameter (converted and reconstructed image generation process, equals to the converted and reconstructed image generation process 1) (Step S108).

Figure 13:
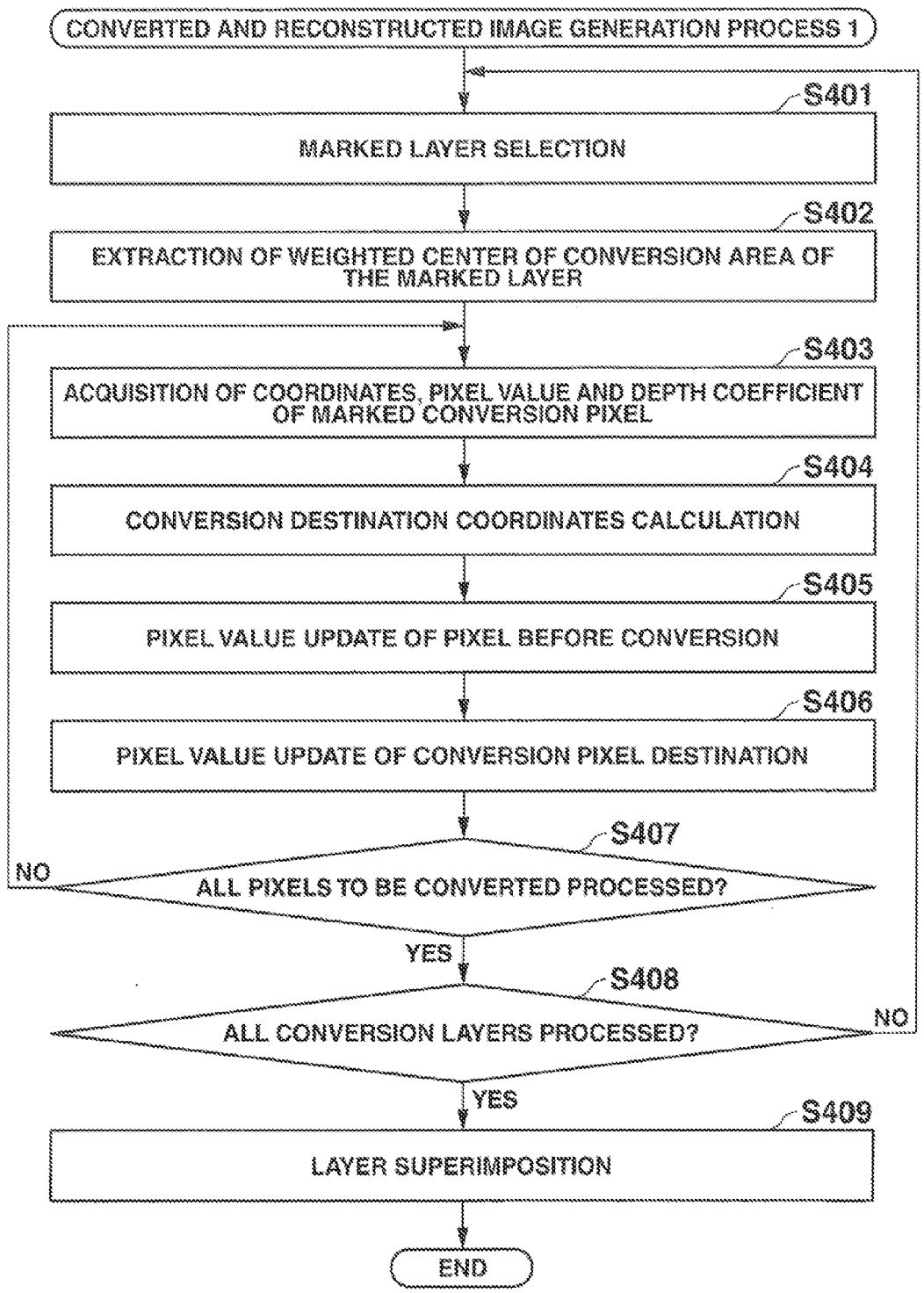
FIG. 13 is a flow chart which shows a converted and reconstructed image generation process of the embodiment 1.

The converted and reconstructed image generation process 1 performed at Step S108 is described with reference to FIG. 13. In the converted and reconstructed image generation process 1, first, one of the conversion layers defined by the conversion setting acquisition process is chosen as a marked layer (Step S401).

Then, the coordinates (xc, yc) of the weighted center of the conversion area in the marked layer are calculated (Step S402).

Then, one marked pixel to be processed is chosen from the pixels to be converted on the marked layer extracted in the conversion setting acquisition process. The coordinates, a pixel value, and a depth coefficient of the marked pixel to be converted are acquired with reference to the layer image and the layer depth map (Step S403). At Step S403, the coordinates of the marked pixel to be converted are further moved to a coordinate system centering on the weighted center. Specifically, (x-xc, y-yc) are calculated by subtracting the coordinates of the weighted center from the coordinates (x, y) of the acquired marked pixel to be converted.

Then, from the coordinates (x-xc, y-yc) of the marked pixel to be converted acquired by the converter 3260 at Step S403, the converter 3260 calculates the coordinates of the conversion destination using the conversion matrix defined by the conversion setting acquisition process (Step S404).

Specifically, the coordinates of the conversion destination (x', y') are calculated by substituting the coordinates (x–xc, y–yc) of the marked pixel to be converted for (x, y) in the formula (4). (x'+xc, y'+yc) are acquired by adding the coordinates of the weighted center and the coordinate system is returned to the original. (x'+xc, y'+yc) is the converted coordinates.

Then, the converter 3260 updates the pixel value of the original pixel before conversion (Step S405). Specifically, the pixel value of the coordinates (x, y) of the marked layer before conversion is set to NULL, and, is set to be passed through in the superposition. Also, the depth value of the coordinates in the depth map of the marked layer is set to NULL.

Then, the converter 3260 updates the pixel value of the converted coordinates (x'+xc, y'+yc) (Step S406). Specifically, the pixel value acquired at Step S403 is set to the pixel value of the pixel to be converted. In connection with the above pixel value, the depth value of the coordinates in the depth map of the marked layer is set to the depth value acquired at Step S403. When the pixel value has already been modified in the loops (up to the previous loop) (Step S403~Step S407) with regard to the pixel to be converted, the pixel value is corrected and updated so that the converted pixel value becomes the average value of the plurality of the original pixel values before modification.

In addition, it is described that even when the converted pixel value is not NULL, the pixel value is overwritten by the original pixel value before conversion. However, not being limited to the above example, it may also be appropriate that when the converted pixel value is NULL, the converted pixel value is overwritten, and when the converted pixel value is not NULL, the depth coefficient is compared before and after conversion and the pixel value of the pixel closer to the main lens ML may be set to the converted pixel value, or when the pixel value at the conversion destination is not NULL, a message warning that confusion has occurred may be displayed and the conversion process may be completed.

Then, it is determined whether or not the above-mentioned process is performed for all the pixels to be converted on the marked layer (Step S407). If an unprocessed pixel to be converted is on the marked layer (Step S407; NO), the process is repeated from Step S403 for the subsequent unprocessed pixel to be converted.

On the other hand, if the process is completed for all the pixels to be converted (Step S407; YES), then whether or not the above-mentioned process is completed is determined for all the layers to be converted (Step S408). When there is an unprocessed layer to be converted (Step S408; NO), the process is repeated from Step S401 for the subsequent unprocessed layer to be converted.

On the other hand, when the composition modification process is completed for all the layers to be converted, (Step S408; YES), the process proceeds to Step S409. At Step S409, the converted and reconstructed image generator 3270 generates a converted and reconstructed image (RI2) by superimposing all the layers. The concrete method of superposition is similar to Step S209 of the tentative reconstructed image generation process 1 (FIG. 11). When there is a pixel whose pixel values for all the layers are NULL by the conversion process, a default value (for example, blue) is set to the pixel value of the pixel. In connection with the above stated pixel value, a warning message is displayed which shows that the conversion exceeds the range in which the pixel value can be defined by a photo shooting image.

Moreover, at Step S409, a converted and reconstructed depth map (RDM2) is further generated in a similar manner in preparation for the case where the next composition modification is performed.

Then, the converted and reconstructed image generation process 1 is completed.

"Generating the reconstructed image by superposition by performing an image conversion in the converter 3260 for the layer pixel which belongs to the modification layer among the reconstructed images" is equal to "modifying the correspondence relationship between pixels to be reconstructed and sub-pixels only for some pixels corresponding to an object to be modified".

In the corresponding information (corresponding list of FIG. 5), the corresponding sub-pixels are defined for all the layer pixels corresponding to the position of the object to be modified in the tentative reconstructed image (RI1) before the composition modification. In these sub-pixels, the sub-pixels corresponding to the layer pixels of the modification layer are sub-pixels having a depth coefficient in the range allocated to the modification layer.

The conversion pixel extractor 3240 extracts the layer pixels of a conversion layer as pixels to be converted. This equals to "extracting the sub-pixels having a predetermined depth coefficient in which an object to be modified is presumed to be imaged, among the sub-pixels corresponding to the pixels to be reconstructed (converted and pixels to be reconstructed) at a position of the object to be modified".

That the converter 3260 converts the position of the pixel to be converted on a modification layer is substantially equivalent to that the sub-pixels corresponding to the layer pixels are set to the corresponding pixels of the destination modification from the corresponding pixels of the original pixels to be reconstructed before modification.

Returning to FIG. 10, when a converted and reconstructed image is generated at Step S108, the converted and reconstructed image generated by the output device 330 then is output to the image storage 430 (Step S109). The display 520 or the I/O device 510 outputs the converted and reconstructed image to an external device, and ends an image output process.

As described above, the image generating apparatus 30 of the embodiment 1 can generate the reconstructed image in which the composition of an object has been changed. Moreover, in modifying the composition, the sub-pixels corresponding to the object to be modified are extracted and linearly-transformed and the sub-pixels not corresponding to the object to be modified are not transformed. Therefore, the ratio that the pixel of an object using photo shooting information appears in the modified converted and reconstructed image (RI2) is small.

Moreover, in performing the coordinate conversion of pixels to be converted, when there is a pixel having a large depth coefficient (closer to the main lens ML) at the modification destination, the pixel is prioritized and a converted and reconstructed image is generated. Therefore, according to the depth, the converted and reconstructed image which is close to the converted and reconstructed image in which an object is actually moved, can be generated.

Moreover, the image generating apparatus 30 of the embodiment 1 has a configuration which performs image conversion only for some layers among a plurality of layers defined with regard to the reconstructed image. This equals to modifying the correspondence relationship only for some pixels whose depth coefficients belong to the range at which an object to be modified is estimated to be positioned. With this configuration, the image projected on the layer which does not include the object to be modified is held as it is, and the composition can be modified. For this reason, an image of an object which is imaged on the light field image LFI and which is projected on the more distant layer from the main lens ML appears in the part before modification. Therefore, a converted and reconstructed image, which is close to the converted and reconstructed image in which an object is actually moved, can be generated.

Furthermore, as a plurality of layers are defined and a conversion process is performed per layer, the process which extracts continuous parts for each layer as the parts to be converted can be performed easily. Moreover, the difference of "pixels to be converted" and "not to be converted" can be distinguished clearly and easily.

Furthermore, the digital camera 1 of the embodiment 1 has a configuration which tentatively generates a tentative reconstructed image whose composition is not modified, and presents it to the user. Therefore, the user can choose a desired conversion process, after checking the image whose composition is not modified. Therefore, the user's convenience is highly considered for performing the composition modification.

Moreover, the conversion matrix determiner 3250 generates the conversion matrix for the linear transformation according to the conversion operation, and the converter 3260 performs image conversion using this conversion matrix. For this reason, the composition modification designated by the user can be achieved by a small amount of calculation.

Furthermore, the corresponding information based on a photo shooting parameter (shooting setting information) is acquired, and a tentative reconstructed image and a converted and reconstructed image are generated based on this corresponding information. Therefore, the highly precise tentative reconstructed image and converted and reconstructed image reflecting the conditions at the time of photo shooting can be generated.

(Variation Example)

The present invention is not limited to the above-mentioned embodiment, but various variations are possible.

For example, in the above-mentioned embodiment, a plurality of layers for a reconstructed image are defined, and layer images for each layer are generated. Then, the layer images of the object to be converted (pixels to be converted) are selectively linearly-transformed, and a converted and reconstructed image is generated by superimposing layers. However, the method of generating a converted and reconstructed image in the present invention is not limited to this example.

For example, a configuration which does not define a plurality of layers for a reconstructed image is also possible. In this case, the corresponding pixels of the pixels to be reconstructed on a sheet of reconstructed image are extracted, and a tentative reconstructed image is generated from the pixel value. Then, according to the selection operation to the user's pixels to be reconstructed, in the corresponding pixels of the selected pixels to be reconstructed, a corresponding pixel whose depth coefficient satisfies the predetermined conditions is extracted as a sub-pixel to be converted. Predetermined conditions can be arbitrarily set. The examples of the predetermined conditions are: the corresponding pixel is included within a range which is within a predetermined range from the greatest numerical value among all the depth coefficients of the corresponding pixels; and the corresponding pixel is included in a user designated range (not necessarily in a range close to the main lens ML), and the like.

Then, the coordinates of the pixel to be reconstructed corresponding to the extracted sub-pixels (sub-pixels to be converted) are linearly-transformed to generate a new correspondence relationship. Then, a converted and reconstructed image is generated based on a new correspondence relationship. In the sub-pixels presupposed to correspond to the new correspondence relationship, only the pixel included in the predetermined range may be extracted. The predetermined range is within a range from the pixel closest to the main lens ML. The reconstructed image pixel value may be determined from the pixel value of the extracted sub-pixels. There is no necessity of generating a reconstructed depth map or a layer depth map in this configuration.

As there is no necessity of defining a layer image for each layer according to the configuration, the size of required workspace (memory) can be smaller.

Moreover, in the above-mentioned embodiment, "the pixel on the layer closest to the main lens ML having a pixel whose pixel value is not NULL at the part which is touched and is in the image on the touch panel" is extracted as pixels to be selected. Then, the continuous pixels on the layer are extracted based on the pixels to be selected, and the pixels to be converted are extracted. However, the method for extracting pixels to be selected or pixels to be converted is not limited to this.

For example, all layer pixels or sub-pixels corresponding to depth coefficients in the predetermined range designated by a user may be extracted as (sub) pixels to be converted. Or, in the layer pixels or sub-pixels corresponding to reconstructed images positioned in the range on a tentative reconstructed image designated by the user, all the pixels having the pixel values in the range designated by the user may be extracted as (sub) pixels to be converted.

In addition, the user may be warned when the user extracts the pixel of the deepest layer (or the deepest sub-pixels) whose pixel value of the pixel to be reconstructed is defined in extracting the pixels to be selected or pixels to be converted. With the described configuration, the user can be noted that there is a possibility that a pixel which is not based on the photo shooting information due to the composition modification may be included. Or a configuration is also possible which eliminates such a pixel from the object to be extracted.

Furthermore, the pixel conversion information and/or the conversion content may not be determined based on the user operation. As other examples, a configuration is also possible in which the object of the closest layer is automatically reduced.

Moreover, in modifying a composition on a layer, the affine transformation is described as an example. However, not limited to this example, any known method for linear transformation can be used to convert. Moreover, not limited to the linear transformation, the effects of the present invention can be achieved by using any non-linear conversion in which the area in a reconstructed image occupied by the object to be converted is varied. The fish eye image correction and the like can be listed as an example of such image correction.

Moreover, although an example in which the center of conversion is set to the average value (weighted center) of the coordinate value of all the pixels to be converted is described, not limited to the above example, the center of conversion can be set by performing a coordinate conversion for any coordinate systems. For example, the most far apart two points may be extracted in the pixels to be converted, and converted into the coordinate system in which the middle point of the most far apart two points are set to the origin to set the middle point to be the center of conversion. Moreover, coordinate systems may not be converted.

(Embodiment 2)

The embodiment 2 of the present invention is described.

The image generating apparatus 30 (reconstructed image generating apparatus) according to the embodiment of the present invention is installed in a digital camera 1 as shown in FIG. 1. The similar symbols are placed to the elements similar to the above embodiment 1 and only characteristic parts are described.

The digital camera 1 has the following functions of i)-vi):

i) a function of photo shooting a light field image which includes a plurality of sub images shot an object from a plurality of viewpoints;

ii) a function of acquiring a depth coefficient which shows a depth of an object;

iii) a function of generating a reconstructed image in which the image of the object is reconstructed from the light field image;

iv) a function of displaying the generated reconstructed image;

v) a function of accepting an operation instructing an object to be deleted; and vi) a function of generating a reconstructed image whose composition has been modified according to the accepted operation.

The image generating apparatus 30 takes charge of, especially, "vi) a function of generating a reconstructed image whose composition has been modified according to the accepted operation".

The digital camera 1 comprises an imager 10, an information processor 20 including the image generating apparatus 30, a storage 40, and an interface (an I/F part) 50, as shown in FIG. 1. The digital camera 1, with the described configuration, acquires light beam information of an object from outside, and generates a reconstructed image. The digital camera 1 generates a reconstructed image from which the object to be deleted is deleted so that the object to be deleted does not block the other objects (principal objects) for viewing this object.

In addition, "to delete an object to be deleted" includes, not only completely deleting an object to be deleted, but also includes that the light beam information coming from an object to be deleted decreases the influence on a reconstructed image to the level in which principal objects are not blocked for appreciation.

Then, the configuration of the image generating apparatus 30 is described with reference to FIG. 14A and FIG. 14B.

The image generating apparatus 30 physically includes an information processor 31, a main storage 32, an external storage 33, an input and output device 36, and an internal bus 37 as shown in FIG. 14A. The image generating apparatus 30 copies a program 38 and data stored in the external storage 33 to the main storage 32 and performs a process for generating the deleted and reconstructed image mentioned later by allowing the information processor 31 to execute the program 38 using the main storage 32.

The image generating apparatus 30 functions as an input device 350, a reconstructed image generator 360, a deletion operation acquirer 370 and an output device 380 with the above physical configuration as shown in FIG. 14B.

The input device 350 is a part which takes charge of a function which the image generating apparatus 30 acquires information from each part of the digital camera 1. The input device 350 includes a reconstruction setting acquirer 3510, an LFDM acquirer 3520, an LFI acquirer 3530, and a corresponding information acquirer 3540.

The LFDM acquirer 3520 acquires the light field depth map LFDM from the depth estimation and correspondence determination unit 220.

The reconstruction setting acquirer 3510 acquires reconstruction setting information from the reconstruction setting storage 420. The information reconstruction setting information includes information which describes the specific details of reconstruction process and information necessary for the image generation process as described below (information indicating the reconstruction parameter and a threshold value). In this embodiment, the reconstruction parameter presupposes to generate the reconstructed image through the following processes.

i) Using corresponding information, the reconstruction parameter generates a tentative reconstructed image arranged on a reconstruction plane RE ii) The reconstruction parameter displays a tentative reconstructed image and receives an operation specifying a user's object to be deleted.

iii) The reconstruction parameter reconstructs an image from which an object to be deleted has been deleted based on the object to be deleted specifying operation and outputs.

For this reason, the reconstruction parameter includes information which specifies the distance between the focal point of a new image (on a reconstruction plane) and the main lens ML (reconstruction distance, distance a1), the setting parameter for extracting pixels corresponding to the object to be deleted, and the like.

The LFI acquirer 3530 acquires the light field image LFI generated by the image processor 210.

The corresponding information acquirer 3540 acquires corresponding information (corresponding list of FIG. 5) from the depth estimation and correspondence determination unit 220.

Each part of the input device 350 transmits the acquired information to each part of the reconstructed image generator 360.

The deletion operation acquirer 370 receives the information which shows the operation of specifying an object to be deleted from the operator 530 of the digital camera 1. The deletion operation acquirer 370 transmits the information which shows the received operation specifying an object to be deleted to the reconstructed image generator 360.

According to the reconstruction setting acquired by the reconstruction setting acquirer 3510 and the deletion operation information acquired by the deletion operation acquirer 370, the reconstructed image generator 360 generates the deleted and reconstructed image from the light field depth map LFDM acquired by the LFDM acquirer 3520, the light field image LFI acquired by the LFI acquirer 3530 acquired and the corresponding information acquired by the corresponding information acquirer 3540.

In this embodiment, a tentative reconstructed image which is a reconstructed image whose composition has not been modified is tentatively generated and output. When a user performs an operation specifying an object to be deleted using the tentative reconstructed image, the deleted and reconstructed image, which is the reconstructed image from which the object to be deleted has been deleted, is generated. The reconstructed depth map which defines the depths of each pixel is also generated.

Figure 15A:
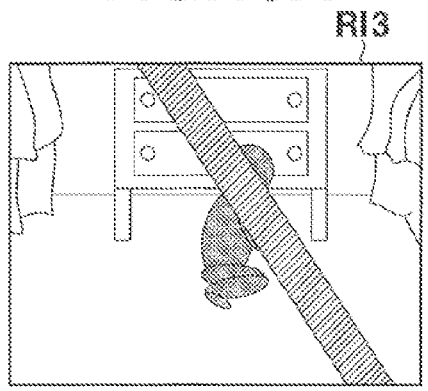
FIG. 15A to FIG. 15E are illustrations for explaining operations of instructing the deletion regarding the embodiment 2.

The outline of the process which the reconstructed image generator 360 performs is described with reference to FIG. 15A through FIG. 15E. The reconstructed image generator 360 reconstructs a tentative reconstructed image (RI3), to which the deletion process is not applied, from the light field image LFI and outputs the tentative reconstructed image (RI3) to the display 520. In the example of FIG. 15A, the tentative reconstructed image (RI3) is an image in which the background (white), a (gray) child in the vicinity of the focal plane RF, and a nearby obstacle (shaded part) appear.

Figure 15B:
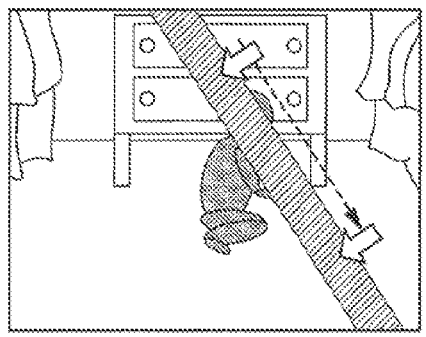

Then, the user who observed the tentative reconstructed image (RI3) displayed by the display 520 desires to delete the nearby obstacle so that the obstacle does not block the image of the child for appreciation. The user chooses an object to be deleted by the operation such as tracing the obstacle on a touch panel (the display 520 and the operator 530) as shown in FIG. 15B.

Figure 15C:
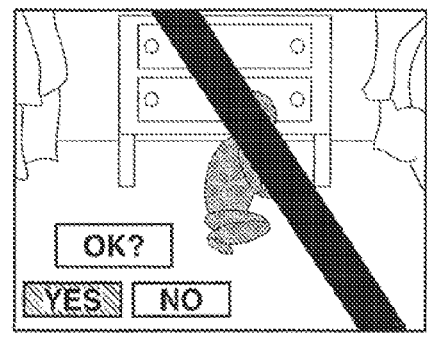

Based on the selection operation, the reconstructed image generator 360 extracts and highlights the object to be deleted (FIG. 15C). The user checks whether or not the currently highlighted object matches the desired object to be deleted. When matched, the user touches a fix button (YES of FIG. 15C), and confirms the object for deletion. On the other hand, NO is touched when the object highlighted for deletion is different from the desired object. In this case, the selection is reset, and the user performs the selection again.

Figure 15D:
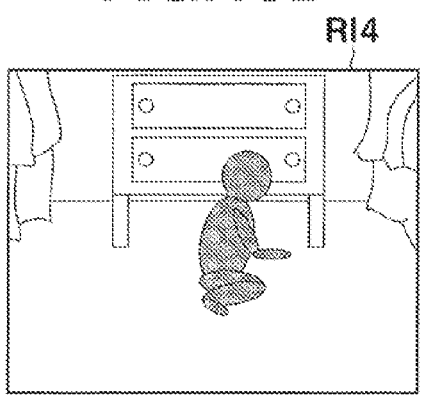
Figure 15E:
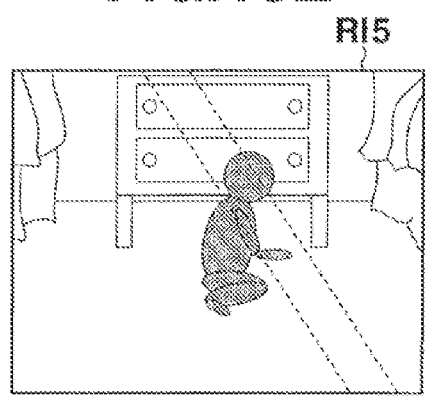

When the object for deletion is fixed, the reconstructed image generator 360 generates and displays an image (a deleted and reconstructed image, RI4) in which the object to be deleted has been deleted. FIG. 15D shows an example of the deleted and reconstructed image in which the object to be deleted has been deleted completely. On the other hand, FIG. 15E shows an example of the reconstructed image (RI5) in the case in which the influence of the information from an object to be deleted is decreased and only a certain ratio of the information is deleted.

In order to perform such a process, the reconstructed image generator 360 includes a tentative reconstructed image generator 3610, a pixel selection extractor 3620, a depth coefficient to be deleted determiner 3630, a deletion pixel extractor 3640, an eliminator 3650, and a deleted and reconstructed image generator 3660.

The tentative reconstructed image generator 3610 defines a reconstructed image on the reconstruction plane RE. Then, the pixel value of the pixel on a reconstructed image (pixel to be reconstructed) and its depth coefficient are determined as follows, and a tentative reconstructed image (RI3) and its reconstructed depth map (RDM3) are generated.

(1) One of the pixels to be reconstructed is set to a marked pixel, and corresponding sub-pixels and their weights which correspond to the coordinates of the marked image are acquired with reference to the corresponding information.
(2) The pixel values of the corresponding pixels are acquired with reference to the light field image LFI.
(3) An acquired pixel value multiplied by a weighting coefficient is set to be a corrected pixel value.
(4) For all the extracted corresponding pixels, corrected pixel values are calculated and the summed value of the pixel values is set to be a pixel value of a marked pixel. Normalization in which the summed value of the pixel values are divided by summed value of weights may be performed at this moment.
(5) The depth coefficient of the extracted corresponding pixel is acquired with reference to the light field depth map LFDM.
(6) The mode of the acquired depth coefficient is set to the depth coefficient of the correspondence part of the reconstructed depth map.
(7) Pixel values and depth coefficients are determined by performing (1)-(6) for each pixel to be reconstructed.

The tentative reconstructed image generator 3610 transmits the generated tentative reconstructed image (RI3) and the reconstructed depth map (RDM3) to the pixel selection extractor 3620.

Figure 16A:
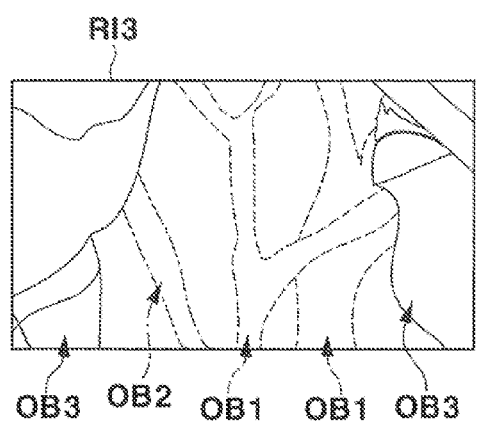
FIG. 16A to FIG. 16D are illustrations for explaining the reconstructed image and reconstructed depth map of the embodiment 2.
Figure 16B:
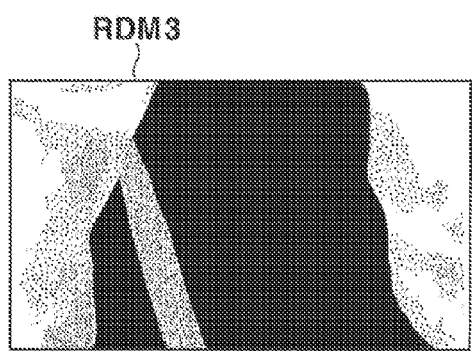
Figure 16C:
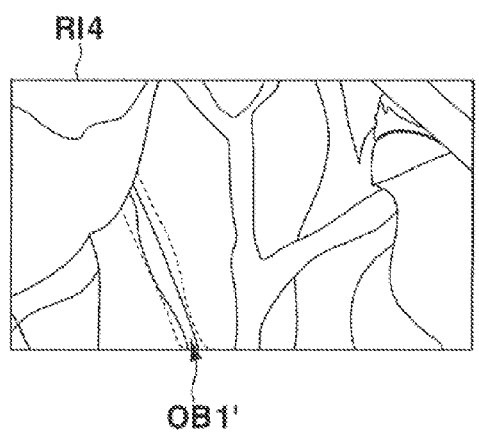
Figure 16D:
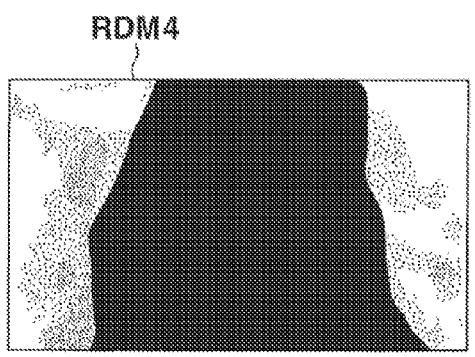

An example of a tentative reconstructed image (RI3) and a generated reconstructed depth map (RDM3) are shown in FIG. 16A through FIG. 16D. FIG. 16A shows an example of a tentative reconstructed image (RI3). FIG. 16B shows a reconstructed depth map (RDM3) of a tentative reconstructed image (RI3). The parts illustrated in solid lines (a nearby object OB3) on the tentative reconstructed image (RI3) is the (white) part with a large depth coefficient on the reconstructed depth map (RDM3).

On the other hand, the part indicated by the alternating long and short dash line (more distant object OB2) on the tentative reconstructed image (RI3) is shown in gray on the reconstructed depth map (RDM3).

The parts of objects (background OB1) shown in dashed lines on the tentative reconstructed image (RI3) have small depth coefficients. These parts are shown in a darker color in the reconstructed depth map (RDM3).

In the deleted and reconstructed image (RI4, FIG. 16C) in which the object OB2 has been deleted, the object OB1' which is hidden by OB2 on the tentative reconstructed image (RI3) appears. In the deleted and reconstructed depth map (RDM4, FIG. 16D) corresponding to the deleted and reconstructed image (RI4), the part corresponding to OB2 is shown in black color showing the background.

The tentative reconstructed image generator 3610 transmits and outputs the generated tentative reconstructed image (RI3) to the output device 380. Moreover, the tentative reconstructed image generator 3610 transmits the tentative reconstructed image (RI3) and the reconstructed depth map (RDM3) to the pixel selection extractor 3620. The output device 380 stores the tentative reconstructed image (RI3) to the image storage 430 to display on the display 520.

The display 520 presents the user the tentative reconstructed image (RI3), and receives an operation in which the operator 530 chooses the object on the tentative reconstructed image (RI3) from the user. The deletion operation acquirer 370 acquires the received operation.

The deletion operation acquirer 370 transmits the information which shows an operation specifying the part on the tentative reconstructed image (RI3) (coordinates of the specified part) to the pixel selection extractor 3620.

The pixel selection extractor 3620 extracts the pixel to be reconstructed corresponding to the part specified by the user (pixel to be selected) from the tentative reconstructed image (RI3). Specifically, the coordinates (x, y) in the tentative reconstructed image (RI3) of the part specified by the user are acquired. Furthermore, the depth value of the pixel to be selected is acquired. Then, the acquired information is kept as selection information.

An example of the selection information acquired by the pixel selection extractor 3620 is described with reference to FIG. 17A through FIG. 17C. In the example of FIG. 17A, the background (OB1) whose depth coefficient (depth index) corresponds to 1, objects (OB2a and OB2b) whose depth index correspond to 3, and the object OB3 whose depth index corresponds to 6 are imaged in the tentative reconstructed image (RI3).

If the user performs a touch operation such as a black arrow on the tentative reconstructed image (RI3), the pixel selection extractor 3620 generates the selection pixel list shown in FIG. 17B. The selection pixel list associates and records the number of pixels to be selected, the coordinates of the pixels to be selected, and the depth coefficients (depth index) of the pixels to be selected. In addition, pixels to be selected are pixels to be reconstructed corresponding to the part specified by the user using a touch operation. The coordinates of the pixels to be selected are the coordinates of the part on which a touch operation is performed by the user on the reconstructed image. The depth coefficients of the pixels to be selected are depth coefficients of the reconstructed depth map (RDM3) corresponding to the coordinates of the pixels to be selected.

The pixel selection extractor 3620 transmits the generated selection pixel list to the deletion depth determiner 3630.

The deletion depth determiner 3630 determines the depth index which satisfies predetermined conditions among the depth index included in the transmitted selection pixel list as the depth coefficients corresponding to the objects to be deleted (deletion depth coefficient).

A deletion depth coefficient may be determined by any method in which the deletion depth coefficient is set to a depth index which has a number which exceeds a predetermined number in the selection pixel list. However, the following method is used in this embodiment. Specifically, the number of pixels to be selected included in the selection pixel list is set to L, the number of depth index of a numerical value d is set to Ld, and the ratio Qd is calculated using the following formula (5). Then, the deletion depth whose Qd exceeds a predetermined threshold value is set to be the deletion depth coefficient among the depth indexes included in the selection pixel list. This threshold value is defined by reconstruction setting information.

$$Qd = Ld/L \qquad (5)$$

In the example of FIG. 17A and FIG. 17B, depth indexes 3 and 6 are chosen for the deletion depth coefficients. Then, the deletion depth determiner 3630 deletes a pixel having a depth index different from the deletion depth coefficient from the selection pixel list.

The deletion depth determiner 3630 transmits to the deletion pixel extractor 3640 the selection pixel list which the deletion process is completed and the information which shows the defined deletion depth coefficient.

The deletion pixel extractor 3640 compares the depth coefficients of sub-pixels with the deletion depth coefficients and extracts the pixels to be deleted, which can be determined that the object to be deleted is imaged, from the sub-pixels based on the result of the comparison. The process of extracting the pixels to be deleted is mentioned later.

Then, the deletion pixel extractor 3640 transmits the tentative reconstructed image, in which the pixel to be reconstructed corresponding to the extracted pixel to be deleted is emphasized, to the output device 380. The user can determine whether or not the desired object has been chosen using the image at this moment.

In an example of FIG. 17C, based on the operation of FIG. 17A, the objects (OB2*a* and OB3) corresponding to the pixels whose depth indexes are 3 and 6 are highlighted to present to the user as the objects to be deleted. Although the depth index of OB2*b* corresponds to the deletion depth coefficient, the OB2*b* is not set to be the object to be deleted as the OB2*b* does not include a part specified by the user.

If the user performs an operation that checks the output image and that confirms an object to be deleted, the deletion pixel extractor 3640 transmits the information indicating the extracted pixels to be deleted (coordinates of the pixel to be deleted on the light field image LFI) to the eliminator 3650.

The eliminator 3650 deletes pixels to be deleted from the light field image LFI. Specifically, the pixel value of the pixel of the coordinates transmitted from the deletion pixel extractor 3640 on the light field image LFI (pixel to be deleted) is set to NULL. A pixel whose pixel value is NULL is excluded from the object of calculation in the generation of a deleted and reconstructed image which is mentioned later.

In addition, in the present embodiment, "setting the pixel value of a pixel to be deleted to NULL" is equal to "not handling the pixel value having NULL as a corresponding pixel of the pixel to be reconstructed in the following processes". That is, "setting the pixel value of a pixel to be deleted to NULL" means to delete the pixel to be deleted from the corresponding list (or weights of correspondence are set to 0).

Figure 18A:
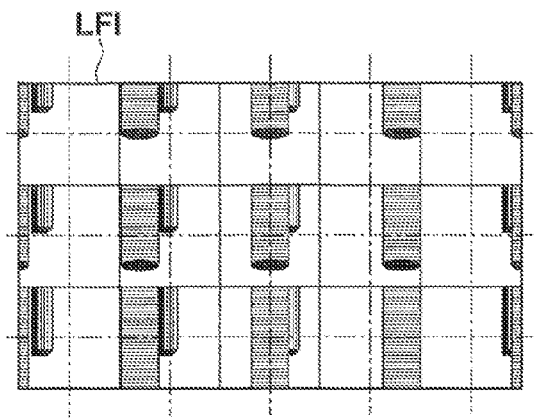
FIG. 18A to FIG. 18D are illustrations for explaining a deletion process of the embodiment 2.
Figure 18B:
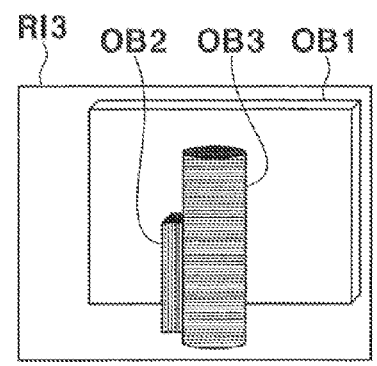

An example of a process which deletes a pixel to be deleted from the light field image LFI is described with reference to FIG. 18A through FIG. 18D. A tabular object OB1, a cubic object OB2, and a cylindrical object OB3 are imaged in the example. FIG. 18A shows a part of the light field image LFI acquired by the LFI acquirer 3530. FIG. 18B shows the tentative reconstructed image reconstructed by the tentative reconstructed image generator 3610. Images of each object appear in symmetrical with respect to a point in the light field image LFI.

The light field image LFI is constructed with a plurality of sub images in which OB1, OB2, and OB3 are each shot from different angles. The sub images are shown in the squares arranged in a reticular pattern. Moreover, the center lines of each sub image are shown using the alternating long and short dash lines.

Figure 18C:
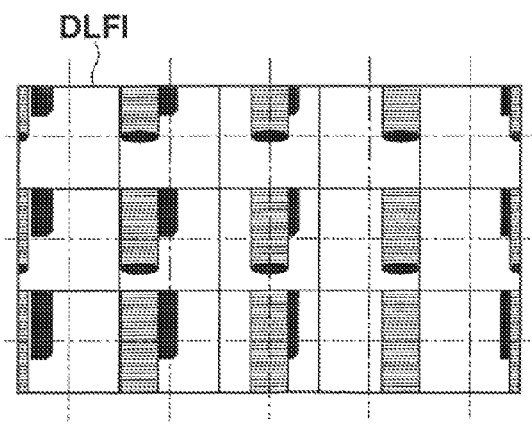

When deleting the OB2, the deletion depth determiner 3630 extracts the depth coefficient of OB2 as the deletion depth coefficient. Then, the deletion pixel extractor 3640 extracts the sub-pixel included in the predetermined range (pixel of the horizontally lined parts in FIG. 18A), which is within a range from a deletion depth coefficient, among the corresponding pixels which correspond to the coordinates of OB2 on the reconstructed image. Then, the eliminator 3650 sets the pixel values of the extracted sub-pixels to NULL. FIG. 18C shows a part of the light field image LFI in which the deleted pixels which are set to NULL are shown in black (the deleted LFI, DLFI).

Figure 18D:
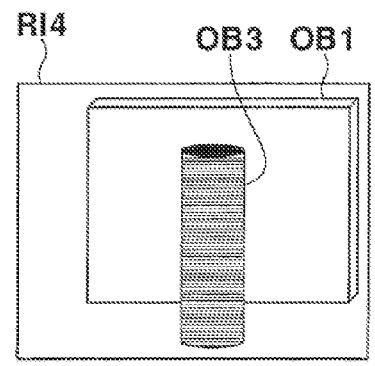

When an image is reconstructed using the corresponding list from the deleted LFI, the deleted and reconstructed image (RI4) from which the object to be deleted (OB2) is deleted can be generated as shown in FIG. 18D. Then, OB1 is displayed at the part of the existed OB2. This is because, in addition to the pixels to be deleted, OB1 is imaged among the corresponding pixels of the pixels to be reconstructed at the part where OB2 existed.

The eliminator 3650 transmits the deleted LFI to the deleted and reconstructed image generator 3660. The deleted and reconstructed image generator 3660 generates the deleted and reconstructed image (RI4) by weighting and adding the pixel value of the pixel whose pixel value is not set to NULL on the deleted LFI among the corresponding sub-pixels registered in the corresponding list for each of the pixels to be reconstructed.

The deleted and reconstructed image generator 3660 transmits the generated deleted and reconstructed image to the output device 380. The output device 380 stores the transmitted deleted and reconstructed image (RI4) in the image storage 430. Then, the digital camera 1 displays the deleted and reconstructed image (RI4) on the display 520 or transmits to an external device through the I/O device 510.

Then, the process performed by the digital camera 1 is described with reference to flow charts. The digital camera 1 starts the image output process shown in FIG. 19 taking the opportunity that the user operates the operator 530 to instruct imaging an object.

In an image output process, the light field image LFI is first generated from the imaging information acquired by the image processor 210 from the imager 10, and the shooting setting information acquired from the image setting storage 410 (Step S501). Then, the digital camera 1 transmits the generated light field image LFI and the generated shooting setting information to the depth estimation and correspondence determination unit 220.

Then, the depth estimation and correspondence determination unit 220 acquires shooting setting information. Furthermore, the depth estimation and correspondence determination unit 220 acquires reconstruction setting information from the reconstruction setting storage 420 (Step S502). The imaging setting and reconstruction setting acquired at the moment are also transmitted to the image generating apparatus 30.

Then, the depth estimation and correspondence determination unit 220 estimates depths for each sub-pixel which constructs the light field image LFI. Moreover, the image generating apparatus 30 acquires the light field depth map LFDM in which the depth coefficients are arranged (Step S503).

Specifically, the depth estimation and correspondence determination unit 220 estimates the depth of the corresponding object for each sub-pixel constructing the light field image LFI, and generates the light field depth map LFDM in which the depth coefficients indicating the estimated depth are associated with the sub-pixels.

The depth coefficient may be calculated using any method which estimates the distance of the object of the pixel of the light field image LFI. However, in the present embodiment, the depth coefficient is calculated in a method similar to the S103 in FIG. 10.

Then, the depth estimation and correspondence determination unit 220 generates the corresponding list shown in FIG. 5 by the light beam trace described in FIG. 4 (Step S504). Then, the image generating apparatus 30 acquires the corresponding list generated by the depth estimation and correspondence determination unit 220.

After acquiring the light field depth map LFDM at Step S503 and the corresponding list at Step S504, the image generating apparatus 30 starts a process which generates a tentative reconstructed image (RI3) using the light field image LFI, the light field depth map LFDM, and the corresponding list (tentative reconstructed image generation process) (Step S505). Here, a tentative reconstructed image generation process 2 shown in FIG. 20 is performed.

In the tentative reconstructed image generation process 2, the tentative reconstructed image generator 3610 defines a tentative reconstructed image first on the reconstruction plane RF defined by the reconstruction setting information (Step S511). The tentative reconstructed image generator 3610 further selects a marked pixel from the pixel included in the tentative reconstructed image (pixel to be reconstructed) (Step S512).

Then, the tentative reconstructed image generator 3610 extracts the corresponding pixels corresponding to the marked pixel from the sub-pixels (Step S513). Specifically, in the corresponding list shown in FIG. 5, the sub-pixels which are registered in the row in which the coordinates of the pixel to be reconstructed match with the coordinates of the marked image are extracted as the corresponding pixels.

Then, the tentative reconstructed image generator 3610 calculates the pixel value of the marked pixel (Step S514). Specifically, an arithmetic weighted mean of the pixel values of each pixel extracted at Step S513 is acquired using the weights of each corresponding pixel and the acquired value is set to be the pixel value of the marked pixel.

The tentative reconstructed image generator 3610 calculates the depth coefficient of the marked pixel in a similar manner (Step S515). Specifically, an arithmetic weighted mean of the depth coefficients defined by the light field depth map LFDM is acquired for each corresponding pixel extracted at Step S513 using the weights of each corresponding pixel and the acquired value is set to be the depth coefficient of the marked layer pixel.

In addition, the mode of the depth coefficient of the corresponding pixel may also set to be the depth coefficient of the marked pixel.

Then, whether or not the above-mentioned process has been completed is determined by setting all the pixels to be reconstructed of the marked layer to the marked pixels (Step S516). When there is an unprocessed pixel to be reconstructed (Step S516; NO), the process is repeated from Step S512 for the next unprocessed pixel to be reconstructed. On the other hand, if all the pixels to be reconstructed have been processed (Step S516; YES), the tentative reconstructed image generation process 2 completes.

Returning to FIG. 19, when a tentative reconstructed image is generated at Step S505, the tentatively reconstructed image generated by the output device 380 is then output (Step S506), and the output device 380 allows the display 520 to display the reconstructed image.

Then, regarding the tentative reconstructed image displayed at Step S506, the image generating apparatus 30 performs a process in which the deletion operation operated by a user is accepted and the object to be deleted and the pixels to be deleted are defined based on the operation, (deletion object defining process, deletion object defining process 1 in this case) (Step S507).

The deletion object defining process 1 performed at Step S507 is described with reference to FIG. 21. In the deletion object defining process 1, the deletion operation acquirer 370 determines first whether or not the operation by a user which chooses an object to be deleted has been detected (Step S601). Specifically, whether or not the deletion operation acquirer 370 can detect an operation by the user touching the tentative reconstructed image (RI3) on the touch panel which is constructed with the display 520 and the operator 530.

When the operation cannot be detected (Step S601; NO), Step S601 is repeated and the system waits for the detection of the operation.

On the other hand, when a selection operation can be detected (Step S601; YES), the pixel selection extractor 3620 extracts the pixels to be reconstructed (pixels to be selected) which correspond to the selection part (Step S602). Specifically, the coordinates of the pixels to be reconstructed corresponding to the designated positions are acquired through the touch operation to the touch panel.

Then, the pixel selection extractor 3620 acquires the depth coefficient of pixels to be selected with reference to the tentative reconstructed image (RI3) and its reconstructed depth map (RDM3) (Step S603). Then, the selection pixel extractor 3620 associates selection pixel numbers, coordinates, and depth coefficients (depth indexes) and stores in the selection pixel list of FIG. 17B.

Then, whether or not the next detected operation is the operation for completing selection is determined (Step S604). Specifically, it is determined whether or not the operations indicating the completion of selection, such as lifting a finger from a touch panel and/or performing an operation instructing the completion, are detected. When such operations are not detected (Step S604; NO), based on an operation for choosing the subsequent part, the process is repeated from Step S602.

On the other hand, when an operation completing the selection is detected (Step S604; YES), the process proceeds to Step S605. At Step S605, a process for defining a deletion depth coefficient (deletion depth determining process, deletion depth determining process 1 in this case) is performed.

Figure 22:
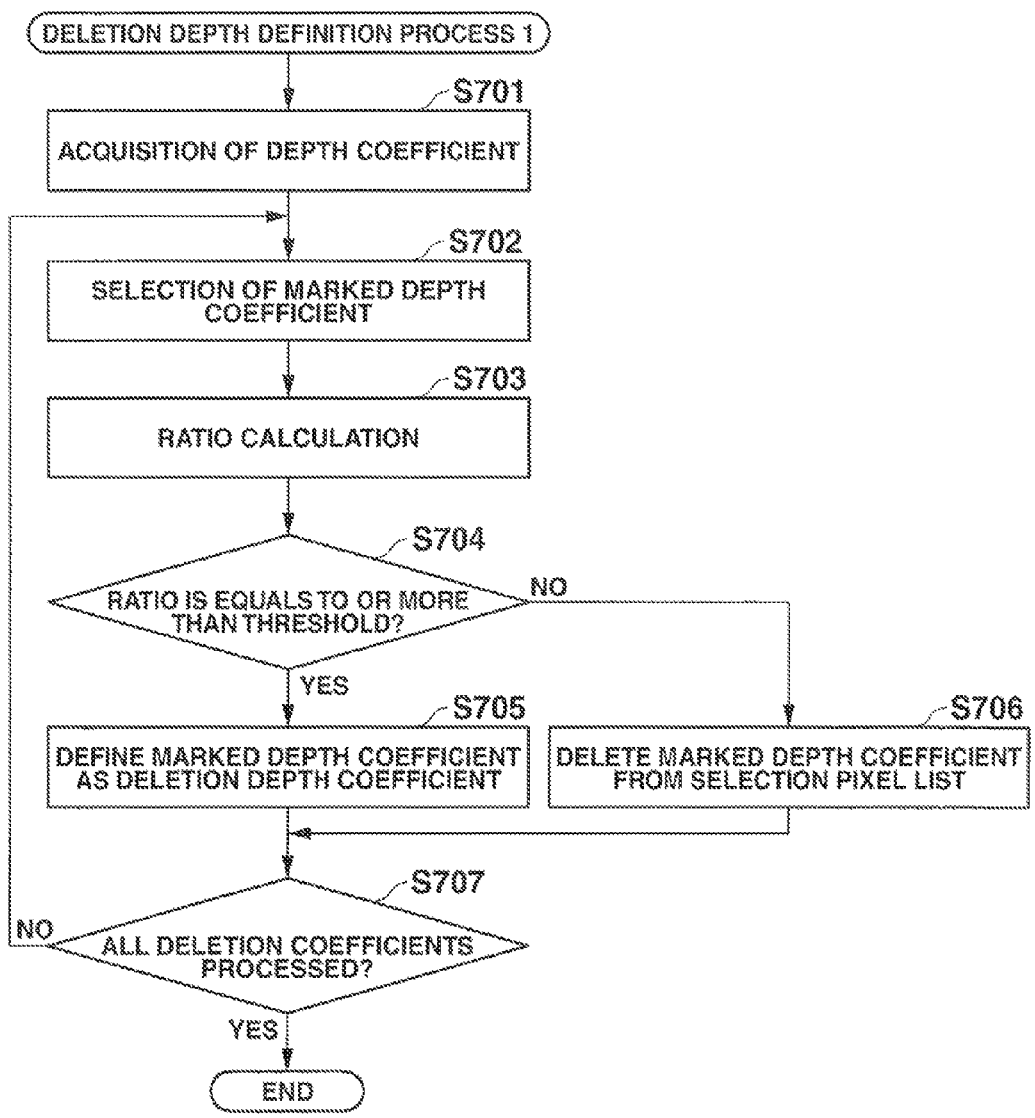
FIG. 22 is a flow chart which shows a deletion depth determining process according to the embodiment 2.

The deletion depth determining process 1 is described with reference to FIG. 22. In the deletion depth determining process 1, the deletion depth determiner 3630 acquires the depth coefficient (depth index) recorded in the selection pixel list (Step S701). In the example of FIG. 17B, as 3, 6, and 1 are recorded as depth index values, these three depth indexes are acquired.

Then, the deletion depth determiner 3630 chooses one of the depth coefficients acquired at Step S701 as a marked depth coefficient (Step S702).

Then, the ratio Qd is calculated for the marked depth coefficient using the formula (5) (Step S703). For example, 45/200 is calculated as a value of the ratio Qd for the depth index 3 of FIG. 17B.

The deletion depth determiner 3630 then determines whether or not the ratio calculated at Step S703 is equal to or more than a predetermined threshold value (Step S704). When the ratio calculated at Step S703 is equal to or more than a predetermined threshold value (Step S704; YES), the deletion depth determiner 3630 sets the marked depth as the deletion depth coefficient (Step S705). On the other hand, when the ratio calculated at Step S703 is less than a predetermined threshold value (Step S704; NO), the deletion depth determiner 3630 deletes the marked depth coefficient from the selection pixel list based on the premise that the marked depth coefficient is not determined to be a deletion depth coefficient (Step S706). Specifically, in the selection pixel list, a row in which the depth index matches with the marked depth coefficient is deleted.

Then, it is determined whether or not the above-mentioned process has been completed for all the depth coefficients acquired at Step S701 (Step S707). When there is an unprocessed depth coefficient (Step S707; NO), the process is repeated from Step S702 for the next unprocessed depth coefficient. On the other hand, if the process is completed for all the depth coefficients (Step S707; YES), the deletion depth determining process is completed.

Returning to FIG. 21, when the deletion pixel extractor 3640 defines the deletion depth coefficients at Step S605, the deletion pixel extractor 3640 chooses one of the defined deletion depth coefficients as the marked depth coefficient (Step S606).

Then, the deletion pixel extractor 3640 performs a process in which pixels to be deleted are extracted from the light field image LFI (deletion pixel extraction process, deletion pixel extraction process 1 in this case) (Step S607).

The deletion pixel extraction process 1 performed at Step S607 is described with reference to FIG. 23. First, in the deletion pixel extraction process 1, the deletion pixel extractor 3640 chooses one of the pixels to be selected as the marked pixel to be selected. The pixel to be selected is stored in the selection pixel list which is generated for the tentative reconstructed image (RI3) (Step S801). Then, the marked pixel to be selected is incorporated in the selection area chosen within the tentative reconstructed image (RI3).

Then, the deletion pixel extractor 3640 extracts the adjacent pixels to be reconstructed which are adjacent to the selection area (Step S802). Specifically, the deletion pixel extractor 3640 extracts the pixels to be reconstructed which are not included in the selection area as adjacent pixels to be reconstructed for each of the pixels included in the selection area among the pixels bordering to the left, right, up and down directions.

Then, the deletion pixel extractor 3640 determines if there is a pixel to be incorporated, which satisfies predetermined conditions, among the adjacent pixels to be reconstructed extracted at Step S802 (Step S803). The predetermined condition at this step is that the differences between the pixel values of the adjacent pixels to be reconstructed and the average value of the pixels included in the selection area are less than the predetermined threshold value set by the reconstruction setting, and the depth coefficients are included in the predetermined range (deletion depth range) which includes the deletion depth coefficient (marked depth coefficient). For example, when the reconstruction setting sets the deletion depth range as ±2 of the deletion depth coefficient and a depth coefficient is set to 6, 4-8 is the deletion depth range. In the present embodiment, "that the depth coefficient of an adjacent pixel to be reconstructed is included in the deletion depth range" becomes a condition for the adjacent pixel to be reconstructed to be a pixel to be incorporated that is incorporated in the selection area.

When there is a pixel to be incorporated among the adjacent pixels to be reconstructed extracted at Step S802 (Step S803; YES), the deletion pixel extractor 3640 incorporates the pixel to be incorporated into the selection area based on the premise that the pixel to be incorporated is determined to be a pixel corresponding to an object to be deleted (Step S804). Then, the process returns to Step S802 and extracts further pixels to be incorporated.

On the other hand, when there is no incorporated pixel (Step S803; NO), the process proceeds to Step S805 based on the premise that no such pixel corresponding to an object to be deleted is determined to exist in the range bordering the selection area at this time.

At Step S805, the deletion pixel extractor 3640 determines if there is a pixel which is not included in the selection area among the pixels to be selected stored in the selection pixel list. When there is a pixel to be selected which is not included in the selection area (Step S805; YES), the process is repeated from S801 setting the pixel as a new marked pixel to be selected.

On the other hand, when there is no pixel to be selected which is not included in the selection area (Step S805; NO), the deletion pixel extractor 3640 extracts the corresponding pixel from the light field image LFI which corresponds to the selection area of the tentative reconstructed image (RI3) based on the premise that a pixel to be reconstructed corresponding to the object to be deleted is determined to be included in the present selection area (Step S806). Specifically, the deletion pixel extractor 3640 extracts, from the corresponding list, the sub-pixel which is defined to correspond to the pixel to be reconstructed included in the selection area.

Then, the deletion pixel extractor 3640 extracts a pixel having the depth coefficient included in the deletion depth range as a pixel to be deleted among the corresponding pixels extracted at Step S806 (Step S807). Then, the deletion pixel extraction process 1 is completed.

Returning to FIG. 21, when a pixel to be deleted is extracted at Step S607, then, it is determined whether or not the above-mentioned process is completed for all the deletion depths defined at Step S605 (Step S608). When there is an unprocessed deletion depth (Step S608; NO), the process is repeated from Step S606 for the next unprocessed deletion depth. On the other hand, if the process is completed for all the deletion depths (Step S608; YES), the process proceeds to Step S609.

At Step S609, as shown in FIG. 15C, the deletion pixel extractor 3640 outputs the tentative reconstructed image, in which the object to be deleted corresponding to the extracted pixels to be deleted is highlighted, to the output device 380. Specifically, the deletion pixel extractor 3640 generates an image in which the object to be deleted can be distinguished through processes such as setting the pixel value of the object to be deleted to black or setting the pixel value to blinking black and white in the tentative reconstructed image (RI3). Then, the generated image is displayed.

Then, the user determines whether or not the object to be deleted (pixels to be deleted) should be confirmed by checking the highlighted deletion area (object to be deleted) and performing a fixing operation and the like (Step S610). When the object to be deleted is not fixed as in the case in which the user chooses NO in FIG. 15C (Step S610; NO), the deletion area is reset and the process returns to Step S601.

On the other hand, when the object to be deleted is fixed as in the case in which the user chooses YES in FIG. 15C (step S610; YES), the deletion pixel extractor 3640 fixes the sub-pixels extracted at Step S607 as pixels to be deleted. Then, the deletion object defining process 1 is completed.

Returning to FIG. 19, when a pixel to be deleted is extracted at Step S507, then, the eliminator 3650 performs the deletion process. Specifically, the pixel values of the pixels to be deleted in the light field image LFI are set to NULL (Step S508). Then, the deleted and reconstructed image generator 3660 starts the process which generates the deleted and reconstructed image (RI4) (deleted and reconstructed image generation process, deleted and reconstructed image generation process 1 in this case) (Step S509).

Figure 24:
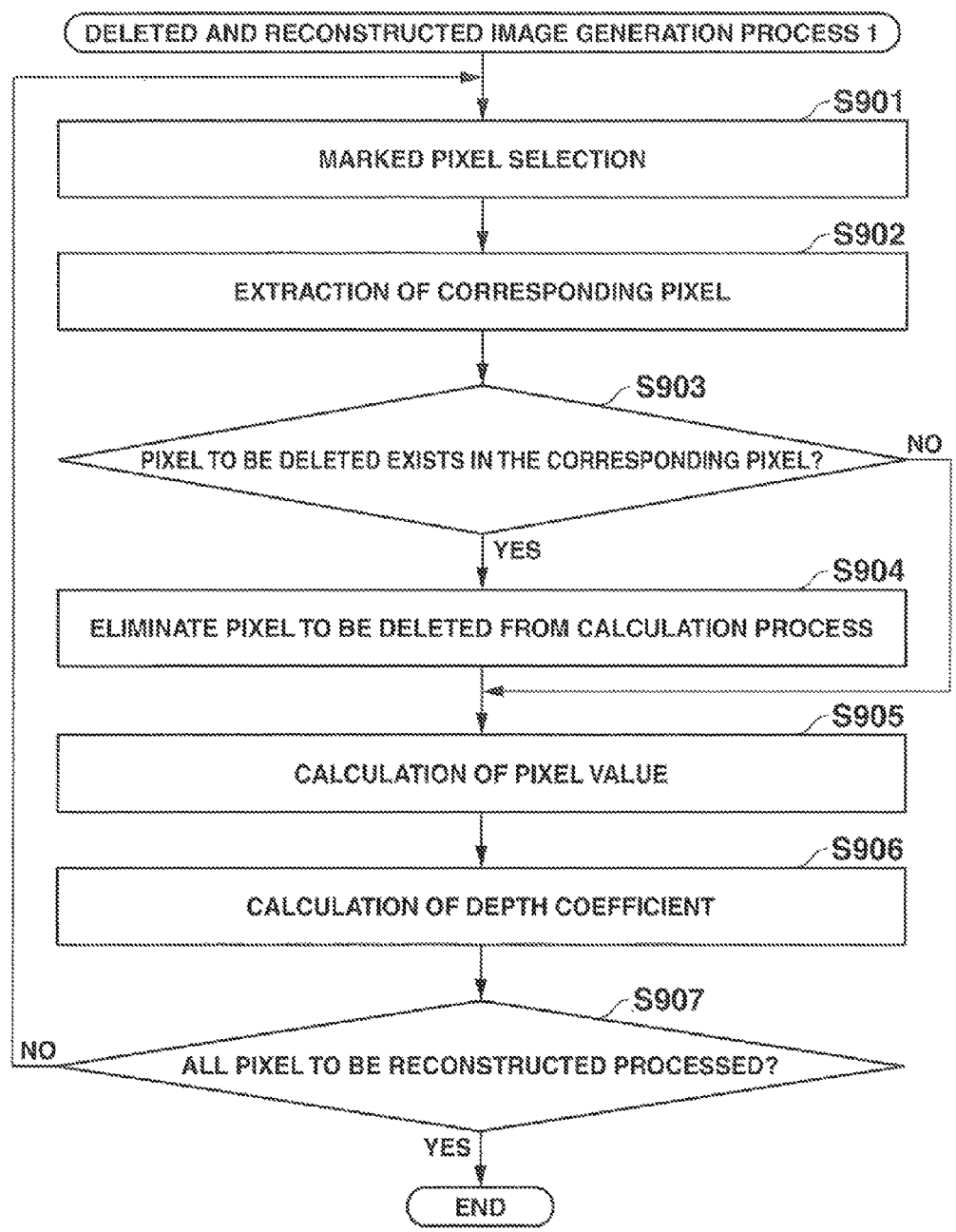
FIG. 24 is a flow chart which shows a deleted and reconstructed image generation process according to the embodiment 2.

The deleted and reconstructed image generation process 1 performed at Step S509 is described with reference to FIG. 24. In the deleted and reconstructed image generation process 1, the deleted and reconstructed image generator 3660 chooses one of the pixels to be reconstructed as the marked pixel (Step S901).

Then, the deleted and reconstructed image generator 3660 extracts the corresponding pixel corresponding to the marked pixel from the sub-pixels (Step S902). Specifically, in the corresponding lists of FIG. 5, the deleted and reconstructed image generator 3660 extracts as the corresponding pixels the sub-pixels that are registered in the row in which the coordinates of the pixels to be reconstructed are equal to the coordinates of the marked image.

Then, the deleted and reconstructed image generator 3660 determines whether or not the corresponding pixel extracted at Step S902 includes a pixel whose pixel value is NULL (pixel to be deleted) (Step S903). When a pixel to be deleted is included (Step S903; YES), the pixel to be deleted is excluded from being included in subsequent calculation processes (Step S904). On the other hand, when a pixel to be deleted is not included (Step S903; NO), Step S904 is skipped.

Then, the deleted and reconstructed image generator 3660 calculates the pixel value of the marked pixel (Step S905). Specifically, the arithmetic weighted mean, of the pixel values of each corresponding pixel extracted at Step S902, is acquired by using the weights of each corresponding pixel. The acquired value is set to be the pixel value of the marked pixel. The pixel to be deleted which is excluded at Step S904 is not processed in the calculation process.

When all the corresponding pixels are pixels to be deleted (or the ratio occupied by the pixels to be deleted is larger than a predetermined ratio), a predetermined default value (for example, black) is set to be the pixel value of the pixel to be reconstructed. At this moment, the user is warned that information which was not created during photo shooting appears in the deleted and reconstructed pixel through the deletion operation.

In a similar manner, the deleted and reconstructed image generator 3660 calculates the depth coefficient of the marked pixel (Step S906). Specifically, the arithmetic weighted mean, of the depth coefficients defined by the light field depth map LFDM for each corresponding pixel extracted at Step S902, is acquired by using the weights of each corresponding pixel. The acquired value is set to be the depth coefficient of the marked pixel. In addition, the mode of the depth coefficients of corresponding pixels may be set to the depth coefficient of the marked pixel. The pixel to be deleted is excluded from the calculation process.

Then, the deleted and reconstructed image generator 3660 determines whether or not the above-mentioned process is completed by setting all the pixels to be reconstructed to the marked pixels (Step S907). When there is an unprocessed pixel to be reconstructed (Step S907; NO), the process is repeated from Step S901 for the next unprocessed pixel to be reconstructed. On the other hand, if all the pixels to be reconstructed have been processed (Step S907; YES), the deleted and reconstructed image generation process 1 is completed as the deleted and reconstructed image is generated.

Returning to FIG. 19, when the deleted and reconstructed image is generated at Step S509, the deleted and reconstructed image generated by the output device 380 then is output to the image storage 430 (Step S510). Then, the display 520 or the I/O device 510 outputs the converted and reconstructed image to an external device, and the image output process is completed.

As described above, the image generating apparatus 30 of the embodiment 2 can generate the reconstructed image in which the object to be deleted is deleted. Moreover, in order to delete the object, the image generating apparatus 30 extracts the sub-pixels corresponding to the object to be deleted and determines the pixel value of the reconstructed image based on the pixel values of other sub-pixels. Therefore, the appearance percentage of the pixel being independent from photo shooting information of the principal objects (pixels of the object to be deleted) is low in the reconstructed image (RI4) after deletion. That is, the deleted and reconstructed image can be generated as an image which further reflects the photo shooting information of the principal objects.

Moreover, the image generating apparatus 30 of the embodiment 2 performs the deletion process for a pixel having the depth coefficient which can be determined that the object to be deleted is estimated to be located, and deletes an image of the object to be deleted from the reconstructed image. With this configuration, the image generating apparatus 30 can keep the image whose depth does not include the object to be deleted as it is, and the object. For this reason, an image of a more distant object shot within the light field image LFI appears in the deleted part. Therefore, the deleted and reconstructed image which is close to the case in which the object is actually removed can be generated.

Moreover, the image generating apparatus 30 of the embodiment 2 generates a reconstructed depth map from the light field depth map LFDM, and determines the depth coefficient of an object based on the depth coefficient of the pixel to be selected (a part of the pixels to be reconstructed). For this reason, the image generating apparatus 30 can extract the sub-pixels, as pixels to be deleted, which are suitable for the depth of the determined object to be deleted, and can generate the deleted and reconstructed image which is close to the case in which the object is actually eliminated.

Furthermore, the digital camera 1 of the embodiment 2 has a configuration in which once the tentative reconstructed image which is not through the deletion process, can be generated and presented to the user. Therefore, the user can confirm the image which is not through the deletion process, and choose the desired object to be deleted. Therefore, it is convenient for the user to perform the deletion of the object.

Furthermore, the digital camera 1 of the embodiment 2 acquires corresponding information based on the photo shooting parameter (shooting setting information), and generates the tentative reconstructed image and the deleted and reconstructed image based on the corresponding information. Therefore, a highly accurate tentative reconstructed image and a deleted and reconstructed image reflecting the conditions at the time of photo shooting can be generated.

(An Example of Modification)

The present invention is not limited to this embodiment, but various modifications are possible.

For example, in the present embodiment, a range of a deletion depth is set to a predetermined range in which the depth index extracted by the deletion operation includes more depth coefficients than the predetermined ratio. Then, the sub-pixel whose depth coefficient is included in the deletion depth range among the sub-pixels corresponding to the object to be deleted, is set to be the pixel to be deleted.

However, the method for extracting the pixels to be deleted of the present invention is not limited to this.

For example, the digital camera 1 may set all the sub-pixels belonging to the range of the depth specified by the user as pixels to be deleted. With the configuration, for example, when there is a belt-like obstacle in front of the principal objects, a process in which an obstructive obstacle is deleted uniformly can be achieved easily.

Or a configuration, which sets "the sub-pixels corresponding to any part specified by the user and belonging to the depth range specified by the user" to the pixels to be deleted, can also be achieved.

Figure 23:
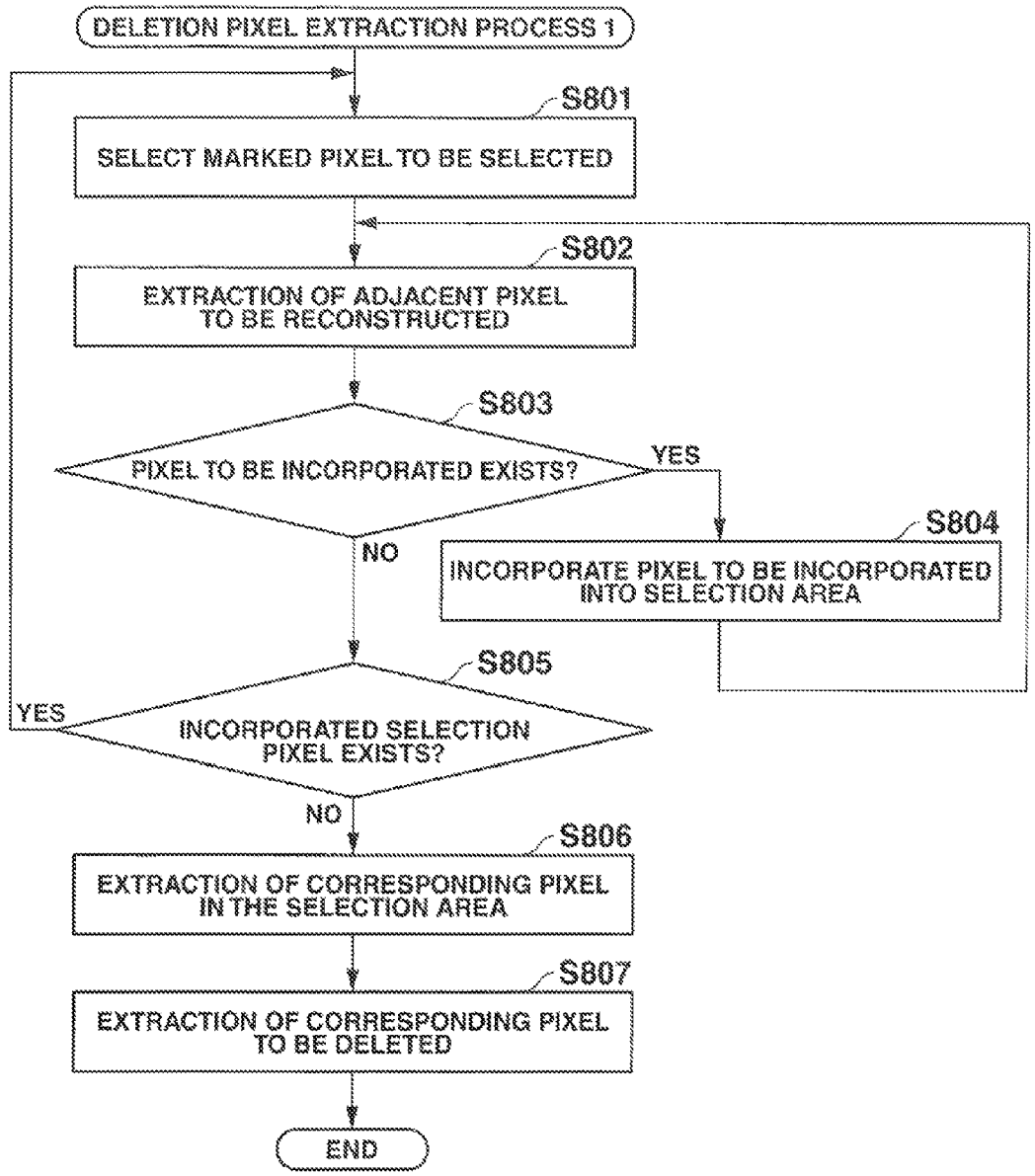
FIG. 23 is a flow chart which shows a deletion pixel extraction process according to the embodiment 2.

Moreover, although the deletion pixel extraction process 1 of FIG. 23 defines the selection area (area in the reconstructed image corresponding to the object to be deleted) in the present embodiment, methods of defining the selection area are not limited to this method.

For example, it is possible to make a configuration in which the reconstructed image is divided into image areas in advance based on the pixel value and the depth coefficient, and areas in the image areas, in which the number of the pixels to be selected that are included in the image areas is more than a predetermined ratio, are defined as the selection area. Any known methods such as the division and integration method, and the graph cutting method, can be used for the method for dividing the image areas.

In addition, the method of dividing the reconstructed image into the image areas in advance in this way is applicable also to the process which defines the deletion depth range. For example, areas, in which the number of the pixels to be selected that are included in the image areas is more than a predetermined percentage, are extracted as the selection area based on the selection operation. Then, the configuration is possible which sets the mode of the depth coefficient of the selection area to the deletion depth coefficient, and sets the predetermined range to the deletion depth range from the depth coefficient.

Moreover, another configuration is also possible in designing a digital camera which allows the division of a range of depth coefficients into a plurality of classes (depth classes), and performs a deletion process. In the example of the modification, the depth classes are defined using a list which associates and stores the depth classes and the corresponding ranges of the depth coefficients (the class-depth corresponding list of FIG. 25). In the example of FIG. 25, three depth classes are defined for the depth indexes (0-MAX) assumed in the design. For example, that the class index 2 and the correspondence depth indexes 3-5 are registered in the same row indicates that the depth index (depth coefficient) whose pixels are 3-5 belongs to the second class.

The methods for sorting depths into classes are optional such as a method, defined in advance with the reconstruction setting, in which each depth value of the light field depth map LFDM is clustered by the known clustering method and the like. Examples of clustering methods may be a clustering method using the Ward method so that the distance between the classes of the depth value to which each class belongs may serve as the maximum, a clustering method using the k average method and the like.

With the configuration using a class, the selection pixel list as shown in FIG. 26 is generated based on the selection operation as shown in FIG. 17A. Then, the class index which exceeds a predetermined ratio among all the pixels to be selected is set to be a selected class. Then, a pixel to be deleted is extracted by setting the depth range allocated to the selected class as the deletion depth range.

In this configuration, the ratio for selection is calculated for the allocated range as one class. Therefore, even when the object to be deleted's depth index does not have a fixed numerical value and fluctuates, the user can choose and delete the desired object to be deleted.

Furthermore, in the present embodiment, the eliminator sets the pixel value of the pixel to be deleted to NULL, and excludes the pixel value from the calculation process in generating the deleted and reconstructed image.

However, in the present invention, the deleted and reconstructed image may be generated using any method which reduces the percentage of appearance of the pixel value of the pixel to be deleted in the pixel to be reconstructed to an amount suitable for viewing the desired object.

For example, the deleted and reconstructed image can be generated by a configuration in which the eliminator eliminates the pixel to be deleted from the corresponding list of FIG. 5 such that the pixel value of the pixel to be deleted cannot be used in the generation process of the reconstructed image. Or another configuration is also possible which reduces the weight "w" stored in the corresponding list for the pixel to be deleted to a degree suitable for the appreciation of the desired object instead of deleting the pixel to be deleted from the corresponding list. In this configuration, the image in which the pixels to be deleted are deleted by a certain ratio can be generated as shown in FIG. 15E.

As an example of the configuration, it is possible that the user specifies the ratio which decreases the weights of the pixels to be deleted by using a slide bar and the like. With this configuration, the user can reduce the degree of appearance of the object to be deleted to the desired level.

Thus, the eliminator performs processes such as setting the pixel value of a pixel to be deleted to NULL and eliminating them from the object to be processed in the subsequent reconstruction process, deleting the pixel to be deleted from the corresponding list, and decreasing the weight of the pixel to be deleted and the like. These processes can be reworded as changing the correspondence relationship between the pixels to be reconstructed and the sub-pixels so that the degree of the correspondence between the pixels to be deleted and the pixels to be reconstructed is reduced. In addition, "the degree of correspondence is reduced" includes setting the degree of correspondence to 0. For this reason, the eliminator can be expressed also as a modifier.

Through these processes, the image generating apparatus can effectively decrease the percentage of appearance of the pixel values of the sub-pixels, in which the object to be deleted is determined to be imaged, in the reconstructed image. As a result, as the image of corresponding pixels other than the pixels to be deleted appears at a part where the object to be deleted exists, the deleted and reconstructed image close to the image from which the object to be deleted is actually removed can be generated.

Furthermore, the object to be deleted may not be determined based on the user operation. For example, another configuration is also possible which automatically deletes the object of the closest class and/or the object in front of a desired focal plane.

In the embodiment 1 and the embodiment 2, the example, in which the weighting coefficient is included in corresponding information, is described. The corresponding information may be information which determines the sub-pixels corresponding to the pixel to be reconstructed and the weighting coefficient needs not be defined.

Moreover, in the above-mentioned description, the corresponding information is generated for each light field image LFI based on the shooting setting information and the reconstruction setting. However, not being limited to the above example, predetermined corresponding information stored in advance may be used. This configuration is suitable for decreasing the amount of calculation while maintaining the accuracy within the allowable tolerances when the assumed photo shooting parameter has little room to fluctuate and the reconstruction distance is constant.

Moreover, in the above-mentioned description, although the image is described as a gray scale image, the image to be processed in the present invention is not limited to a gray scale image. For example, the image may be an RGB image in which three pixel values, R (red), G (green), and B (blue) are defined for each pixel. In this case, the pixel values are similarly processed as vector values of RGB. Moreover, the above-mentioned process may be performed respectively by setting each value of R, G, and B as each independent gray scale image. With this configuration, the reconstructed image which is a color image can be generated from the light field image which is a color image.

In addition, the above-mentioned hardware configuration and the flow charts are an example, and can optionally be altered and modified.

The central portion including the information processor 31, the main storage 32, the external storage 33 and the like, which performs a process for generating the reconstructed image can be realized by using typical computer systems not relying on a dedicated system. For example, the computer program for executing the above-mentioned operation may be stored and distributed in computer readable recording media (a flexible disk, CD-ROM, DVD-ROM, and the like.), the above-mentioned computer program may be installed in a computer, and the central portion, which performs a process for generating the reconstructed image, may be constructed. Moreover, the above-mentioned computer program may be stored in the memory storage of the server apparatuses on a communication network such as the Internet, and an image generating apparatus may be configured to be downloaded by usual computer systems and the like.

An application program portion only may be stored in a recording medium or a storage when the functions of the image generating apparatus are realized by the sharing of an operating system(OS) and an application program, or collaboration of the OS and the application program.

Moreover, it is also possible to superimpose a computer program on a carrier wave and to distribute through a communication network. For example, the above-mentioned computer program may be posted on the bulletin board (Bulletin Board System) on a communication network, and the above-mentioned computer program may be distributed through a network. Then, the computer program may be configured such that the above-mentioned process can be performed by starting the computer program and performing other application programs under the control of the OS in a similar manner.

As mentioned above, although the preferred embodiment of the present invention is described, the present invention is not limited to the specific embodiment. The present invention includes the inventions described in the claims and their equivalent scopes.

Having described and illustrated the principles of this application by reference to one or more preferred embodiments, it should be apparent that the preferred embodiments may be modified in arrangement and detail without departing from the principles disclosed herein and that it is intended that the application be construed as including all such modifications and variations insofar as they come within the spirit and scope of the subject matter disclosed herein.

What is claimed is:

1. An image generating apparatus comprising:
    an image acquirer which acquires a photo shooting image formed by a plurality of sub images shot from each of a plurality of viewpoints;
    an extractor which extracts, from sub-pixels forming the sub images, sub-pixels corresponding to an object whose composition is to be modified as pixels to be modified;
    a modifier which modifies a correspondence relationship with sub-pixels extracted as the pixels to be modified among correspondence relationships between the sub-pixels and pixels to be reconstructed forming a reconstructed image which is defined on a predetermined reconstruction plane;
    a generator which generates a reconstructed image in which the composition of the object has been modified by calculating pixel values of the pixels to be reconstructed from pixel values of the sub-pixels using the modified correspondence relationship; and
    a depth coefficient acquirer which acquires, for each of the sub-pixels, a depth coefficient indicating a depth of an object corresponding to the sub-pixel;
    wherein the generator, referring to a correspondence relationship modified by the modifier, compares depth coefficients of the pixels to be modified and depth coefficients of the sub-pixels which are not the pixels to be modified, and acquires, giving priority to, the pixel values having less deep depth coefficients in acquiring pixel values of pixels to be reconstructed corresponding to the pixels to be modified.

2. An image generating apparatus comprising:
    an image acquirer which acquires a photo shooting image formed by a plurality of sub images shot from each of a plurality of viewpoints;
    an extractor which extracts, from sub-pixels forming the sub images, sub-pixels corresponding to an object whose composition is to be modified as pixels to be modified;

a modifier which modifies a correspondence relationship with sub-pixels extracted as the pixels to be modified among correspondence relationships between the sub-pixels and pixels to be reconstructed forming a reconstructed image which is defined on a predetermined reconstruction plane;

a generator which generates a reconstructed image in which the composition of the object has been modified by calculating pixel values of the pixels to be reconstructed from pixel values of the sub-pixels using the correspondence relationship modified by the modifier; and a depth coefficient acquirer which acquires, for each of the sub-pixels, a depth coefficient indicating a depth of an object corresponding to the sub-pixel;

wherein the extractor extracts, from the sub-pixels corresponding to a position of an object to be modified which is an object whose composition is to be modified, the sub-pixels satisfying a predetermined condition of a depth coefficient obtained by the depth coefficient acquirer as pixels to be modified corresponding to an object whose composition has to be modified.

3. The image generating apparatus according to claim 2, wherein the extractor acquires the depth of the object to be modified, and sets sub-pixels to satisfy a predetermined condition of the depth coefficients, the sub-pixels being included in a predetermined range in which the depth coefficients acquired by the depth coefficient acquirer include the depth of the object to be modified.

4. The image generating apparatus according to claim 3, further comprising a definer which defines, with regards to the reconstructed image defined on the reconstruction plane, a plurality of layers, each of which are allotted to predetermined ranges of depth coefficients;

wherein the extractor selects a layer corresponding to the object to be modified among the plurality of layers and sets a range allotted to the selected layer to a predetermined range which includes the depth of the object to be modified.

5. The image generating apparatus according to claim 1, further comprising:

a second generator which generates a reconstructed image without any composition modification as a tentative reconstructed image based on a correspondence relationship prior to a change by the modifier;

an output device which outputs the tentative reconstructed image generated by the second generator; and a designator for designating a portion on the tentative reconstructed image output by the output device;

wherein the extractor sets an object corresponding to a portion designated by the designator to be an object whose composition has to be modified.

6. The image generating apparatus according to claim 1, further comprising:

a third acquirer which acquires information indicating details of the composition modification; and a determiner which determines a modification parameter to be used for modifying a correspondence relationship between the pixels to be modified and the pixels to be reconstructed by the modifier based on the details of the composition modification indicated by the information acquired by the third acquirer;

wherein the modifier modifies a correspondence relationship with the pixels to be modified using the modification parameter determined by the determiner.

7. The image generating apparatus according to claim 6, wherein the modification parameter determined by the determiner is a conversion matrix for a linear transformation.

8. The image generating apparatus according to claim 1, further comprising:

a fourth acquirer which acquires information indicating a correspondence relationship between the sub-pixels and the pixels to be reconstructed, which are acquired based on a photo shooting parameter when the image is shot;

wherein the modifier modifies a correspondence relationship indicating information acquired by the fourth acquirer.

9. An image generating apparatus comprising:

an image acquirer which acquires a photo shooting image formed by a plurality of sub images shot from each of a plurality of viewpoints;

an extractor which extracts, from sub-pixels forming the sub images, sub-pixels corresponding to an object to be deleted as pixels to be deleted;

a modifier which modifies a correspondence relationship between the sub-pixels and pixels to be reconstructed forming a reconstructed image which is defined on a predetermined reconstruction plane so that a degree of correspondence with the sub-pixels extracted as the pixels to be deleted is reduced; and a generator which generates a reconstructed image having a small effect of the pixels to be deleted by calculating pixel values of the pixels to be reconstructed from pixel values of the sub-pixels using the correspondence relationship modified by the modifier;

wherein the generator generates a reconstructed image from which the object to be deleted is deleted using the correspondence relationship modified by the modifier.

10. An image generating apparatus comprising:

an image acquirer which acquires a photo shooting image formed by a plurality of sub images shot from each of a plurality of viewpoints;

an extractor which extracts, from sub-pixels forming the sub images, sub-pixels corresponding to an object to be deleted as pixels to be deleted;

a modifier which modifies a correspondence relationship between the sub-pixels and pixels to be reconstructed forming a reconstructed image which is defined on a predetermined reconstruction plane so that a degree of correspondence with the sub-pixels extracted as the pixels to be deleted is reduced; and a generator which generates a reconstructed image having a small effect of the pixels to be deleted by calculating pixel values of the pixels to be reconstructed from pixel values of the sub-pixels using the correspondence relationship modified by the modifier; and a depth coefficient acquirer which acquires, for each of the sub-pixels, a depth coefficient indicating a depth of an object corresponding to the sub-pixel;

wherein the extractor extracts sub-pixels which satisfy a predetermined condition of a depth coefficient acquired by the depth coefficient acquirer from the sub-pixels as pixels to be deleted which corresponds to the object to be deleted.

11. The image generating apparatus according to claim 10, wherein the extractor acquires the depth of the object to be deleted and sets sub-pixels to satisfy a predetermined condition of the depth coefficients, the sub-pixels being included in a predetermined range in which the depth coefficients acquired by the depth coefficient acquirer include the depth of the object to be deleted.

12. The image generating apparatus according to claim 11, further comprising an acquirer which acquires the depths of the pixels to be reconstructed from depth coefficients of sub-pixels acquired by the depth coefficient acquirer;

wherein the extractor acquires at least one part of a portion within the reconstructed image where the object to be deleted is positioned, and acquires the depth of the object to be deleted based on the depth acquired by the depth coefficient acquirer for the pixels to be reconstructed of the acquired portion.

13. The image generating apparatus according to claim 9, further comprising:

a second generator which generates a tentative reconstructed image based on a correspondence relationship prior to the modification by the modifier;

an output device which outputs the tentative reconstructed image generated by the second generator; and a designator for designating a portion in the tentative reconstructed image output by the output device;

wherein the extractor extracts sub-pixels corresponding to the portion designated by the designator as the pixels to be deleted.

14. The image generating apparatus according to claim 9, further comprising:

a corresponding information acquirer which acquires information indicating a correspondence relationship between the sub-pixels and the pixels to be reconstructed, the information being acquired based on a photo shooting parameter when the image is shot;

wherein the modifier modifies the correspondence relationship indicated by the information which is acquired by the corresponding information acquirer.

15. A method comprising:

acquiring a photo shooting image formed by a plurality of sub images shot from each of a plurality of viewpoints;

extracting, from sub-pixels forming the sub image, sub-pixels corresponding to an object whose composition is to be modified as pixels to be modified;

modifying a correspondence relationship with sub-pixels extracted as the pixels to be modified among correspondence relationships between the sub-pixels and pixels to be reconstructed forming a reconstructed image which is defined on a predetermined reconstruction plane;

generating a reconstructed image in which the composition of the object has been modified by calculating pixel values of the pixels to be reconstructed from pixel values of the sub-pixels using the modified correspondence relationship; and acquiring, for each of the sub-pixels, a depth coefficient indicating a depth of an object corresponding to the sub-pixel;

wherein generating the reconstructed image comprises referring to the modified correspondence relationship and comparing depth coefficients of the pixels to be modified and depth coefficients of the sub-pixels which are not the pixels to be modified, and acquiring, giving priority to, the pixel values having less deep depth coefficients in acquiring pixel values of the pixels to be reconstructed corresponding to the pixels to be modified.

16. A method comprising:

acquiring a photo shooting image formed by a plurality of sub images shot from each of a plurality of viewpoints;

extracting, from sub-pixels forming the sub images, sub-pixels corresponding to an object to be deleted as pixels to be deleted;

modifying a correspondence relationship between the sub-pixels and pixels to be reconstructed forming a reconstructed image which is defined on a predetermined reconstruction plane so that a degree of correspondence with the sub-pixels extracted as the pixels to be deleted is reduced; and generating a reconstructed image having a small effect of the pixels to be deleted by calculating pixel values of the pixels to be reconstructed from pixel values of the sub-pixels using the modified correspondence relationship;

wherein generating the reconstructed image comprises generating a reconstructed image from which the object to be deleted is deleted using the modified correspondence relationship.

17. A non-transitory computer-readable recording medium having stored thereon a program executable by a computer, the program controlling the computer to perform functions comprising:

acquiring a photo shooting image formed by a plurality of sub images shot from each of a plurality of viewpoints;

extracting, from sub-pixels forming the sub images, sub-pixels corresponding to an object whose composition is to be modified as pixels to be modified;

modifying a correspondence relationship with sub-pixels extracted as the pixels to be modified among correspondence relationships between the sub-pixels and pixels to be reconstructed forming a reconstructed image which is defined on a predetermined reconstruction plane;

generating a reconstructed image in which the composition of the object has been modified by calculating pixel values of the pixels to be reconstructed from pixel values of the sub-pixels using the modified correspondence relationship; and acquiring, for each of the sub-pixels, a depth coefficient indicating the depth of an object corresponding to the sub-pixel;

wherein generating the reconstructed image comprises referring to the modified correspondence relationship and comparing depth coefficients of the pixels to be modified and depth coefficients of the sub-pixels which are not the pixels to be modified, and acquiring, giving priority to, the pixel values having less deep depth coefficients in acquiring pixel values of the pixels to be reconstructed corresponding to the pixels to be modified.

18. A non-transitory computer-readable recording medium having stored thereon a program executable by a computer, the program controlling the computer to perform functions comprising:

acquiring a photo shooting image formed by a plurality of sub images shot from each of a plurality of viewpoints;

extracting, from sub-pixels forming the sub images, sub-pixels corresponding to an object to be deleted as pixels to be deleted;

modifying a correspondence relationship between the sub-pixels and pixels to be reconstructed forming a reconstructed image which is defined on a predetermined reconstruction plane so that a degree of correspondence with the sub-pixels extracted as the pixels to be deleted is reduced; and generating a reconstructed image having a small effect of the pixels to be deleted by calculating pixel values of the pixels to be reconstructed from pixel values of the sub-pixels using the modified correspondence relationship;

wherein generating the reconstructed image comprises generating a reconstructed image from which the object to be deleted is deleted using the modified correspondence relationship.

19. A method comprising:
acquiring a photo shooting image formed by a plurality of sub images shot from each of a plurality of viewpoints;
extracting, from sub-pixels forming the sub image, sub-pixels corresponding to an object whose composition is to be modified as pixels to be modified;
modifying a correspondence relationship with sub-pixels extracted as the pixels to be modified among correspondence relationships between the sub-pixels and pixels to be reconstructed forming a reconstructed image which is defined on a predetermined reconstruction plane;
generating a reconstructed image in which the composition of the object has been modified by calculating pixel values of the pixels to be reconstructed from pixel values of the sub-pixels using the modified correspondence relationship; and
acquiring, for each of the sub-pixels, a depth coefficient indicating a depth of an object corresponding to the sub-pixel;
wherein extracting the sub-pixels comprises extracting sub-pixels satisfying a predetermined condition of the depth coefficient.

20. A method comprising:
acquiring a photo shooting image formed by a plurality of sub images shot from each of a plurality of viewpoints;
extracting, from sub-pixels forming the sub images, sub-pixels corresponding to an object to be deleted as pixels to be deleted;
modifying a correspondence relationship between the sub-pixels and pixels to be reconstructed forming a reconstructed image which is defined on a predetermined reconstruction plane so that a degree of correspondence with the sub-pixels extracted as the pixels to be deleted is reduced;
generating a reconstructed image having a small effect of the pixels to be deleted by calculating pixel values of the pixels to be reconstructed from pixel values of the sub-pixels using the modified correspondence relationship; and
acquiring, for each of the sub-pixels, a depth coefficient indicating a depth of an object corresponding to the sub-pixel;
wherein extracting the sub-pixels comprises extracting sub-pixels satisfying a predetermined condition of the depth coefficient.

21. A non-transitory computer-readable recording medium having stored thereon a program executable by a computer, the program controlling the computer to perform functions comprising:
acquiring a photo shooting image formed by a plurality of sub images shot from each of a plurality of viewpoints;
extracting, from sub-pixels forming the sub images, sub-pixels corresponding to an object whose composition is to be modified as pixels to be modified;
modifying a correspondence relationship with sub-pixels extracted as the pixels to be modified among correspondence relationships between the sub-pixels and pixels to be reconstructed forming a reconstructed image which is defined on a predetermined reconstruction plane; and
a generation function of generating a reconstructed image in which the composition of the object has been modified by calculating pixel values of the pixels to be reconstructed from pixel values of the sub-pixels using the modified correspondence relationship; and
acquiring, for each of the sub-pixels, a depth coefficient indicating a depth of an object corresponding to the sub-pixel;
wherein extracting the sub-pixels comprises extracting sub-pixels satisfying a predetermined condition of the depth coefficient.

22. A non-transitory computer-readable recording medium having stored thereon a program executable by a computer, the program controlling the computer to perform functions comprising:
acquiring a photo shooting image formed by a plurality of sub images shot from each of a plurality of viewpoints;
extracting, from sub-pixels forming the sub images, sub-pixels corresponding to an object to be deleted as pixels to be deleted;
modifying a correspondence relationship between the sub-pixels and pixels to be reconstructed forming a reconstructed image which is defined on a predetermined reconstruction plane so that a degree of correspondence with the sub-pixels extracted as the pixels to be deleted is reduced;
generating a reconstructed image having a small effect of the pixels to be deleted by calculating pixel values of the pixels to be reconstructed from pixel values of the sub-pixels using the modified correspondence relationship, and
acquiring, for each of the sub-pixels, a depth coefficient indicating the depth of an object corresponding to the sub-pixel;
wherein extracting the sub-pixels comprises extracting sub-pixels satisfying a predetermined condition of the depth coefficient.

* * * * *